United States Patent [19]
Foster et al.

[11] Patent Number: 5,327,570
[45] Date of Patent: Jul. 5, 1994

[54] MULTIPROCESSOR SYSTEM HAVING LOCAL WRITE CACHE WITHIN EACH DATA PROCESSOR NODE

[75] Inventors: David J. Foster, White Plains; Armando Garcia, Yorktown Heights; Robert B. Pearson, Cold Spring, all of N.Y.

[73] Assignee: International Business Machines Corporation, Armonk, N.Y.

[21] Appl. No.: 734,432

[22] Filed: Jul. 22, 1991

[51] Int. Cl.⁵ .............................................. G06F 9/00
[52] U.S. Cl. ................................... 395/800; 395/200; 395/250; 395/325; 395/400; 395/425; 364/134; 364/146; 364/228.1; 364/228.4; 364/229; 364/230.6; 364/238.6; 364/239; 364/240; 364/254.6; 364/DIG. 1; 364/DIG. 2
[58] Field of Search ............... 395/800, 200, 250, 425, 395/325, 400; 364/DIG. 1, DIG. 2, 134, 146, 228.1, 228.4, 229, 230.6, 238.6, 239, 240, 254.6

[56] References Cited

U.S. PATENT DOCUMENTS

| | | | |
|---|---|---|---|
| 4,371,754 | 2/1983 | De et al. | 371/9.1 |
| 4,484,273 | 11/1984 | Stiffler et al. | 395/325 |
| 4,591,976 | 5/1986 | Webber et al. | 395/575 |
| 4,591,977 | 5/1986 | Nissen et al. | 395/200 |
| 4,736,319 | 4/1988 | DasGupta et al. | 395/325 |
| 4,768,197 | 8/1988 | Petolino et al. | 371/38 |
| 4,783,736 | 11/1988 | Ziegler et al. | 395/425 |
| 4,811,216 | 3/1989 | Bishop et al. | 395/425 |
| 4,843,542 | 6/1989 | Dashiell et al. | 395/425 |
| 4,858,101 | 8/1989 | Stewart et al. | 364/131 |
| 4,862,350 | 8/1989 | Orr et al. | 395/250 |
| 4,870,174 | 9/1989 | Matelan et al. | 395/273 |
| 4,872,133 | 10/1989 | Leeland | 364/748 |
| 5,067,071 | 11/1991 | Schanin et al. | 395/275 |
| 5,202,972 | 4/1993 | Gusefski et al. | 395/425 |

FOREIGN PATENT DOCUMENTS 0369265 5/1990 European Pat. Off. .
0379768 8/1990 European Pat. Off. .

Primary Examiner—Alyssa H. Bowler
Assistant Examiner—Dzung Nguyen
Attorney, Agent, or Firm—Perman & Green

[57] ABSTRACT

A multiprocessor data processing system (10), and a method of operating same, so as to provide efficient bandwidth utilization of shared system resources (24, 26). The system includes a plurality of processor nodes, each of which includes a data processor (22a, 28a). A first step of a method buffers data written by a data processor to a first bus (23a), prior to the data being transmitted to a second bus (32). Also buffered are byte enable (BE) signals generated by the data processor in conjunction with the data written by the data processor. A next step performs a main memory (26) write operation by transmitting the buffered data to the second bus; responsive to the stored BE signals, also transmitting a control signal for indicating if a memory write is to be accomplished as a read-modify-write (RMW) type of memory operation; and transmitting the stored BE signals to the second bus. A further step couples the data, the RMW signal, and the BE signals from the second bus to a third bus (24) for reception by the main memory.

19 Claims, 27 Drawing Sheets

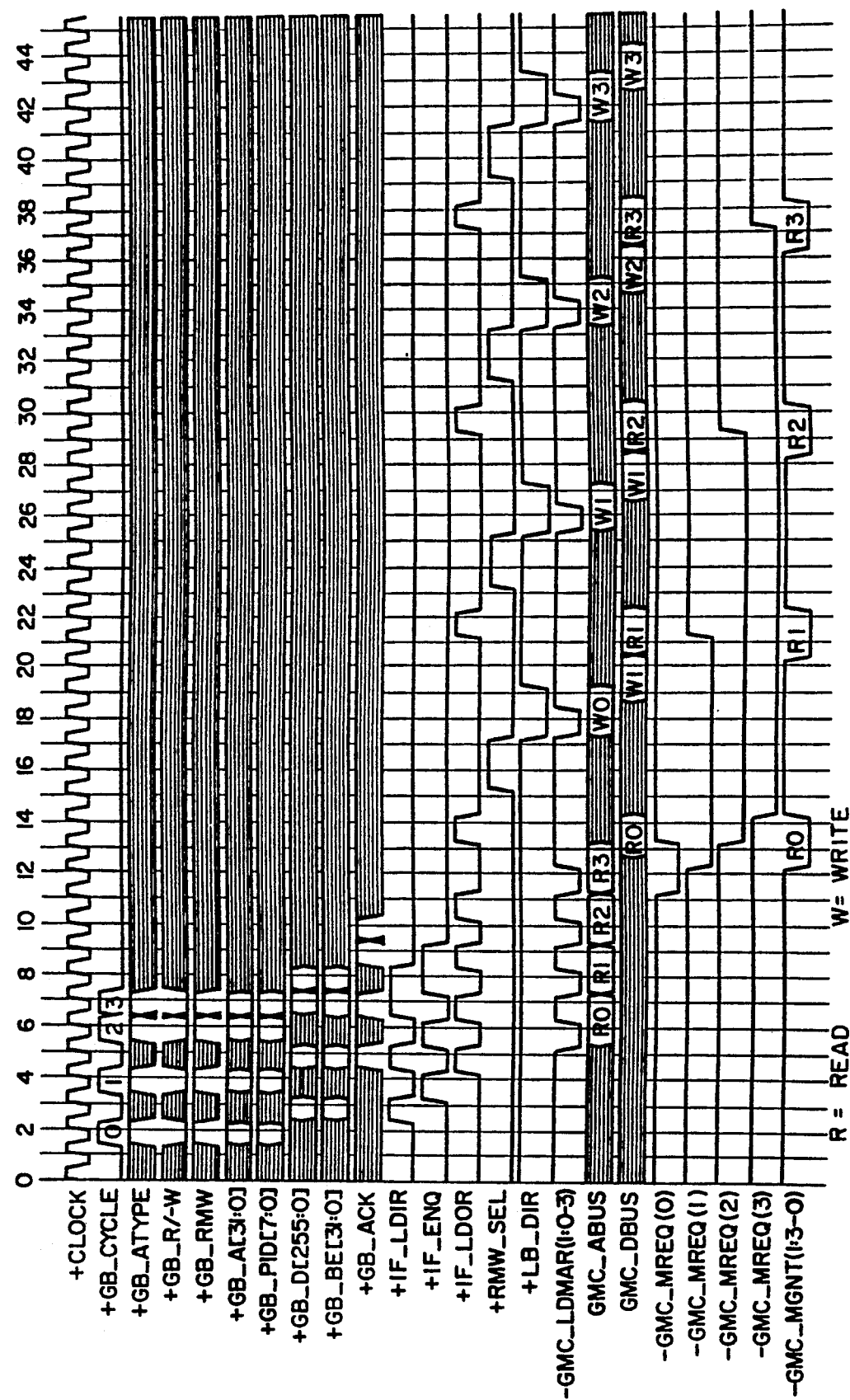

UBIF CONTROL (PROCESSOR MODE)

UBIF CONTROL (MEMORY MODE)

UBIF-A (PROCESSOR MODE) ADDRESS
SECTION BLOCK DIAGRAM
34a

UBIF-A (MEMORY MODE) ADDRESS SECTION BLOCK DIAGRAM 34a

UBIF-A (PROCESSOR MODE) MISC ADDRESS
SECTION BLOCK DIAGRAM

UBIF-A (MEMORY MODE) MISC ADDRESS SECTION BLOCK DIAGRAM

UBIF-A (PROCESSOR MODE) MID SECTION BLOCK DIAGRAM 34a

UBIF-D DATA OUTPUT SECTION BLOCK DIAGRAM 34b

UBIF-D INPUT DATA SECTION BLOCK DIAGRAM

MULTIPROCESSOR SYSTEM HAVING LOCAL WRITE CACHE WITHIN EACH DATA PROCESSOR NODE

CROSS REFERENCE TO RELATED PATENT APPLICATIONS

This patent application is related to the following commonly assigned U.S. patent applications: Ser. No. 07/734,206, filed Jul. 22, 1991, entitled "A Universal Interface for Coupling Multiple Processors, Memory Units, and I/O Interfaces to a Common High Speed Interconnect", A. Garcia; Ser. No. 07/733,563, filed Jul. 22, 1991, entitled "A Centralized Backplane Bus Arbiter for Multiprocessor Systems" A. Garcia et al.; Ser. No. 07/733,517, filed Jul. 22, 1991, entitled "A Processor Buffered Interface for Multiprocessor Systems" D. Foster et al.; Ser. No. 07/734,359, filed Jul. 22, 1991, entitled "High Performance I/O Processor", R. Pearson; Ser. No. 07/733,767, filed Jul. 22, 1991, entitled "A Serial Diagnostic Interface Bus for Multiprocessor Systems", D. Foster et al.; and Ser. No. 07/733,950, filed Jul. 22, 1991, entitled "High Definition Multimedia Display" S. Choi et al.

FIELD OF THE INVENTION

This invention relates generally to data processing apparatus and method and, in particular, to a high performance multiprocessor system including a multi-level bus hierarchy.

BACKGROUND OF THE INVENTION

System requirements needed to interact with and visualize large, time-dependent data sets include a large, high-bandwidth disk array to store the entire data set being processed, a high speed network to download a problem set, a large, high-speed memory to buffer all data required to process a single simulation time step, computational power that is adequate to manipulate, enhance, and visualize the data sets, and a real-time, high resolution visual display. Furthermore, it is important that these functions be provided within a highly programmable and flexible user environment.

One fundamental problem encountered in multiprocessor systems is the provision of an efficient utilization of shared resources, such as a shared interconnect, or global bus, and a shared, global memory. It is desirable to operate such shared resources at their maximum bandwidth potential, while still providing reliable data transfers and storage. This problem is compounded when a variety of different types of agents, such as processors, I/O processors, and the like, are all coupled to the shared resources.

The following two commonly U.S. Patents are cited as showing multiple processor systems.

In commonly assigned U.S. Pat. No. 4,736,319, issued Apr. 5, 1988, entitled "Interrupt Mechanism for Multiprocessing System Having a Plurality of Interrupt Lines in Both a Global Bus and Cell Buses" to DasGupta et al. there is described a multiprocessing system that includes an executive processing element connected to a global bus. A plurality of cells, each of which includes plural processors, are connected through a plurality of bus interface systems to the global bus. A workstation is connected to the executive processor to input jobs into the multiprocessing system for execution.

In commonly assigned U.S. Pat. No. 4,862,350, issued Aug. 29, 1989, entitled "Architecture for a Distributive Microprocessing System" to Orr et al. there is described a shared memory system to interface a primary processor with a plurality of microprocessor control devices. The shared memory system includes a RAM and a dedicated processor for managing the RAM.

What is one object of this invention is to provide a multiprocessor system that efficiently utilizes shared system resources.

It is another object of the invention to provide a multiprocessor system optimized for providing high speed data interconnects enabling the real-time manipulation and display of complex, high resolution images.

SUMMARY OF THE INVENTION

The foregoing and other problems are overcome and the objects of the invention are realized by a multiprocessor data processing system, and a method of operating the multiprocessor data processing system, so as to provide efficient bandwidth utilization of shared system resources. The system is of a type that includes a plurality of processor nodes, each of which includes a data processor. In accordance with a method of the invention a first step buffers data written by a data processor to a first bus, prior to the data being transmitted to a second bus. The second bus is a local processor bus having other processor nodes or I/O communication channel interface devices coupled thereto. A second step buffers byte enable signals generated by the data processor in conjunction with the data written by the data processor. A third step performs a main memory write operation by the steps of: transmitting the buffered data to the second bus; responsive to the stored byte enable signals, also transmitting a control signal to the second bus for indicating if the main memory write operation is to be accomplished as a read-modify-write type of memory operation; and transmitting the stored byte enable signals to the second bus. A further step couples the data, the control signal, and the byte enable signals from the local bus to a third bus for reception by the main memory. The third bus is a high speed global bus. Interface apparatus associated with the main memory is responsive to the control signal indicating a read-modify-write memory operation for (a) reading data from a specified location within the main memory, (b) selectively merging the transmitted buffered data in accordance with the transmitted byte enable signals, and (c) storing the previously read and merged data back into the specified location.

BRIEF DESCRIPTION OF THE DRAWING

The above set forth and other features of the invention are made more apparent in the ensuing Detailed Description of the Invention when read in conjunction with the attached Drawing, wherein:

FIG. 18b is a timing diagram that illustrates four global memory read-modify-write operations each directed to a different global memory bank;

FIG. 29 is a block diagram showing in greater detail the UBIF-D output circuitry.

DETAILED DESCRIPTION OF THE INVENTION

Figure 1:
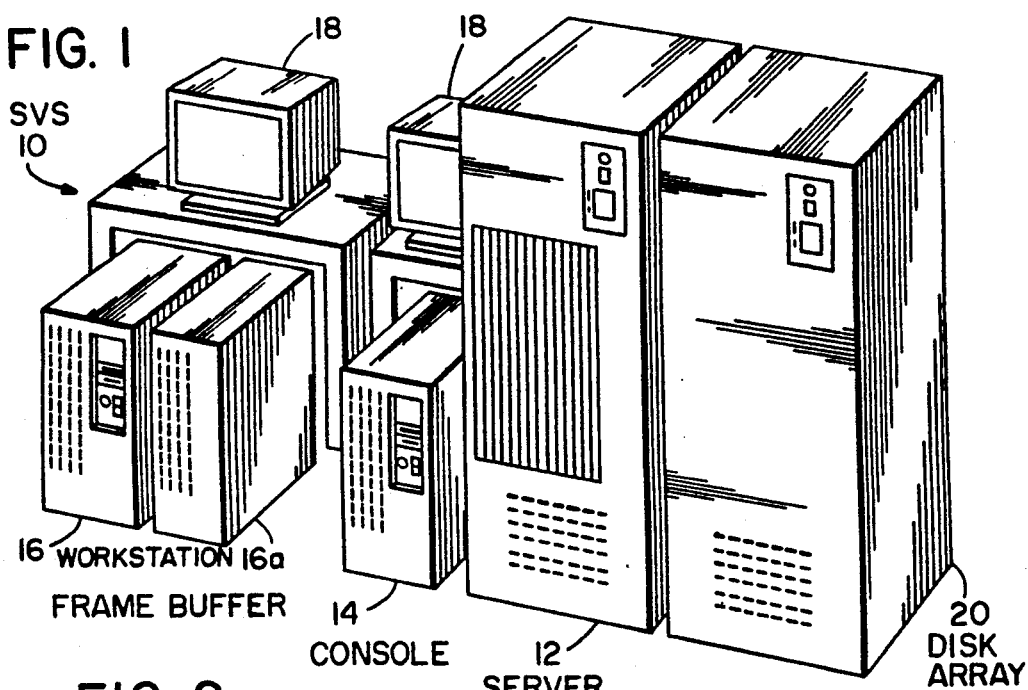
FIG. 1 illustrates the system components of a scientific visualization system.

Referring to FIG. 1 there is illustrated a multiprocessor system that is constructed and operated in accordance with the invention. Specifically, there are illustrated components of a Scientific Visualization System (SVS) 10. A purpose of the SVS 10 is to process, manipulate, and visualize complex data sets at interactive speeds, although the use of the system 10 is not limited to only this one important application.

The SVS 10 includes several major components. A first component is a server 12 embodied within a data processing system that provides large-scale computational power, high-speed memory, and intelligent I/O processors, all of which are interconnected by a high speed global bus. The terms global bus, shared bus, and common interconnect are used interchangeably herein.

A second component is a console 14 embodied in, by example, a RISC System/6000 (RS/6000) data processing system manufactured by the International Business Machines Corporation (RISC System/6000 is a Trademark of the International Business Machines Corporation). The console 14 provides network access from remote workstations (not shown).

A third component is a Frame buffer 16 that includes a RS/6000 data processor which provides console functions therefore. The frame buffer 16 includes interface and image buffering hardware 16a attached via an ANSI standard High Performance Parallel Interface (HIPPI) interface for providing real-time display capability to high-resolution displays 18. A further component of the system 10 is a disk array 20. Disk array 20 may embodied within a storage system having 21 GByte capacity with 55 MByte/second transfer rate, via a HIPPI interface.

It should be realized that the exact configuration of the system 10 varies depending on the intended use and that the configuration of FIG. 1 is not intended to represent a limitation upon the practice of the invention.

Figure 2:
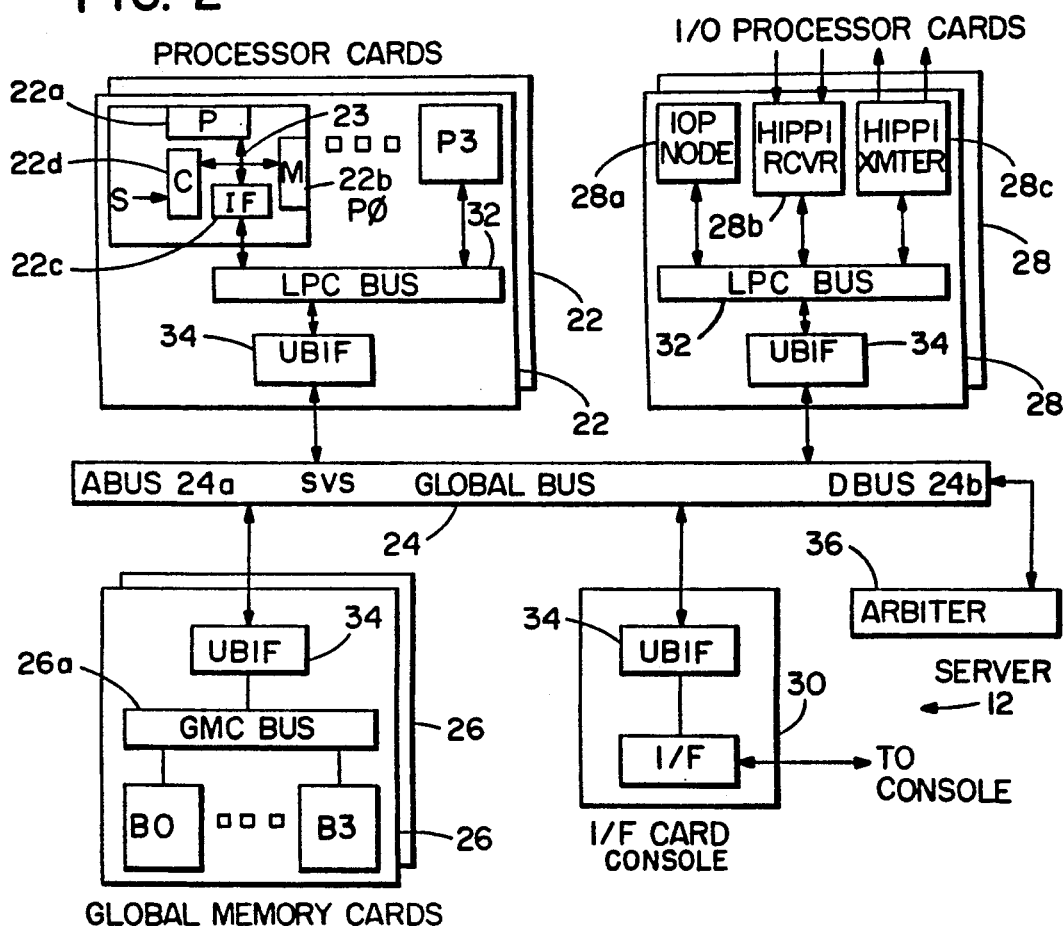
FIG. 2 is a block diagram of the system server component of FIG. 1.

Referring to FIG. 2 there is illustrated in block diagram form the server 12 of the SVS 10. Server 12 is comprised of a plurality of individual processors 22a organized as four processors (P0-P3) per printed circuit card 22. The server 12 may include up to eight cards for a total of 32 processors. Each processor card 22 includes a universal bus interface (UBIF) 34 for coupling a Local Processor Card (LPC) bus 32 to a SVS global bus 24. Also coupled to the SVS global bus 24 are a plurality of Global Memory cards 26, a plurality of I/O processor cards 28, and an interface 30 to the console 14.

More specifically, each processor card 22 (FIG. 3) includes up to four processor nodes each having a microprocessor 22a. In a present embodiment each microprocessor 22a is an i860-type (80860) microprocessor manufactured by Intel Corporation (i860 is a Trademark of the Intel Corporation).

Coupled to each microprocessor 22a through a node bus 23 is a local node memory 22b providing, in this embodiment, 16 megabytes (MB) of storage. Each processor node also includes a buffered interface 22c to the LPC bus 32 The LPC bus 32 connects multiple processor nodes to the UBIF 34 and also permits access to further shared resources. Additionally, each processor node includes an interface to a serial bus (S). Details of the serial bus interface are set forth in commonly assigned U.S. patent application Ser. No. 07/733,767, filed Jul. 22, 1991, entitled "A Serial Diagnostic Interface Bus For Multiprocessor Systems".

In a present embodiment one of the processor cards 22 is capable of a peak performance of 160 million instructions per second (MIPS), or 320 million single precision floating point operations per second (MFLOPS). A fully configured system of eight processor cards 22 provides a peak performance approaching 1.28 billion instructions per second (BIPS) or 2.56 GFLOPS, assuming 40 MHz operation.

The I/O processor cards 28 (FIG. 15) each include a processor node 28a, similar to the processor mode 22a on the processor card 22, two HIPPI receivers 28b, and two HIPPI transmitters 28c. Each IOP 28 thus provides four HIPPI interfaces, each of which is capable of operation at a transfer rate of 100 MB/second. The HIPPI interfaces are employed to support high speed disk arrays, provide real-time images to HIPPI-attached frame buffers, and realize high speed communication with external devices, such as supercomputers.

In a present embodiment each of the Global Memory cards 26 (FIG. 16) is configured with either 128 MB or 256 MB of random access memory with ECC. The server 12 may include up to four Global Memory cards 26. Each of the Global Memory cards 26 provides a data bandwidth of 640 MB/second in a manner that reduces a memory access latency seen by each user of the system 10. This is accomplished by partitioning the Global Memory on each memory card 26 into four memory banks (B0-B3), each of which is capable of independently performing block read cycles, page mode read or write cycles and random read or write cycles. A Global Memory Card (GMC) bus 26a enables each of the banks (B0-B3) to operate independently, while utilizing common global bus resources.

The Console interface 30 is partitioned into two cards, one which is found within the server 12 and one which resides in the console 14. The link between the two cards allows access to the server global memory and serial bus, which in turn allows access to each processor's local memory and PBIF.

The Global Bus 24 is implemented with Emitter Coupled Logic (ECL) technology for interconnecting these various components and providing a 1.28 GByte/sec transfer rate, assuming 40 MHz operation.

Each SVS 10 server 12 supports up to 12 master devices (i.e. processor cards 22, I/O processor cards 28, or console Interface card 30), and up to four memory cards 26. One possible configuration includes console Interface card 30, eight processor cards 22 (or 32 processors), four Global Memory cards 26 each with 256 MBytes of storage for a total of 1024 MB of high speed shared memory, and one I/O processor 28 to support the high speed disk array 20, receive data from a HIPPI source, and distribute image data to HIPPI attached frame buffers 16. The console workstation 14 provides a user interface to the SVS 10 as well as support for standard I/O devices such as LAN adapters and disk controllers.

As can be seen in FIG. 2 each component card of the system 10 includes one of the UBIFs 34, all of which are of identical construction. The UBIF 34 presents a shared, synchronous, decoupled interface to the Global Bus 24, provides local arbitration on the LPC bus 32 or GMC bus 26a, and performs all necessary handshaking and retry sequencing with the Global bus 24. In a present embodiment the UBIF 34 provides bidirectional, pipelined buffering to support up to four local master devices, such as processors 22a, or up to four slave devices, such as the memory banks B0-B3. The UBIF 34 supports unlimited data bus widths in multiples of 32-bits and provides a peak data transfer rate of 640 Mbytes/second between the Local Bus 32 and the Global Bus 24, assuming 40 MHz bus operation and a 256-bit wide data path.

A further description of the UBIF 34 component of the SVS 10 is now provided.

Figure 5A:
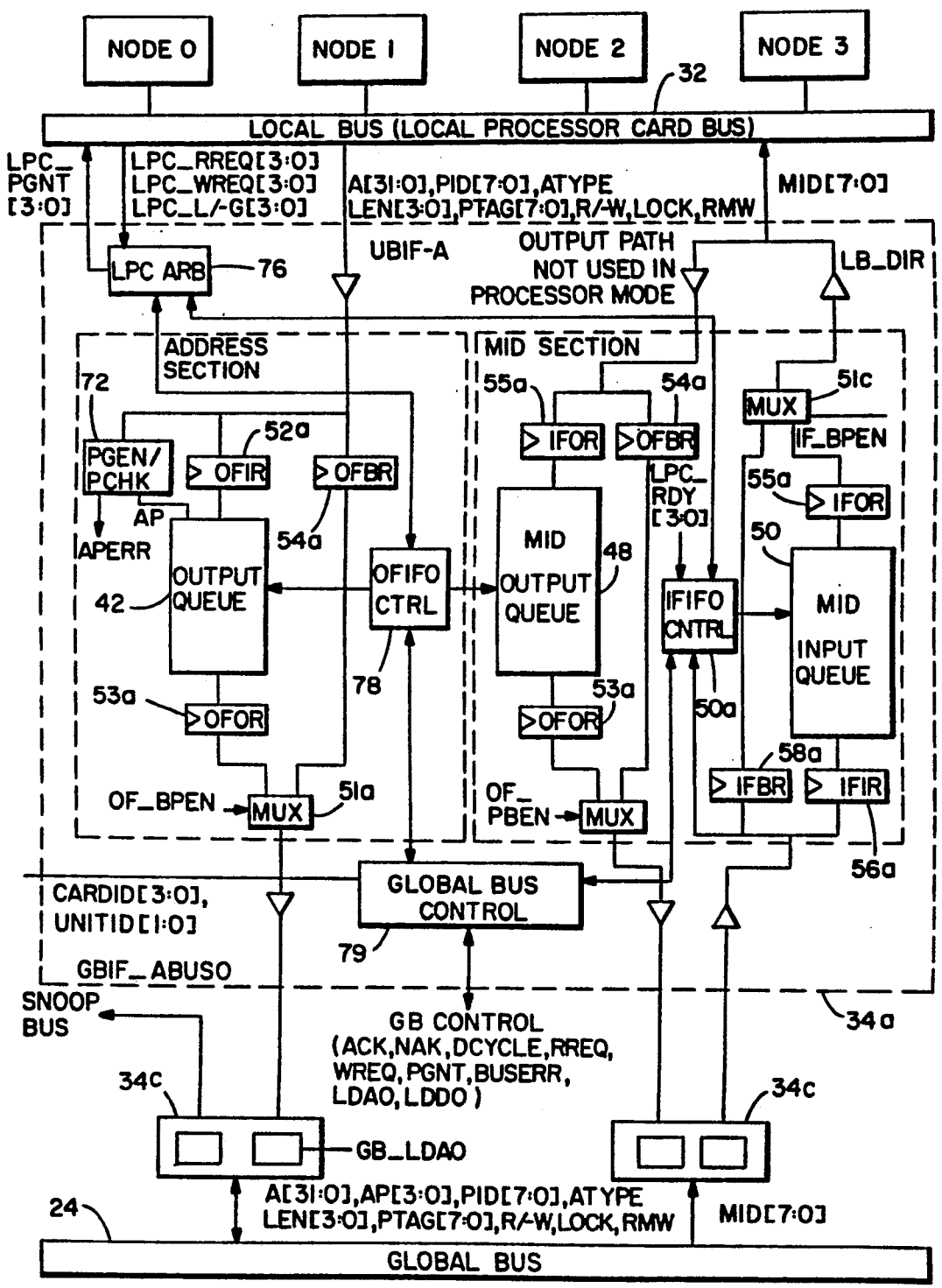
FIG. 5a is a block diagram showing an address portion of a Universal Buffered Interface (UBIF-A) coupled to processor nodes or I/O interface nodes.
Figure 5B:
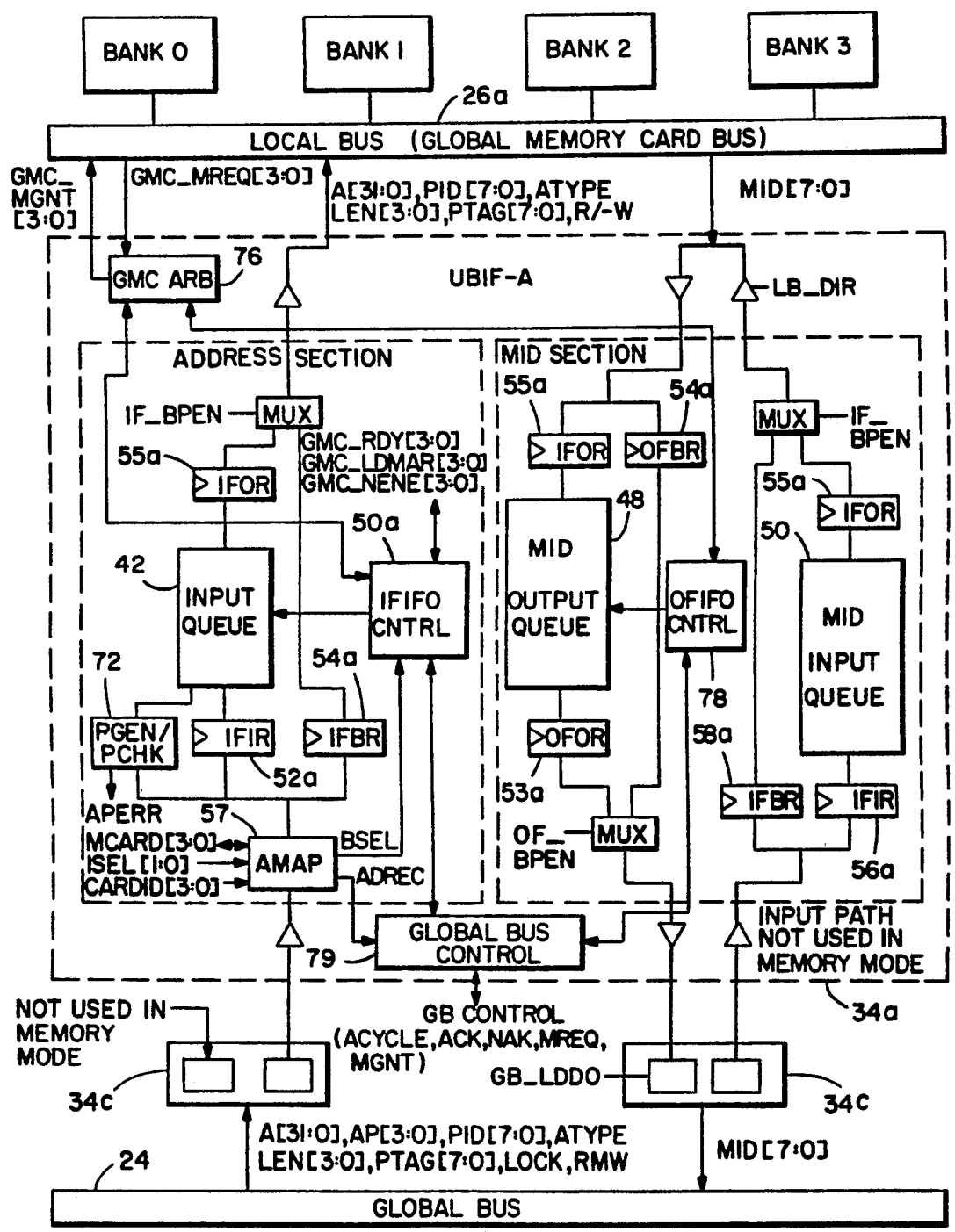
FIG. 5b is a block diagram showing an address portion of the Universal Buffered Interface (UBIF-A) when coupled to memory bank nodes.
Figure 6:
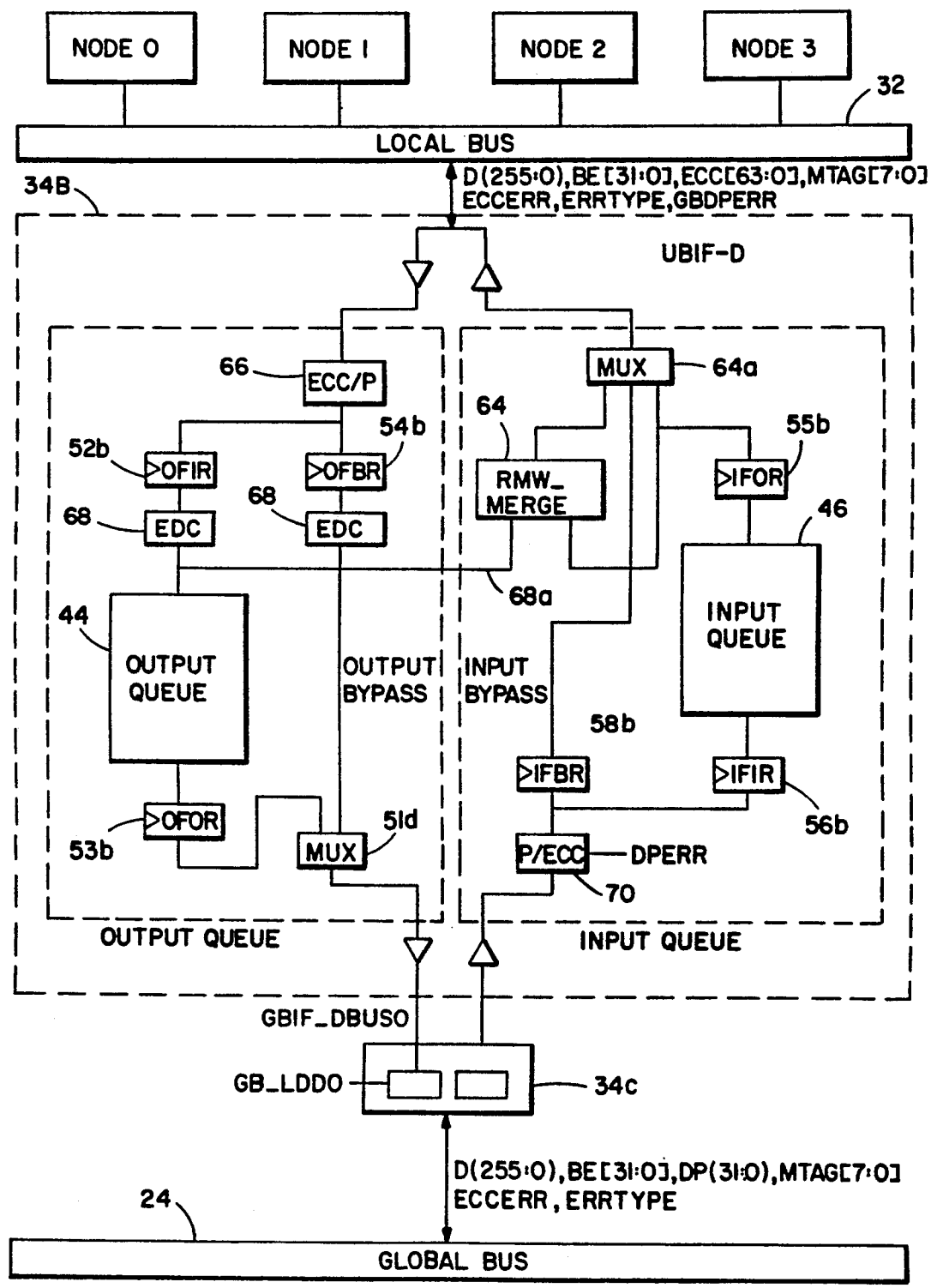
FIG. 6 is a block diagram showing a data portion of the Universal Buffered Interface (UBIF-D)
Figure 7:
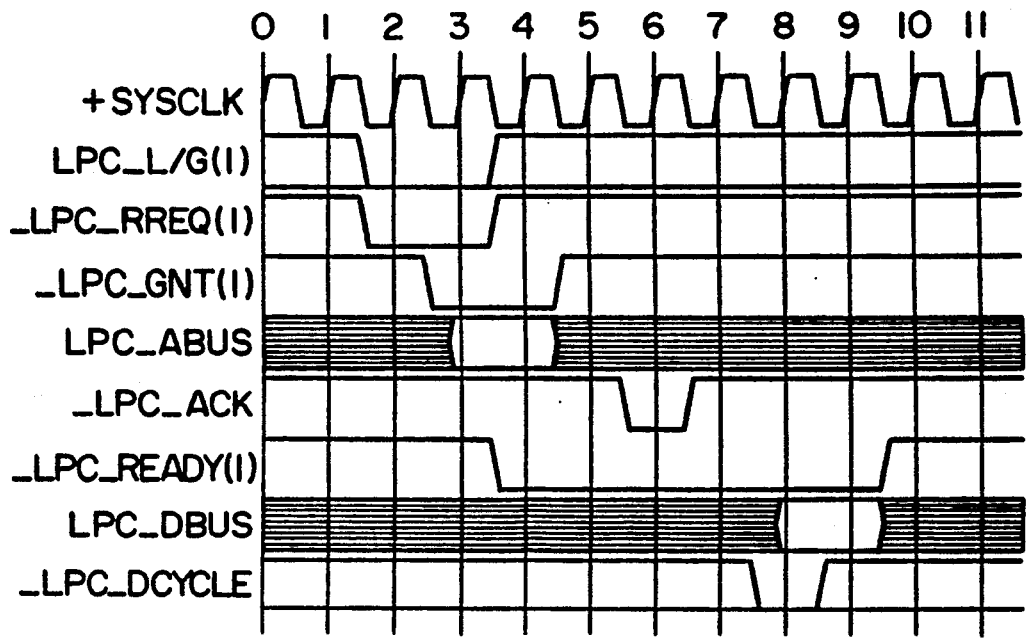
FIG. 7 is a timing diagram depicting local-to-global bus read request timing.
Figure 8:
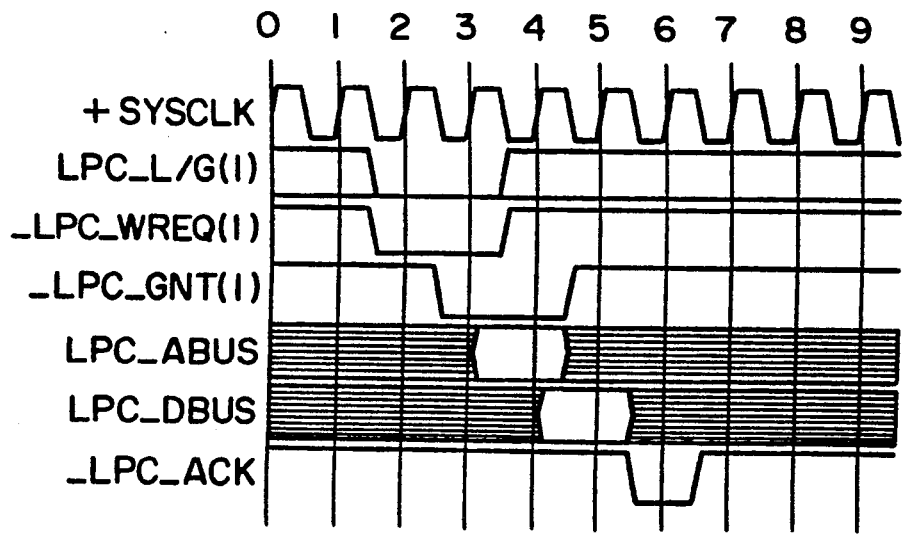
FIG. 8 is a timing diagram depicting local-to-global bus write request timing.

FIG. 5a and FIG. 6 depict the architecture of UBIF-A 34a and UBIF-D 34b modules, respectively. FIG. 5a shows the UBIF-A for use on processor cards 22, I/O processor cards 28, or the console I/F card 30. FIG. 5b, described below, shows the UBIF-A for use on Global Memory cards 26. The UBIF-A 34a includes a local bus arbiter (LPC ARB) 76, bidirectional address and control queues for each of the four local devices, output FIFO controls (OFIFO_CTRL 78), input FIFO controls (IFIFO_CNTRL) 50a) and GB 24 interface control logic (Global Bus Control 79). The UBIF-A 34a also provides high-level control of the eight independent UBIF-D 34b modules, which contain bidirectional data queues for each of the four local devices. In a current embodiment each UBIF-D 34b supports a 32-bit data section with associated byte enables, parity bits, and ECC bits. A detailed architect description of the UBIF 34 functional modules is provided below.

Figure 19A:
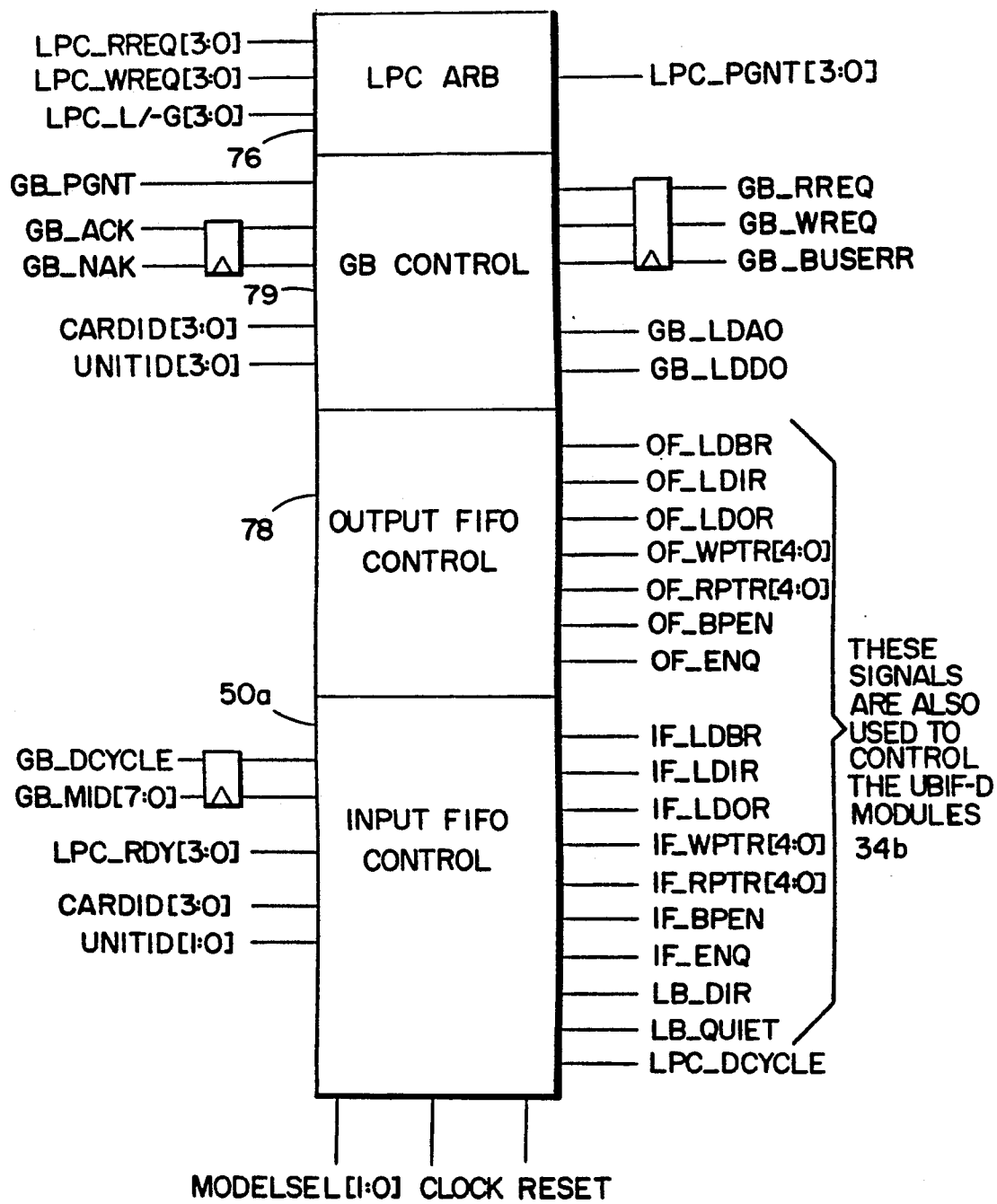
FIG. 19a shows the input and output signals for UBIF control when used in a processor mode.
Figure 19B:
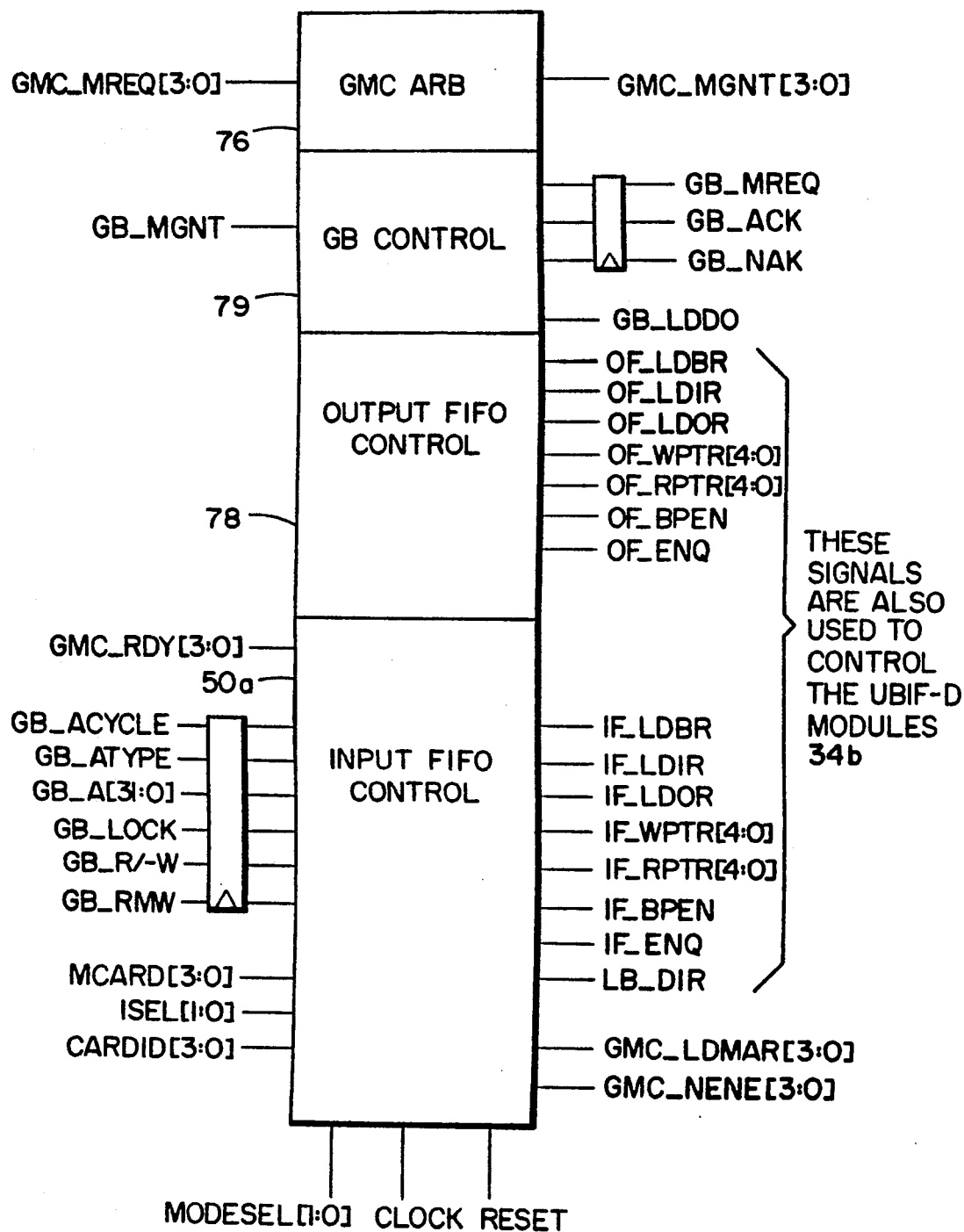
FIG. 19b shows the input and output signals for UBIF control when used in a memory mode.
Figure 20:
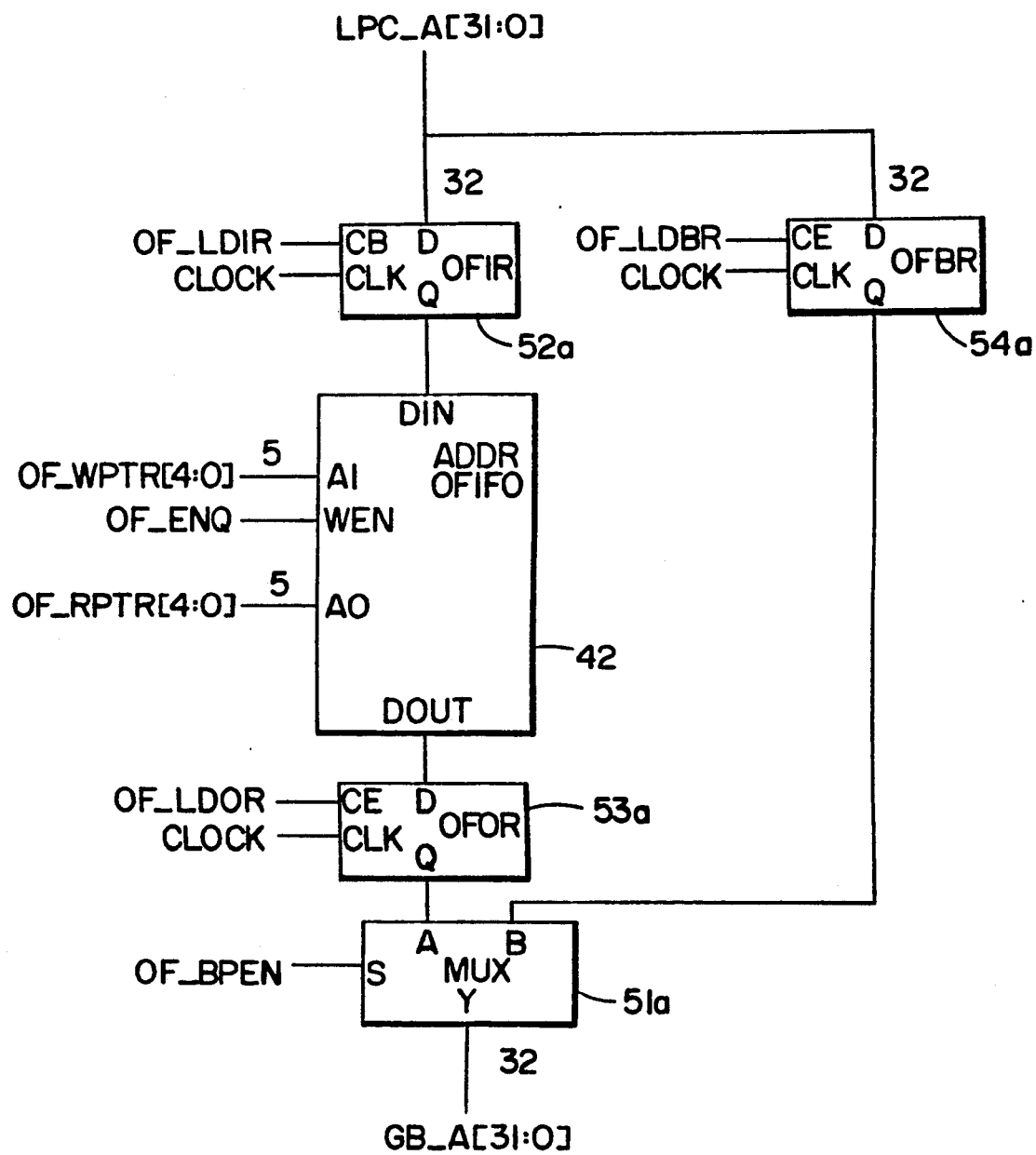
FIG. 20 is a block diagram showing in greater detail the UBIF-A address selection circuitry for use in a processor mode of operation.
Figure 21:
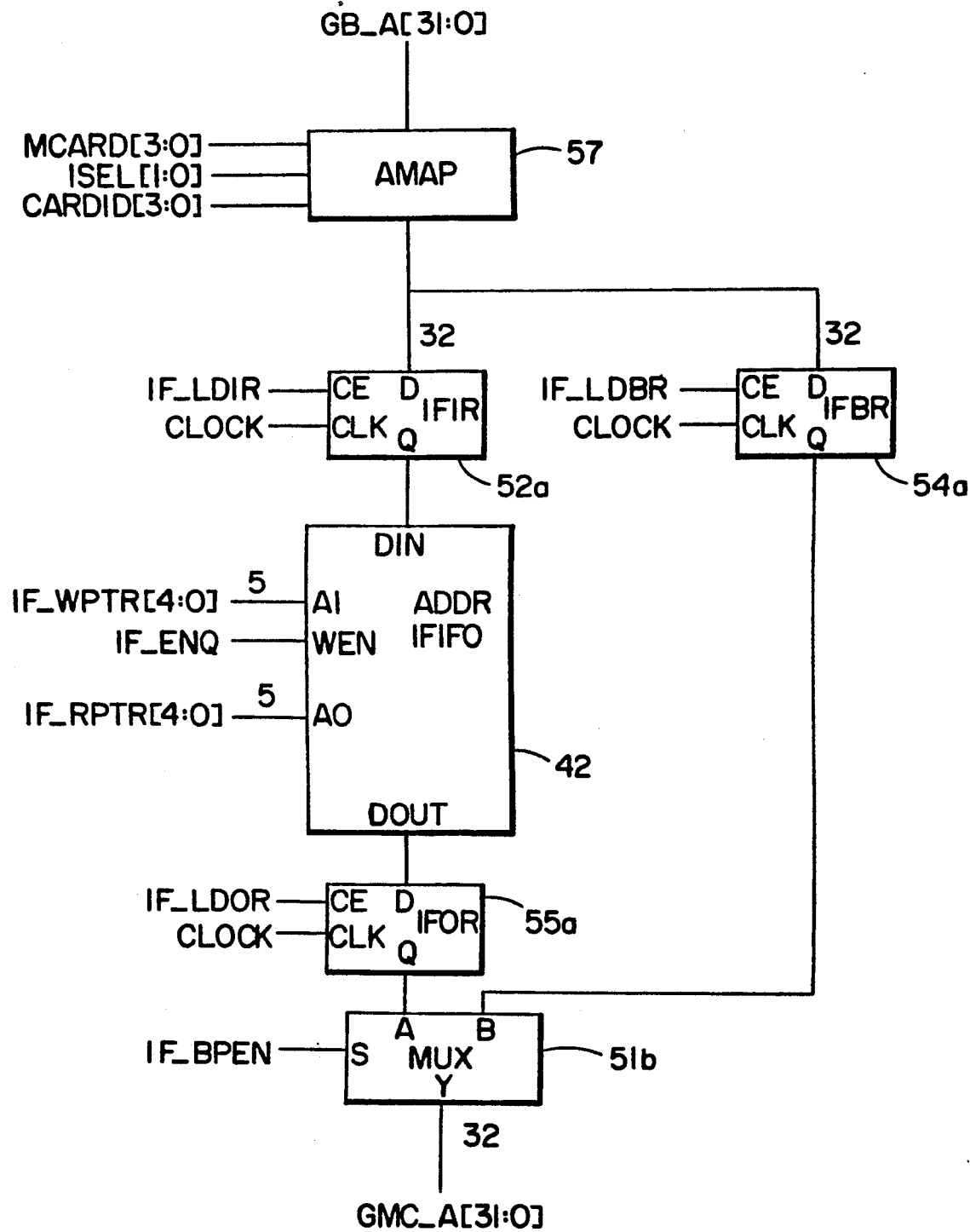
FIG. 21 is a block diagram showing in greater detail the UBIF-A address selection circuitry for use in a memory mode of operation.
Figure 22:
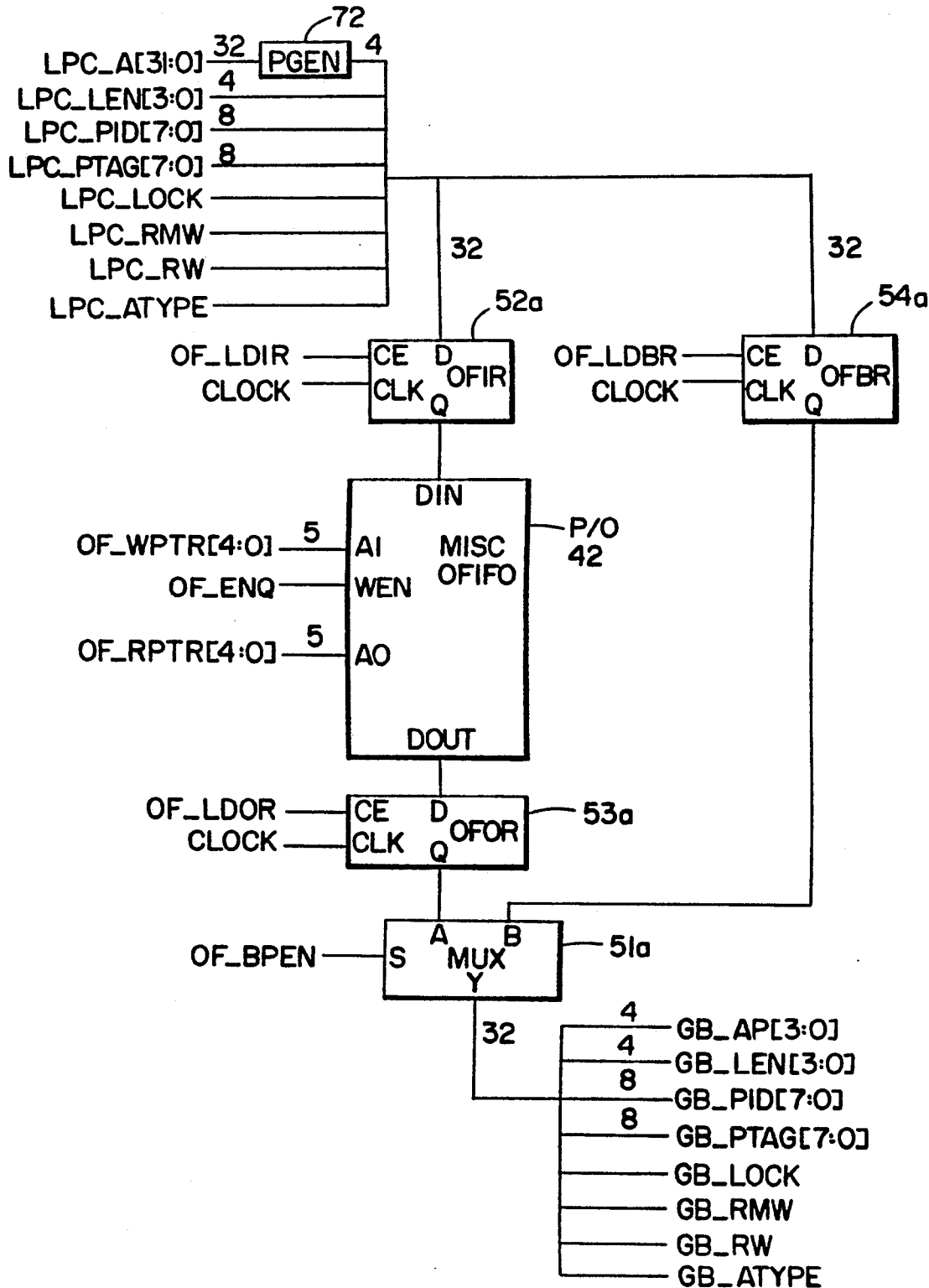
FIG. 22 is a block diagram showing in greater detail additional UBIF-A address selection circuitry for use in a processor mode of operation.
Figure 23:
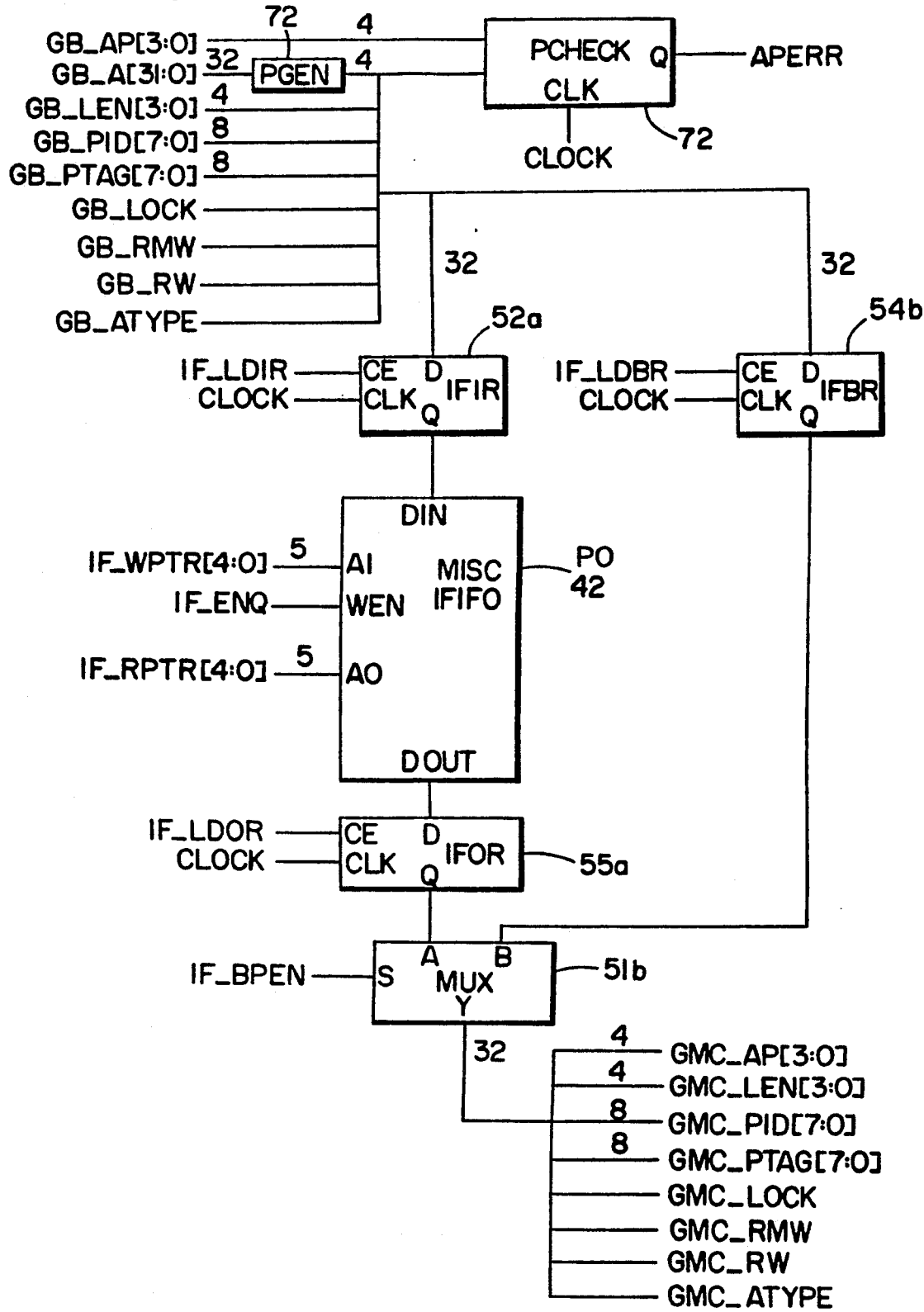
FIG. 23 is a block diagram showing in greater detail additional UBIF-A address selection circuitry for use in a memory mode of operation.
Figure 24:
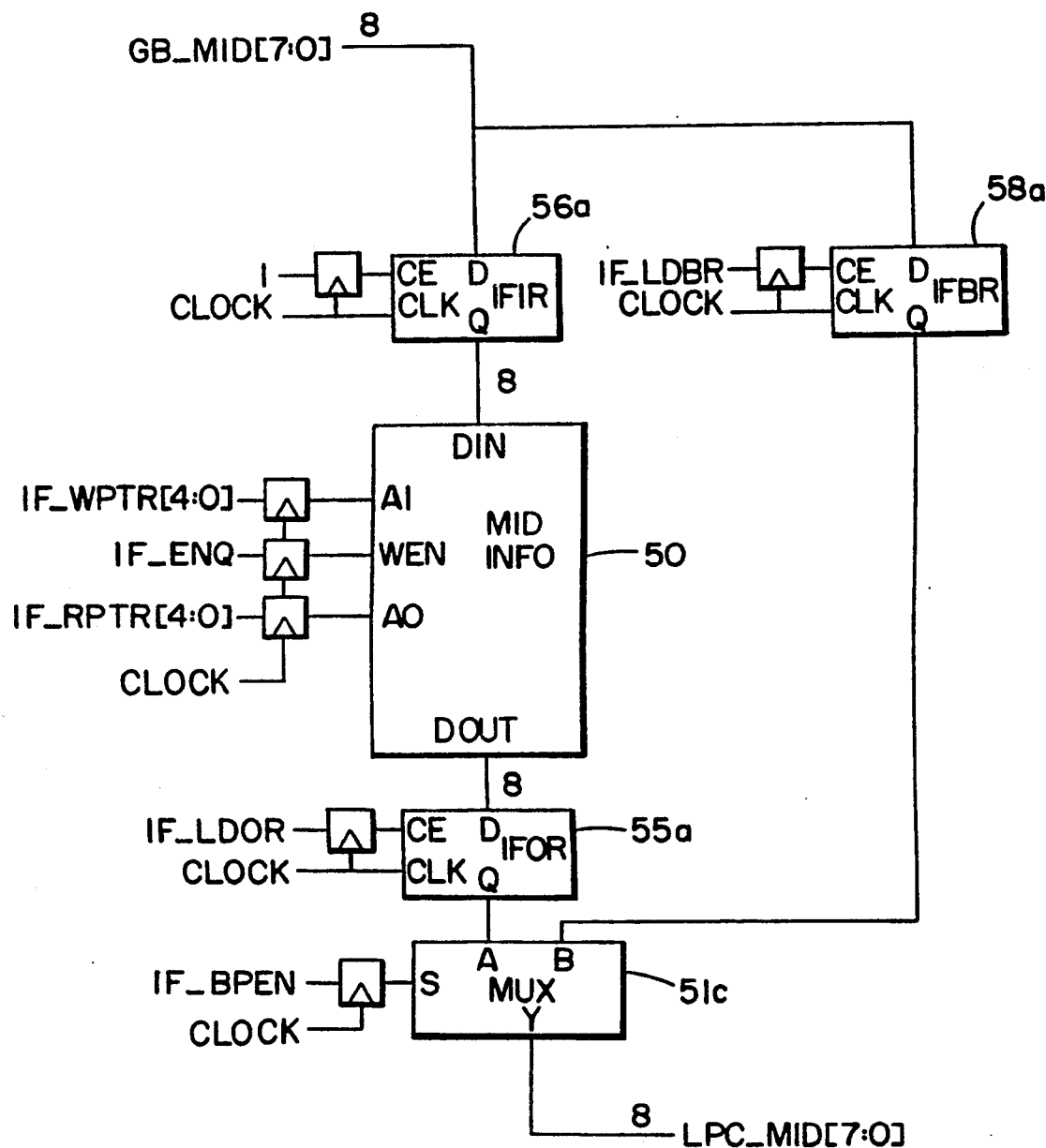
FIG. 24 is a block diagram showing in greater detail UBIF-A MID circuitry for use in a processor mode of operation.
Figure 25:
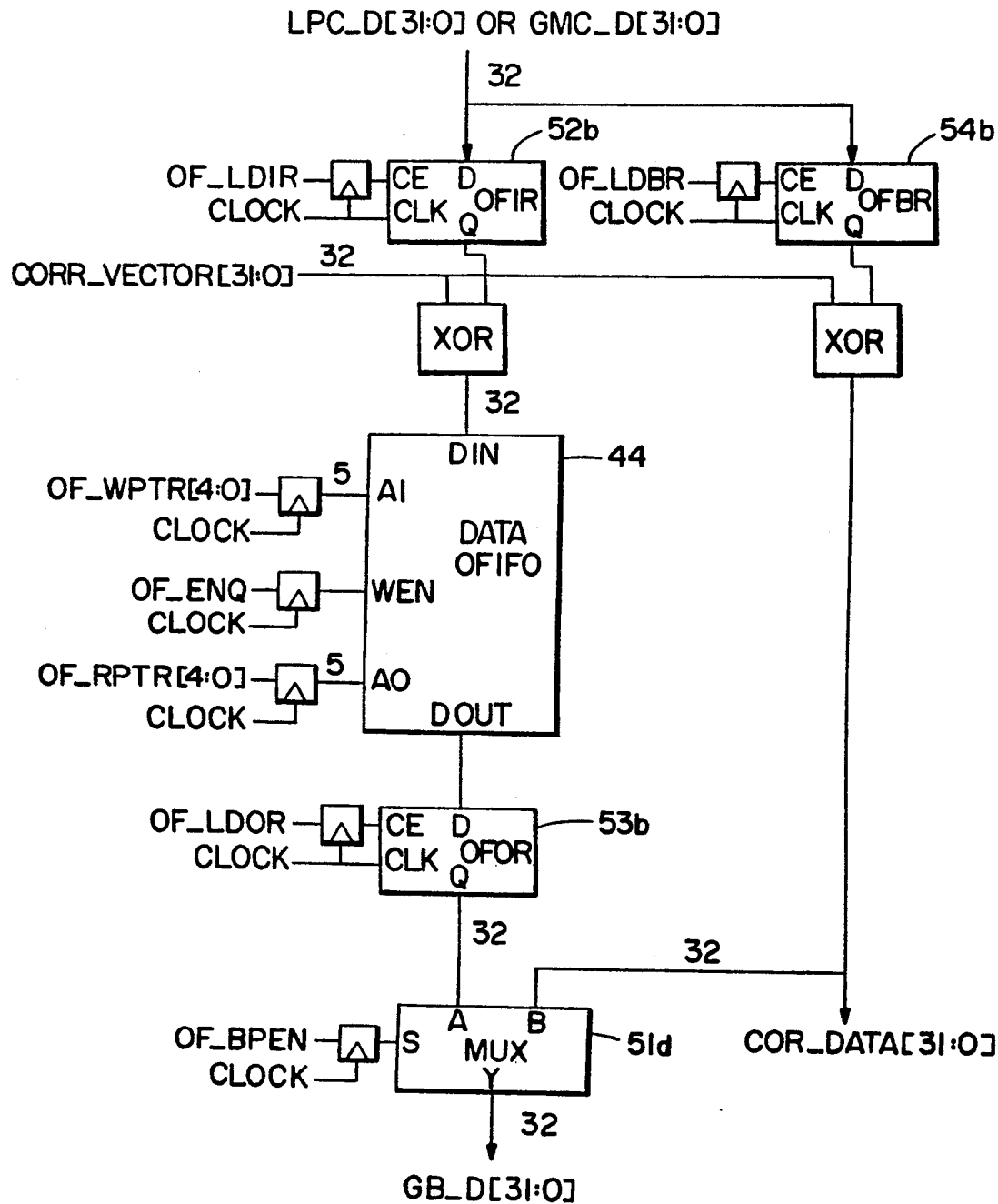

The following defines the various components of the UBIF-A 34a and UBIF-D 34b functional blocks. In addition, Appendix A provides a signal definition of the Global Bus (GB 24), Appendix B provides a signal definition of the Local Processor Card (LPC) bus 32, and Appendix C provides a signal definition of the Global Memory Card (GMC 26a) bus, as implemented in the SVS 10. In addition, FIG. 19a shows the input and output signals for the UBIF controls when used in a processor mode; and FIG. 19b shows the input and output signals for UBIF controls when used in a memory mode. It should be noted that all control signals labeled OF_, IF_, LB_DIR and LB_QUIET are generated by the UBIF_A control sections and are registered internally by the eight UBIF_D modules, as well as by the UBIF_A to control the MID queues. This conforms to the LPC bus 32, GMC bus 26a and GB 24 architecture in so far as which defines pipelined address/data cycles are concerned.

OUTPUT QUEUES 42 and 44: These blocks each contain four independent output queues. Each of the four queues provides eight entries of buffering per local node.

INPUT QUEUES 46: This block contains four independent input queues. Each of the four queues provides eight entries of buffering per local node.

MID OUTPUT QUEUES 48: This block contains four independent MID output queues. Each of the four queues provides eight entries of buffering per local node. As indicated in Appendix A, GB 24 signal lines GB_MID(7:0) convey the returned processor identification (ID) during Global Memory 26 reply cycles and indicate the destination for the returned data. The MID output queues 48 are only used in memory mode.

MID INPUT QUEUES 50: This block contains four independent MID input queues. Each of the four queues provides eight entries of buffering per local node. The MID Input queues are only used in processor mode.

Output FIFO Input Register (OFIR) 52: This register (52a) samples valid local address bus cycles on the UBIF-A 34a, and valid local data bus cycles on the UBIF-D 34b (register 52b). Registers 52a and 52b drive the four output queues contained within blocks 42 and 44, respectively.

Output FIFO bypass register (OFBR) 54: This register samples valid local address bus cycles on the UBIF-A 34a (register 54a), and valid local data bus cycles on the UBIF-D 34b (register 54b). This register is used to bypass the output queues 42 and 44 when an output bypass path is enabled.

Output FIFO Output Register (OFOR) 53: This register latches the selected output from the output queues for transfer to the global bus transceiver 34c.

Input FIFO input register (IFIR) 56: This register samples valid global address bus cycles on the UBIF-A 34a (register 56a), and valid global data bus cycles on the UBIF-D 34b (register 56b). Registers 56a and 56b drive the four input queues contained within blocks 50 and 46, respectively.

Input FIFO bypass register (IFBR) 58: This register samples valid global address bus cycles on the UBIF-A 34a (register 58a), and valid global data bus cycles on the UBIF-D 34b (register 58b). Registers 58a and 58b bypass the input queues 50 and 46, respectively, when an input bypass path is enabled.

Input FIFO Output Register (IFOR) 55: This register latches the selected output from the input queues for transfer to the LPC bus 32.

Input FIFO next-near register (INFR) 60: (UBIF-A 34a only). This register saves, when the UBIF 34 is employed on a Global Memory card 26, the last valid ROW address to a Global Memory bank for comparison with the subsequent ROW address to be issued. The result of this comparison generates GMC_NENE(3:0), which is used to enable fast page-mode DRAM cycles.

Last address register (3:0) (LAR(3:0)) 62: (UBIF-A 34a only). These registers save the current read-lock address and processor identifier, PID(7:0), for each Global Memory bank and are employed to support atomic read-modify-write cycles in Global Memory 26, implemented as read-lock/write-unlock cycles.

Read/modify/write register (RMWR) 64: (UBIF-D 34b only). This register stores Global Memory 26 read data for merging with supplied write data for partial write cycles, as indicated by GB_RMW.

ECC Parity generation (ECC/P) 66: (UBIF-D 34b only). For a UBIF 34 employed with a Global Memory card 26 this logic section computes ECC and byte parity for each of the 32-bit data slices returned from a Global Memory 26 read operation. The computed ECC is registered, along with the Global Memory read data and the supplied ECC, for error detection and correction during a subsequent clock cycle.

Address Map (AMAP) 57: This block takes as input the supplied GB 24 address GB_A [31:0], along with an interleave factor, ISEL [1:0], CARDID [3:0], and MCARD [3:0] lines, and produces a remapped flat address (RAS/CAS), bank select, and address recognize (ADREC) signal to the GB Control 79. This block is only used in memory mode.

Error detection and correction (EDC) 68: (UBIF-D 34b only). This circuitry inputs a computed ECC and a supplied ECC and generates ECCERR, ERRTYPE, and a 32-bit correction vector which is used to correct any single-bit data errors in each 32-bit data slice section.

Parity/ECC generation (P/ECC) 70: (UBIF-D 34b only). This circuitry computes ECC and byte parity on the incoming global bus data. The computed parity is compared with a supplied parity to check for GB 24 data parity errors. GB_DPERR is generated whenever a data parity error is detected. For a UBIF 34 employed with a Global Memory card 26 the computed ECC is stored, along with the supplied data, into a selected Global Memory 26 bank.

Parity generation/checking (PGEN/PCHK) 72: (UBIF-A 34a only). This circuitry computes parity on an incoming address, and compares the computed parity with the supplied address parity. GB_APERR is generated whenever an address parity error is detected.

The following describes the use of the UBIF 34 for each of the card-types in the SVS 10.

Processor Card and I/O Processor Card Support

Figure 3:
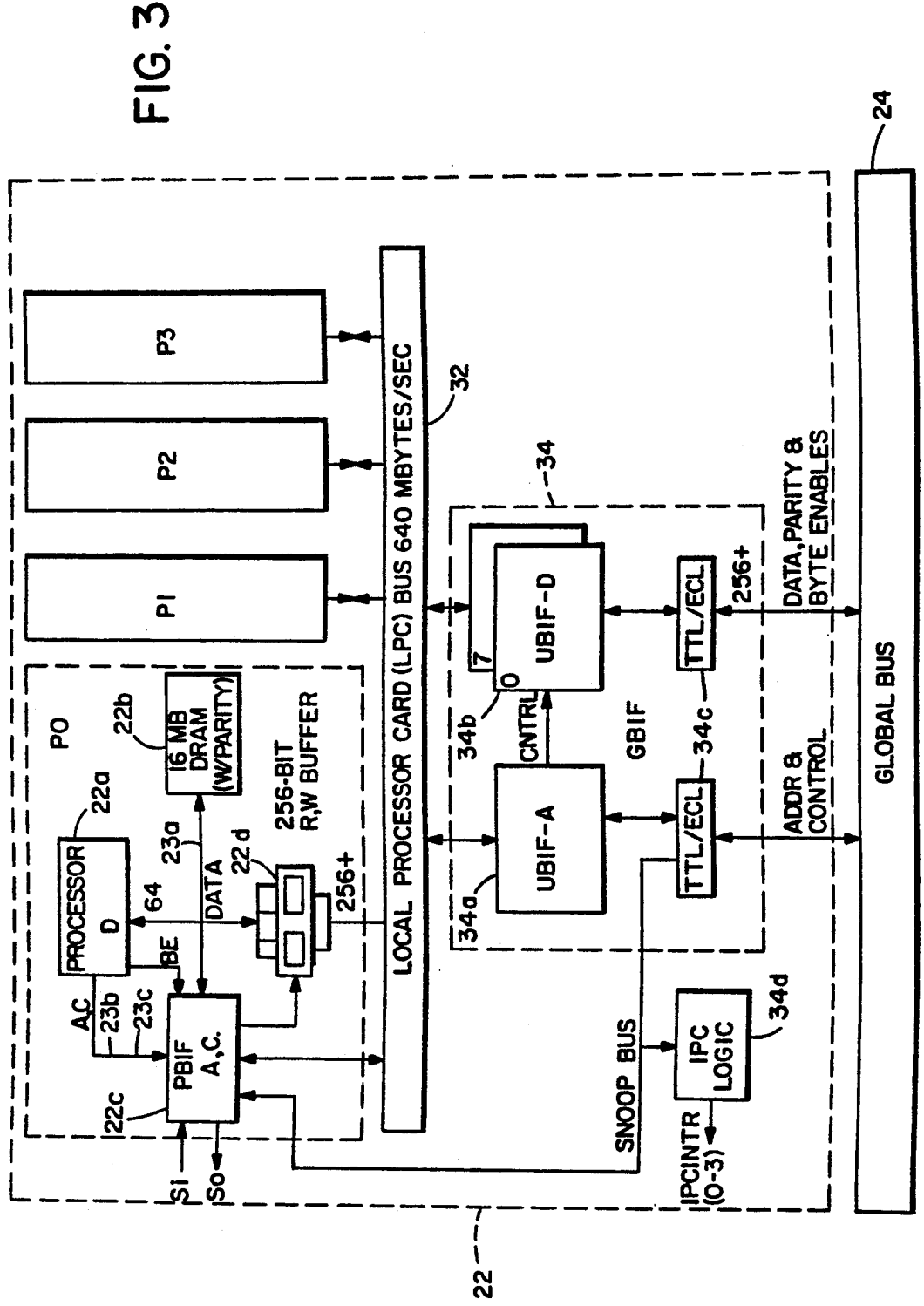
FIG. 3 is a block diagram depicting a SVS processor card architecture.
Figure 4A:
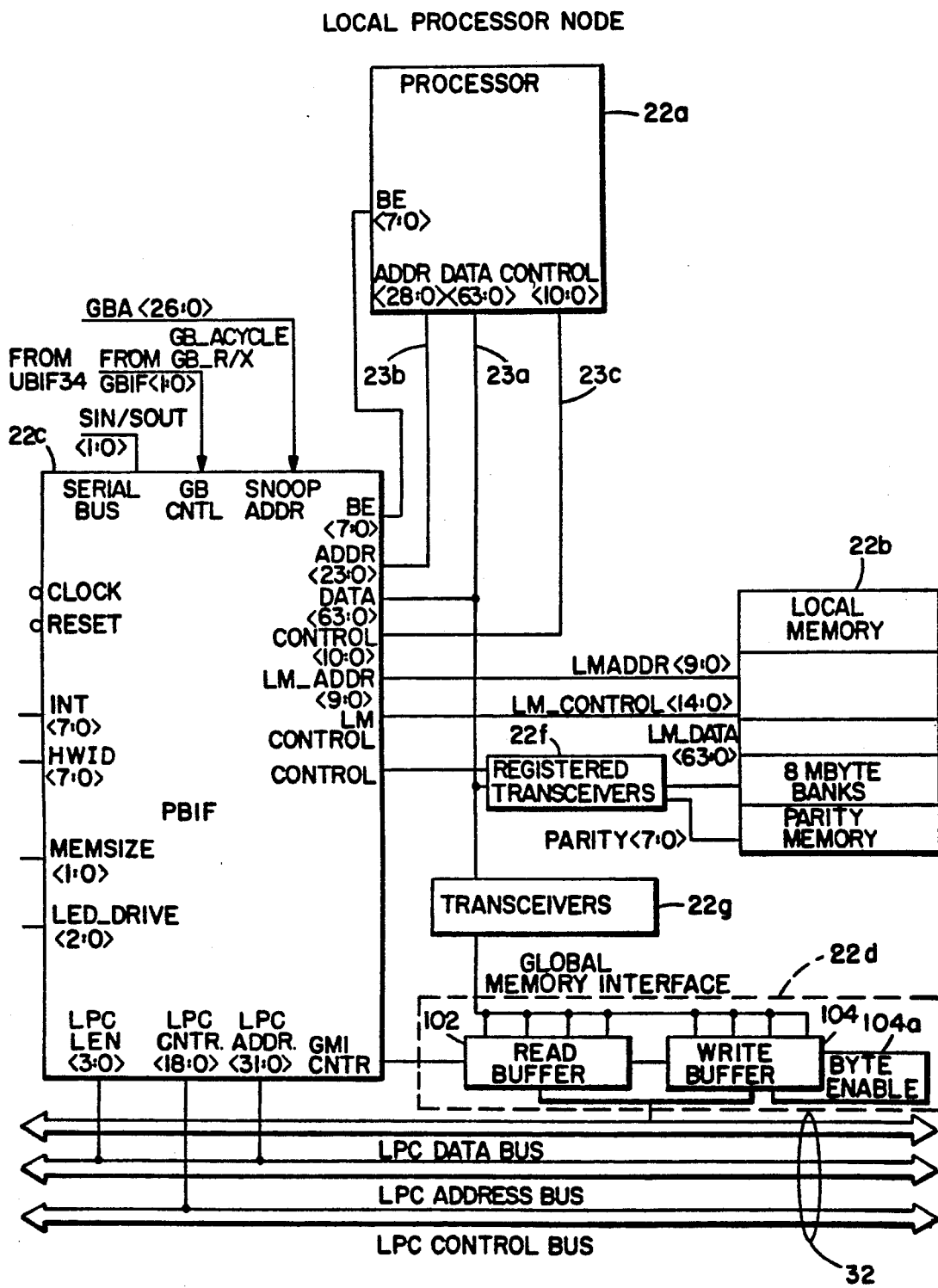
FIG. 4a is a block diagram showing in greater detail the construction of a processor node and the coupling of a processor buffered interface (PBIF) to the node processor, local memory, and a global memory interface.

The following describes the function of the UBIF 34 when employed on the four processor node SVS 10 processor card 22, the I/O Processor Card 28, or the console I/F card 30. FIG. 3 shows a block diagram of the SVS 10 Processor Card 22. The Processor Card 22 includes four identical processor nodes (P0-P3), each including the microprocessor 22a, 16 MB of local, private memory 22b, the bus interface 22d, and the processor bus interface (PBIF 22c). PBIF 22c is coupled to a local processor node data bus 23a and also receives the processor address bus 23b and the control bus 23c (FIG. 4a). The PBIF 22c includes a number of registers, the operation of which will be discussed below. The PBIF 22c is also described in detail in commonly assigned U.S. patent application Ser. No. 07/733,517, filed Jul. 22, 1991, entitled "A Processor Buffered Interface for Multiprocessor Systems" D. Foster et al.

The four processor nodes (P0-P3) share the UBIF 34 through the LPC bus 32. The UBIF 34 provides a common interface to the GB 24. All global read, write, and interprocessor interrupt requests pass through the common UBIF 34.

The sections below describe the functions provided by the UBIF 34 for the four node processor card. Reference is also made to FIGS. 20, 20, 24, 25 and 26 for showing in greater detail the circuitry depicted in the block diagrams of FIGS. 5a and 6.

UBIF 34 Output Section

The UBIF 34 provides independent buffering for each of the four local processors 22a. The UBIF-A 34a output queue 42 provides buffering, for each of the four processor nodes, for up to eight processor read, write, or inter-processor interrupt (IPC) requests. The UBIF-A 34a provides buffering for all address bus (ABUS) signals, including ATYPE, A(31:0), AP(3:0), LEN(3:0,) PID(7:0), PTAG(7:0), R/-W, LOCK and RMW. The UBIF-A 34a also buffers MID(7:0), and supplies all necessary bus control and handshaking signals on the LPC 32 and GB 24. The eight UBIF-D 34b modules (FIGS. 25 and 26) provide buffering for each of the four processor nodes, for data bus (DBUS) signals D(255:0), DP(31:0), BE(31:0), MTAG(7:0), ECCERR, ERRTYPE, and GBDPERR. Each UBIF-D 34b supports a 32-bit data slice, D(31:0), with associated parity, DP(3:0), byte enables BE(3:0), MTAG bit, ECCERR, ERRTYPE, and GBDPERR.

A unique processor identifier PID(7:0), is supplied by a requesting processor 22a to the UBIF 34. PID(7:0) is formed by concatenating HWID(5:0) with the local processor number, LPN(1:0). HWID(5:0) is formed by concatenating a unique UNITID(1:0) and CARDID(3:0), which are supplied to each card from the system backplane. A requesting processor 22a may also tag multiple outstanding read requests using PTAG(7:0), which is subsequently employed to reorder the reply data in that the reply data may return out-of-order. The UBIF 34 passes the supplied PID and PTAG, along with the remaining address bus signals, to the GB 24.

For the illustrated embodiment, each processor 22a may have only one outstanding read request (a limitation imposed by the processor and not by the UBIF 34), but may have multiple outstanding write requests. Each output queue 42 and 44 typically contains zero to some small number of Global Memory 26 write requests, followed by at most one Global Memory 26 read request. Once there is at least one pending r/w request in any of the output queues 42 and 44, the UBIF 34 output controller 78 requests the GB 24 to dispatch the buffered requests.

Local Bus Arbiter

The LPC 32 arbiter (LPC ARB) 76 supports up to four local devices requiring access to the LPC 32 for request or response cycles to other devices on the LPC 32 or the GB 24. On the processor card 22, the four processors 22a issue requests to the LPC 32 arbiter 76 for sending read/write (r/w) requests to the Global Memory 26 subsystem.

Normally, the UBIF 34 is the master of the LPC bus 32, and has the highest priority for regaining access to the LPC 32 Data Bus (LPC-D) for returning Global Memory 26 read data to a processor 22a. Thus, the UBIF 34 typically immediately returns read data to a processor 22a, but grants the LPC-D to a processor 22a to issue write data to a local I/O device or to the GB 24. The LPC 32 address bus (LPC-A) is driven only by local master devices, and not by the UBIF 34.

The LPC ARB 76 employs a round-robin arbitration technique to grant access to the LPC bus 32, but gives a top priority to the UBIF 34 when the UBIF 34 requires use of the LPC 32. As with the GB 24, the LPC-D and LPC-A are decoupled and pipelined, which implies that during any given LPC 32 cycle, the address bus may be used by a master device, while the data bus may be used by slave devices. Thus, the LPC ARB 76 may grant the LPC-A to a processor 22a to issue a read request while the UBIF 34 is returning global read data to another local processor 22a via the LPC-D.

The LPC ARB 76 also monitors the state of the UBIF 34 output queues 42 and 44 so as not to grant the LPC 32 to a processor 22a wishing to issue a GB 24 r/w cycle when the processor's output queue is full. The LPC ARB 76 grants the LPC 32 to a processor 22a to issue local r/w request cycles, even though the corresponding Global Bus output queue is full.

Output Queue Control

Each output queue 42 and 44 is controlled by an independent input stage controller and output stage controller. The input stage controller, embodied within the IFIFO_CNTRL 50a, awaits a processor 22a r/w request and enqueues the request onto its associated output queue. The LPC ARB 76 grants the LPC bus 32 to a requesting device only if there is an open entry in the corresponding output queue to store the request. The output stage controller arbitrates for the UBIF 34 outgoing bus whenever there is a pending request in its queue and waits, if necessary, for a GB 24 acknowledge before proceeding to process another pending request.

Given that an acknowledgement is required in response to a read or write request, multiple buffered write requests from any particular processor 22a are prevented from appearing on the GB 24 as consecutive cycles.

Output Dequeue Control

Each output queue 42 and 44 also has a corresponding dequeue controller embodied within the OFIFO_CNTRL 78, which is responsible for dequeueing processor 22a requests from the output queues 42 and 44 after the requests are successfully transferred to a destination device on the GB 24. A four way round-robin arbitration technique is employed to select which processor 22a queue is chosen for dispatch to the GB 24. Processor 22a r/w requests are dequeued after receiving a valid ACK signal from a destination device. Requests are also dequeued if no ACK/NAK signal is received from any destination device, thus indicating an unrecognized address. The processor 22a r/w request is retried so long as a valid NAK signal is received. However, processor 22a IPC interrupt cycles, destined for the local SVS 10 system unit (as determined by LEN(2:1)=00) do not require ACK/NAK handshaking and are dequeued once transferred to the output register (OFOR). As will be described below, Interprocessor Communication (IPC) interrupt cycles that are destined for a remote SVS 10 system unit use the same ACK/NAK, retry, and abort mechanism as normal GB 24 processor 22a request cycles.

Output Bypass Path

A bypass path is provided in the UBIF 34 output to allow processor 22a r/w requests to flow directly from the LPC 32 to the GB 24, passing only through the OFBRs 54a, 54b and the TTL/ECL registered transceiver 34c. This bypass path is enabled when the corresponding output queue 42 or 44, for the given processor 22a, is empty, and when there are no pending requests in any other processor's output queue which are also waiting for access to the GB 24. It is noted that there may be other processor 22a requests in the output queues 42 and 44 pending an ACK/NAK indication. However, these other requests may not be waiting for access to the GB 24, thus enabling the use of bypass path for the given processor 22a. However, the bypass path cannot be used by a processor 22a having any pending request in its output queue, in order to preserve sequential order. Also, all processor 22a requests are stored in their corresponding output queue pending an ACK/NAK indication, since a NAK indication implies a retry. Thus all processor 22a r/w requests are stored in their corresponding output queues 42 and 44 until successfully accepted by the destination device, or until aborted due to an error condition (i.e., a bus timeout or unrecognized GB 24 address).

Global Bus Parity Protection

Parity protection is used on the GB 24 address bus, A(31:0), and data bus, D(255:0). The UBIF 34 output stage generates data parity with ECC/P 66 when driving the GB 24, while the UBIF 34 input stage checks data parity with P/ECC 70 when receiving from the GB 24. GB_APERR is issued by the UBIF_A upon detecting bad parity on A(31:0), as compared to the received address parity bits AP(3:0). GB_DPERR is issued by the UBIF-D 34b modules upon detecting bad parity on D(255:0), as compared to the received data parity bits, DP(31:0). These GB 24 parity error signals are monitored by the console processor interface. During Global Memory 26 reply cycles, LPC_GBPERR is returned to the requesting processor 22a, along with the read data, and reflects the parity status of the data received from the GB 24.

Global Bus 24 Retry Timing

Figure 11:
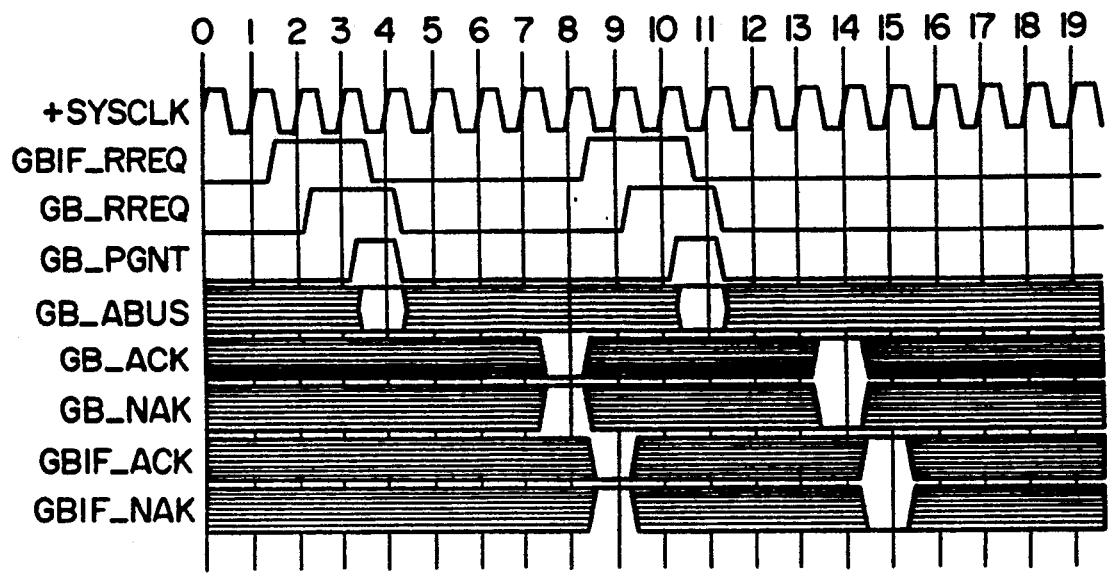
FIG. 11 is a timing diagram that depicts a read-retry timing sequence on the global bus.

FIG. 11 illustrates a typical read-retry timing sequence on the GB 24, as viewed by the requesting UBIF 34. As shown, the maximum bus retry frequency per processor is seven cycles (or 182 MB/second assuming 40 MHz). Also shown is the maximum data rate at which back-to-back requests from a single processor 22a may be output to the GB 24, which is eight cycles (or 160 MB/second assuming 40 Mhz). The extra cycle, as compared with the retry timing, is a result of dequeueing the previous request and accessing the next processor 22a request in the output queue. The UBIF 34 advances the dequeue pointer after receiving an ACK or bus timeout indication.

Mixed Mode Processor Requests

Figure 12:
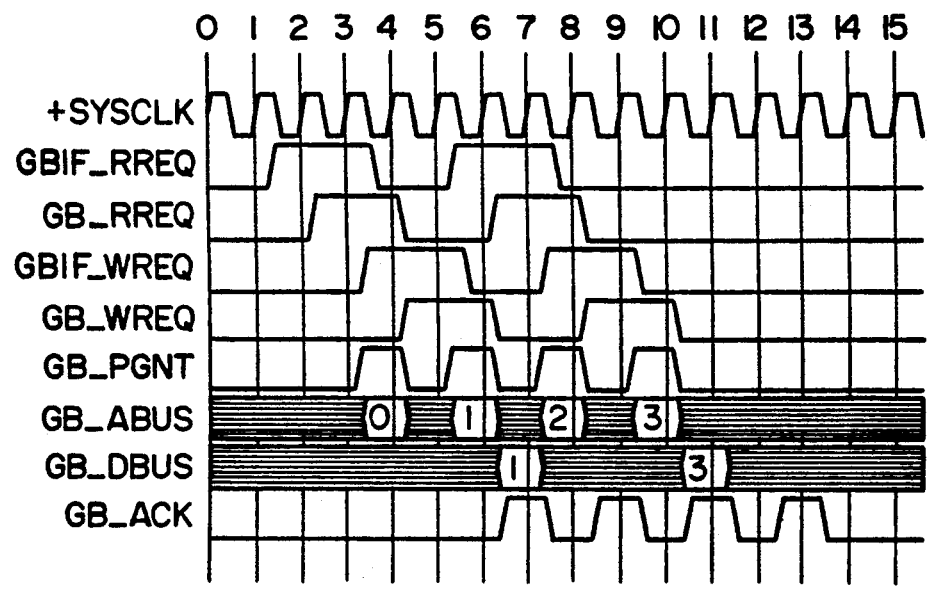
FIG. 12 is a timing diagram that depicts mixed mode accesses on the global bus.

FIG. 12 illustrates a timing sequence on the GB 24 bus for issuing back-to-back, mixed mode processor 22a request cycles from a single UBIF 34. In this timing sequence, it is assumed that the UBIF 34 has one (or more) processor 22a request(s) from each of the four local processors 22a and that the UBIF 34 is given immediate access to the GB 24. As shown on this timing diagram, a read-request is issued for a first processor 22a (P0), followed by a write request from P1, a read request from P2, and a write request from P3. Should any of the issued processor 22a requests be NAKed, the UBIF 34 re-issues the appropriate request.

IPC Interrupt Support

Inter-processor interrupt cycles are supported though the use of IPC-specific LPC bus 32 and GB 24 cycles. From the point of view of the UBIF 34 output section, processor 22a r/w cycles and IPC interrupt cycles are indistinguishable. A processor 22a node generates an IPC interrupt cycle by requesting the local processor card 22 address bus (i.e., issuing LPC_RREQ(i) with LPC_L/-G(i)=0) and tagging the ABUS type as an IPC interrupt cycle. For IPC interrupt cycles, LPC LPC_ATYPE=0,LPC_A(31:0) specifies a processor 22a select mask, and LPC_LEN(3:0) specifies a processor 22a group select. LPC_R/-W, LPC_LOCK, and LPC_RMW are not defined for the IPC interrupt cycle. The UBIF 34 enqueues IPC interrupt cycles as normal processor 22a r/w request cycles. The UBIF 34 input section, however, decodes and interprets IPC interrupt cycles differently from normal processor 22a r/w request cycles.

Processor IPC interrupt cycles destined for the local SVS 10 system unit (as determined by LEN(2:1)=00) do not require ACK/NAK handshaking and are dequeued once transferred to the UBIF 34 output register 32c. However, IPC interrupt cycles destined for a remote SVS 10 system unit use the same ACK/NAK, retry, and abort mechanism as do other GB 24 processor 22a request cycles.

UBIF 34 Input Section

The UBIF 34 input section on the four node processor 22a card is employed to buffer reply data returned by the Global Memory 26 subsystem. The UBIF 34 input section monitors the GB 24 on a cycle-by-cycle basis whenever it has any pending read requests for any of the four associated local master devices. Thus, given any pending global read cycle, the input queue input registers, IFIR 56a and 56b, respectively, sample the GB 24 D-bus on every cycle and conditionally store the registered data into the appropriate input queues whenever a match occurs. Decoding is performed by matching the most significant memory identifier bits, MID(7:2) with the UBIF's hardware ID, HWID(5:0), which is formed from UNITID(1:0) and CARDID(3:0), and then employing MID(1:0) to select the local node.

Global Bus Data Parity Checking

As was stated, the UBIF 34 input section computes parity for the data received D(255:0) and compares the computed parity, with the received data bus parity DP(31:0), for errors. Each UBIF-D 34b checks the validity of its corresponding 32-bit data slice and generates a data parity status signal, GBDPERR, on every GB 24 cycle. The eight GB 24 data parity error lines, GBDPERR(7:0) are ORed together to form a composite GB_DPERR signal which is driven to the system backplane for error reporting. The eight UBIF-D 34b modules also return their corresponding GBDPERR signal along with the reply data during LPC 32 bus reply cycles, which are ORed together to produce the composite LPC_GBDPERR signal. This composite data parity status signal is employed to generate an interrupt to the processor 22a accepting the returned data.

UBIF 34 Input Bypass Path

The UBIF 34 input bypass (IFBR 58a and 58b) enables Global Memory 26 reply cycles to bypass the input queue 46 for a particular processor 22a whenever the processor's corresponding input queue is empty and the LPC bus 32 is available to the UBIF 34. Otherwise, reply data is enqueued into the corresponding processor 22a input queue 46 for subsequent transfer over the LPC 32 bus.

Reply Cycle ACK/NAK handshaking

It should be noted that there is no ACK/NAK handshaking involved for GB 24 or LPC 32 bus reply cycles, in that it is assumed that the requesting processor 22a may always accept read data once the processor 22a asserts the LPC bus 32 ready line, LPC_RDY(i).

Input Queue Control

Each UBIF 34 input queues 46 and 50 are independently controlled by an input stage controller and an output stage controller. The input stage controller monitors the GB 24 for valid memory reply cycles which match a corresponding hardware ID. A match occurs when a valid GB_MID(7:2), conditioned by GB_DCYCLE, equals HWID(5:0), while the least significant two MID bits, GB_MID(1:0), select one of the four processor 22a input queues 46. Assuming that the input bypass path is enabled and no other replies exist in the processor's input queue, a valid GB 24 reply is passed on to the LPC 32 bus. Otherwise, the input stage controller enqueues the received reply into the corresponding input queues 46 and 50 for subsequent transfer to the LPC 32 bus. The result of the received data parity error status is also returned along with the reply data. The UBIF-D 34b modules buffer D(255:0), MISC, EC- CERR, and ERRTYPE, while the UBIF-A 34a buffers MID(7:0). All UBIF 34 modules independently monitor the GB 24 data bus signals, GB_DCYCLE, GB_MID(7:0), and their corresponding reply bits and perform the same control functions in parallel.

The output stage controller is responsible for returning enqueued reply cycles to the local devices. Given any enqueued reply, the output stage controller arbitrates for the LPC bus 32, if necessary, and returns memory replies to processors 22a that are ready, as indicated by LPC_RDY(i). A round-robin arbitration technique is used to issue replies to each local device whenever multiple input queues contain data. The UBIF 34 has a highest priority for the LPC 32 data bus.

Typical Processor 22a R/W Timing Sequences

FIGS. 7-10 illustrate various processor 22a read and write timing sequences on the LPC 32, UBIF 34 output bus, and GB 24.

Figure 9:
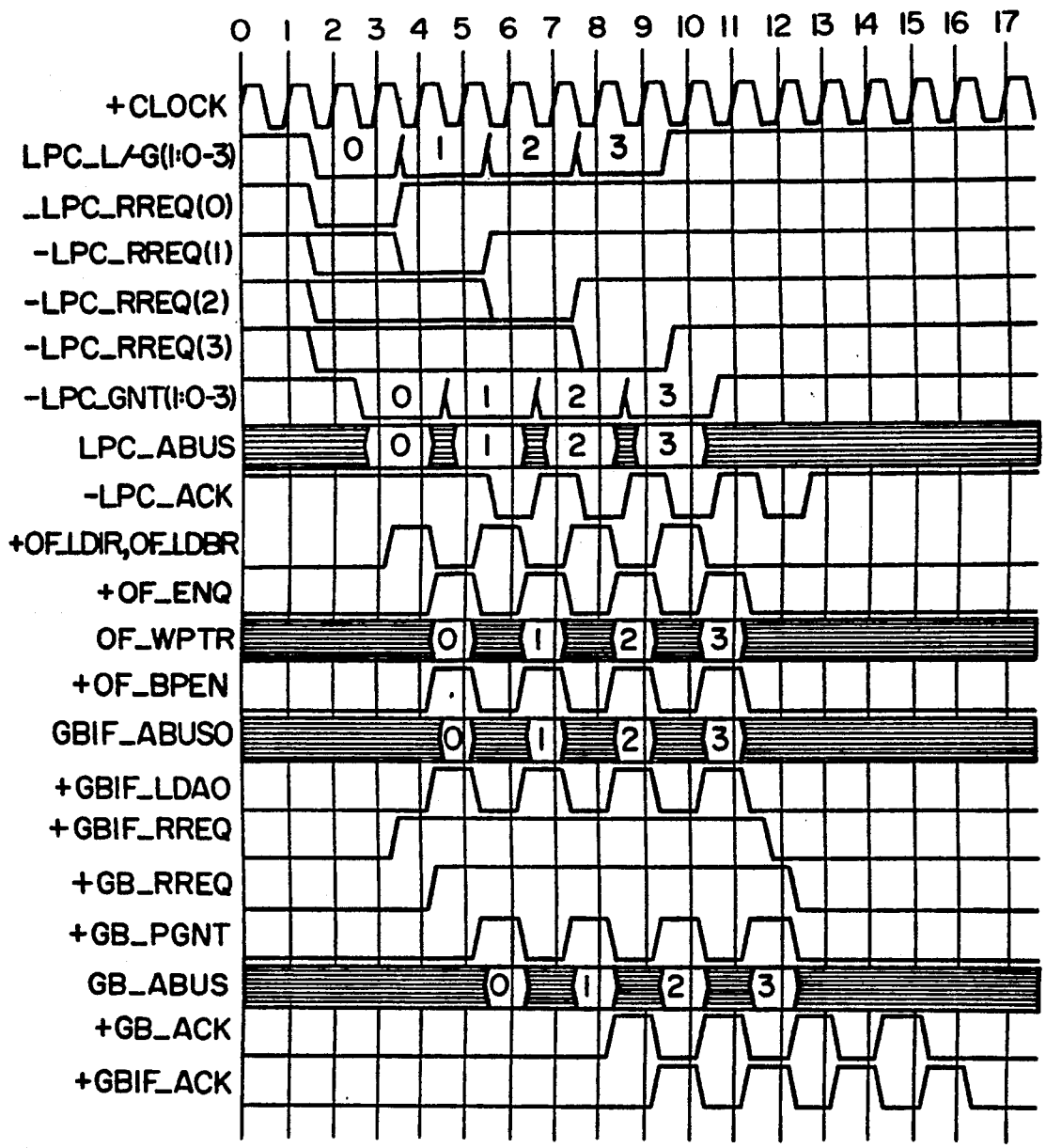
FIG. 9 is a timing diagram depicting a four processor local-to-global bus read timing.
Figure 10:
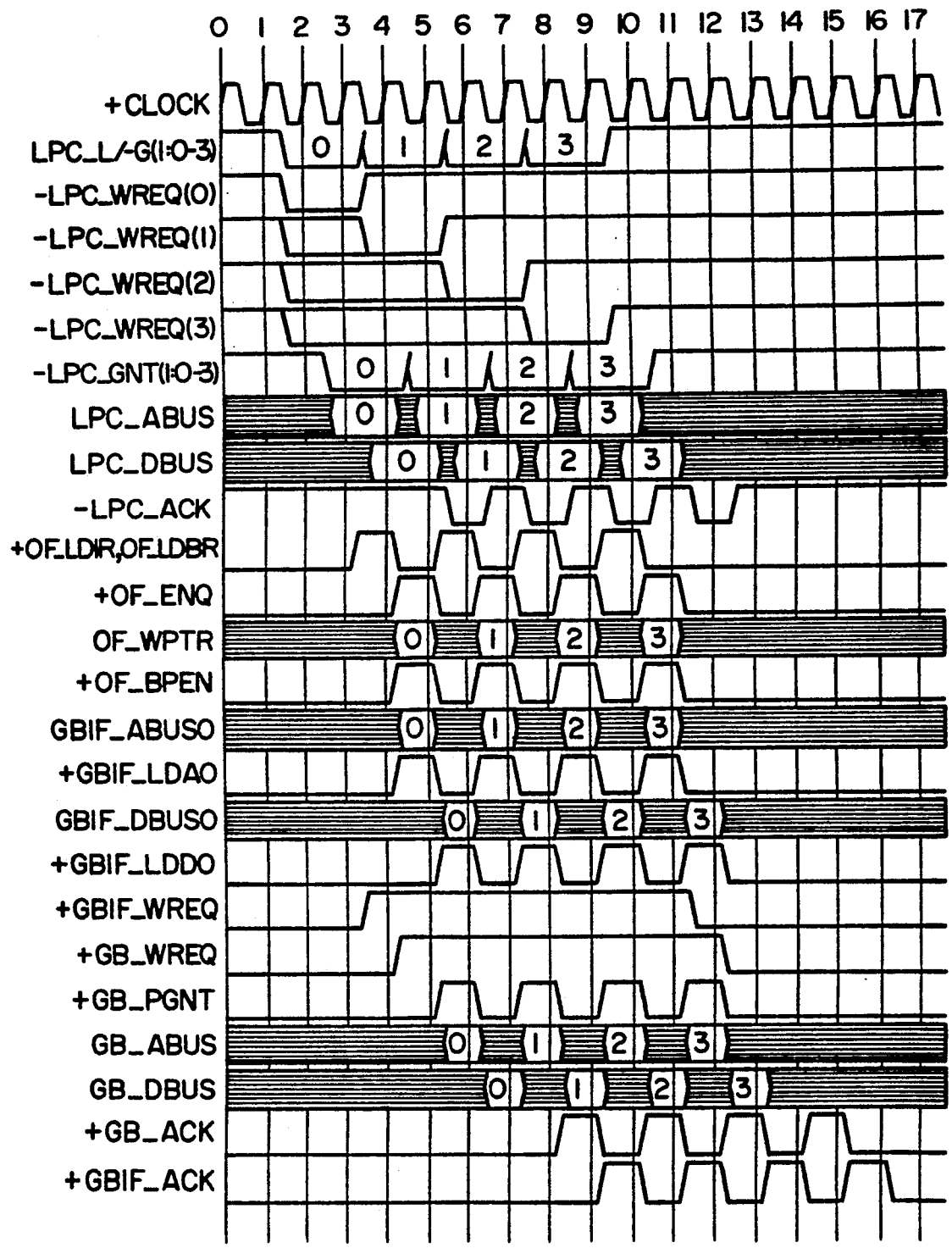
FIG. 10 is a timing diagram depicting a four processor local-to-global bus write timing.

The timing sequences shown in FIGS. 9 and 10 assume that all four local processors 22a issue simultaneous (or consecutive) Global Memory 26 requests on the LPC 32 and that all UBIF 34 processor 22a output queues are empty. The priority order for granting the local bus assumes that processor (0) has highest priority at the start of the timing sequence (i.e. at bus cycle 2). Furthermore, the GB 24 arbitration timing assumes that no other UBIF 34 is attempting to use the GB 24, thus the local UBIF 34 is given exclusive access to the GB 24. As illustrated by the timing diagrams, each processor 22a is given access to the LPC 32 in priority order so as to issue their corresponding Global Memory 26 request. Since all internal queues are assumed for this example to be empty at the start of the sequence, and given that no other UBIF 34 is simultaneously requesting the GB 24, all processor 22a r/w requests pass through the UBIF 34 in a single cycle (through OFBR 54a and 54b) and are latched into the external UBIF 34 TTL/ECL output registers 34C for transfer over the GB 24. Each processor's r/w request is also stored in its corresponding output queue 42 and 44, pending the receipt of an acknowledge ( i.e. ACK) from the destination device. In the event of no acknowledge (i.e., NAK) the UBIF 34 output stage retries the cycle. Thus, all processor 22a r/w requests are stored in their corresponding output queues 42 and 44 until successfully accepted by the destination device, or aborted due to an error condition (i.e., a bus timeout or unrecognized GB 24 address).

Inter-Processor Communication (IPC) Support

As was noted above, the SVS 10 includes a direct inter-processor communication (IPC) mechanism, which allows processors 22a to send interrupts to a single processor 22a, or to a set of processors 22a. This IPC mechanism is supported in hardware, both in the processor 22a node and UBIF 34, and is implemented using a special bus cycle, on the GB 24 and Local Bus 32, which is tagged as an interrupt message cycle. In this regard reference is made to the definition of the GB_ATYPE signal in the GB 24 signal definition of Appendix A. The IPC interrupt detection mechanism is implemented externally to the UBIF 34.

Figure 13:
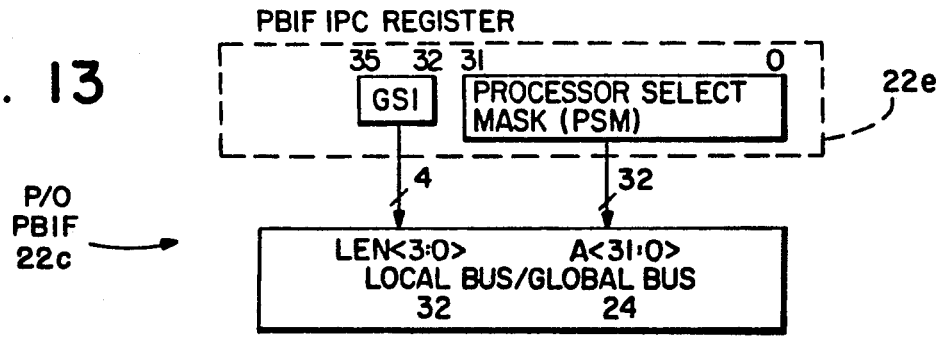
FIG. 13 shows an Interprocessor Communication (IPC) interrupt message format and circuitry.

FIG. 13 illustrates the composition of an interrupt message packet, as generated by a processor 22a node. The PBIF 22c includes a 40-bit r/w IPC register (IPCR) 22e, comprised of a four bit group select identifier (GSI), and a 32-bit processor select mask (PSM).

The four bit group select field specifies a SVS 10 system unit (one of four) and processor set (i.e., computation processors 22a or I/O processors 28a) as the destination group for the interrupt message. The 32-bit PSM field specifies which processor(s) within the selected processor group are to receive the interrupt. A value of one in bit position (i) of the PSM field enables processor (i) to receive the interrupt. Thus, any system processor is enabled to transmit an interrupt to any other processor or set of processors within a selected group by issuing a single IPC interrupt message cycle. The selected group may be the 32 computational processors 22a, I/O processors 28a, or the console processor within the local SVS 10 system unit or remote system unit, assuming a multi-unit configuration.

Interrupt message cycles appear as special address cycles on the LPC 32 bus and GB 24, as indicated by LB_ATYPE=0 and GB_ATYPE=0, respectively, where LEN(3:0) and A(31:0) specify the group select identifier and processor select mask, respectively. An interrupt message cycle is initiated by writing the required value to the IPC interrupt register 22e in the PBIF 22c (FIGS. 4a and 4b) and then writing any value to a Send Interrupt Register (SIR). The PBIF 22c issues an IPC interrupt cycle on the LPC 32 bus, using the current value in the IR 22e, which enqueues the interrupt message cycle in the UBIF-A 34a output request queues 42 and 44. The UBIF-A 34a subsequently issues a corresponding IPC interrupt cycle on the GB 24.

The PBIF 22c and UBIF-A 34a issue normal read requests to the LPC bus 32 and LPC ARB 76, respectively, to issue IPC interrupt cycles. IPC interrupt cycles destined for the local SVS 10 system unit, as determined by LEN(2:1), require no ACK/NAK handshaking and are dequeued after they are transferred to the GB 24 TTL/ECL register 34c. IPC interrupt cycles destined for a remote SVS 10 system unit use the identical ACK/NAK, retry, and abort mechanism as normal GB 24 processor 22a request cycles.

Figure 14:
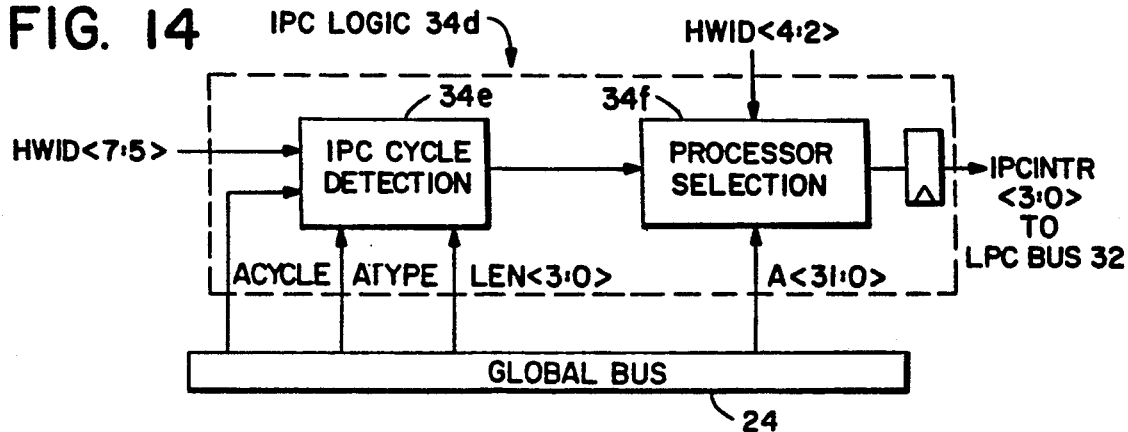
FIG. 14 shows a timing diagram also illustrating IPC logic.

As illustrated in FIG. 14 the IPC logic 34d of each UBIF 34 monitors the GB 24 address bus, on a cycle-by-cycle basis, for the occurrence of an interrupt message cycle, as indicated by GB_ATYPE=0. Cycle detection logic 34e, upon detecting a valid IPC cycle, causes Processor Selection logic 34f to compare the specified four bit group select identifier with the corresponding hardware identifier, HWID(4:3), to determine if it has been selected to receive an interrupt. If selected, the UBIF 34 uses HWID(2:0) to select the appropriate four bit field within the processor select mask corresponding to its local processors and issues a one-clock cycle interrupt signal, LPC_IPCINTR(3:0), to each of the selected local processors. A summary of the interrupt selection mechanism is provided below.

The state of GSI(3) selects computation processors 22a or I/O processors 28a. This field is compared with HWID(5). GSI(2:1) selects the destination SVS 10 system unit. This field is compared with HWID(7:6). HWID(4:2) is employed to select one of the eight, four bit fields within the processor select mask field. IPCINTR(3:0) are the select processor interrupt signals, each of which is coupled to an interrupt input of an associated one of the processors 22a or 28a.

The PBIF 22c uses the interrupt signal, LPC_IPCINTR(i), to set an internal IPC interrupt bit in a processor interrupt register which causes a processor interrupt, if the processor has interrupts enabled. After the interrupt is serviced, software executed by the interrupted processor resets the IPC interrupt bit by writing a one to the corresponding bit in a clear interrupt register (CIR 92c, FIG. 4b).

I/O Processor Card 28 Support

Figure 15:
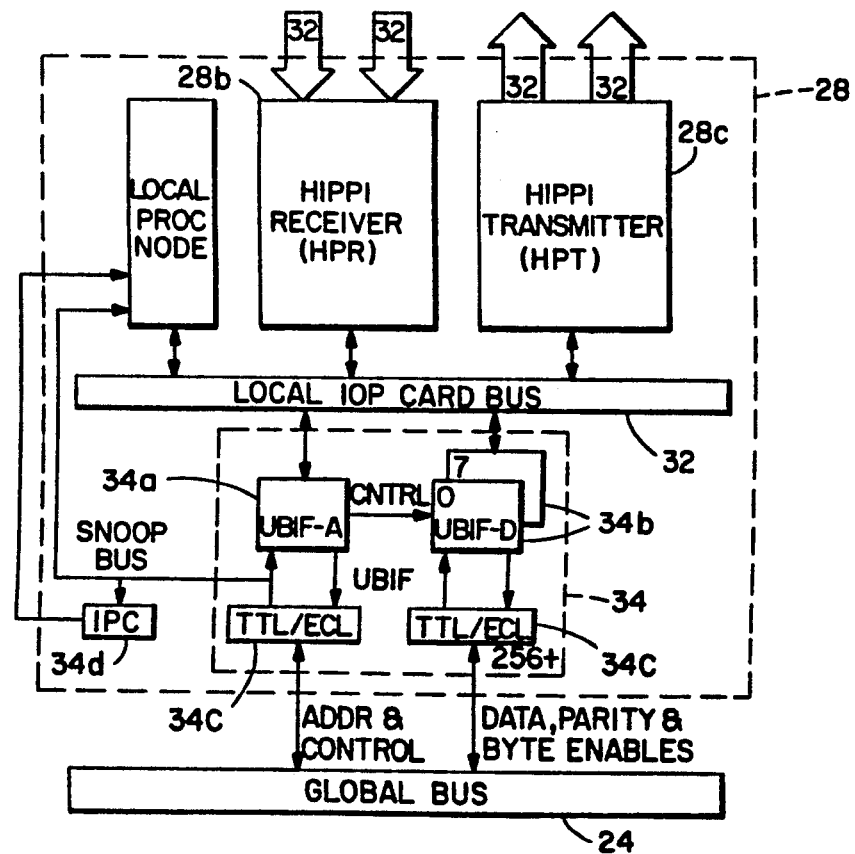
FIG. 15 is a block diagram showing an I/O processor card.

FIG. 15 is a block diagram of a SVS 10 I/O Processor Card 28. The I/O processor card 28 includes a processor node P0, which is identical to one of the nodes on the Processor Card 22, two HIPPI receivers 28b and two HIPPI transmitters 28c, each of which implement 100 MB/second unidirectional channels. The section 28c includes two HIPPI transmitters, whereas the HPR section 28b includes two HIPPI receiver channels. Within the HPT 28c and HPR 28d the two channels provide two, 100 MB/second communication channels. The operation of the I/O Processor Card is described in commonly assigned U.S. patent application Ser. No. 07/734,359, filed Jul. 22, 1991, entitled "High Performance I/O Processor".

As with the processor card 22, the UBIF 34 of the I/O processor card 28 provides a shared interface to the GB 24. The functions provided by the UBIF 34 are identical to those described above, with the addition of support for local LPC 32 cycles between the processor node 28a and the HIPPI interfaces 28c and 28d. Using the LPC_L/-G(3:0) control lines, the local processor node 28a may request the LPC bus 32 to perform a GB 24 cycle, in which case the UBIF 34 buffers the request and performs the necessary handshaking on the GB 24. The processor node 28a may also request the local LPC bus to perform a LPC 32 cycle, in which case the UBIF 34 provides arbitration control for the LPC 32 bus. Local cycles thus are issued by the local processor node (P0) and are accepted or rejected by the HIPPI interfaces 28b and 28c. The HIPPI interfaces 28d and 28c may also request the LPC bus 32 to return read data in response to a Local Processor read request. The difference between a global bus request and a local bus request is the value of the LPC_L/-G (1 for local, 0 for global) during LP_RREQ or LPC WREQ cycles.

Global Memory Card 26 Support

FIG. 5b illustrates the configuration of the UBIF-A 34a when used in conjunction with the Global Memory Card 26. Reference is also made to FIG. 19b and to the block diagrams shown in FIGS. 21, 23, 25, and 26.

Figure 16:
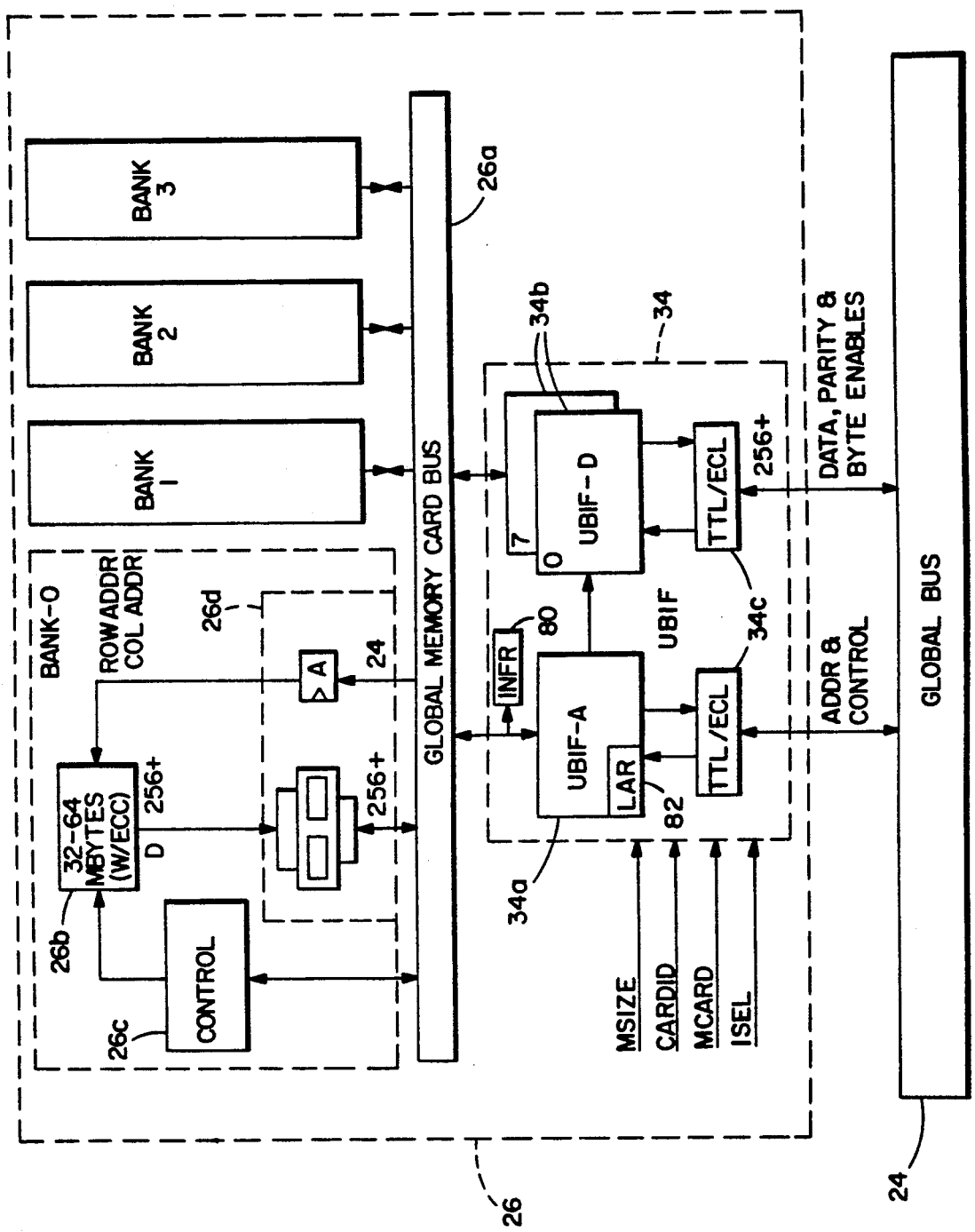
FIG. 16 depicts a four bank global memory card.

FIG. 16 shows a block diagram of the SVS 10 Global Memory Card 26. The Global Memory Card 26 includes the four independent Memory Banks, (B0–B3) each having an array 26b of 32 MB or 64 MB of dynamic random access memory (DRAM), plus 8 MB or 16 MB of ECC memory, respectively. Each Memory Bank includes a memory array 26b, a memory controller 26c, and an interface 26d to the common Global Memory Card (GMC) bus 26a. All four banks share the common UBIF 34 for attaching to the GB 24.

Additional features provided in the UBIF 34 to support the SVS 10 Global Memory 26 include memory bank scheduling, address interleaving, memory size options, error detection and correction, and exception handling.

The UBIF 34 performs the following functions when installed on the Global Memory Card 26.

Global memory bank scheduling: The UBIF 34 input section is responsible for high-level scheduling of the four Memory Banks (B0–B3) All global read and write requests are enqueued into the corresponding memory bank queues 42, 44, and 46 for processing, each of the four eight-deep queues being associated with one of the memory banks. The input bypass path is not used when the UBIF 34 is operated on the Global Memory 26. The UBIF-A 34a uses signals GMC_RDY(3:0) and GMC_LDMAR(3:0) (Appendix C) to sequence the Global Memory banks. GMC_RDY(i) informs the UBIF-A 34a if Global Memory bank(i) is ready to accept a new request. GMC_LDMAR(i) is generated by the UBIF-A 34a to schedule a Global Memory bank operation. The memory banks (B0–B3) employ GMC_WREQ(3:0) and GMC_PGNT(3:0) to arbitrate for the data bus of the Global Memory card bus 26a to return read data.

ECC generation/correction: The UBIF-D 34b modules generate eight bit ECC codes, using P/ECC 70, for each 32-bit data slice written to Global Memory 26. The eight bit ECC is stored along with the data for subsequent error detection/checking during read operations. During read operations, the supplied eight bit ECC is used to correct, with EDC 68, single bit errors and to detect double bit errors in the supplied memory data. The UBIF 34 provides this ECC status information (ECC ERR and ERR TYPE) along with the returned data to the GB 24.

Global bus address remapping (AMAP 57): This function of the UBIF 34 involves reorganizing a given global memory address based on a number of Global Memory cards 26 installed in the system, as specified by MCARD (3:0), and by the memory interleave factor, ISEL(3:0). The UBIF 34 generates a 24-bit "flat" address to the Global Memory banks, where A(9:0) specifies the column address (CAS) and A(19:10) specifies the row address (RAS). When using 4-Mbit DRAM devices A(21:20) select the rank and side, and A(23:22) are not used. When using 16-Mbit DRAM devices (10 CAS lines, 12 RAS lines), A(21:20) are a portion of the 12-bit row address and A(23:22) select the rank and side.

In accordance with an aspect of the invention partial writes to Global Memory 26 are accomplished by performing a decoupled read-modify-write cycle. When a partial write cycle is received by the UBIF 34, as indicated by the GM 24 RMW signal, the UBIF 34 performs a read-modify-write cycle to the Global Memory 26. UBIF 34 first issues a read cycle, merges the DRAM data with the GB 24 data using the given byte enables, recomputes ECC, and writes the data back to the selected memory bank. Upon detecting an uncorrectable ECC error in the memory data, with any byte enable disabled, the UBIF-D 34b modules write back an ECC of all ones, which is detected upon a subsequent read as an uncorrectable ECC error.

ACK/NAK reply: Given a valid card address, as determined by the supplied GB 24 address and the values of MCARD(3:0) and ISEL(2:0), the UBIF 34 input section generates either ACK or NAK based on the state of the input queue 46 of the destination Global Memory 26 bank.

Address and data parity error detection: The UBIF 34 checks the validity of the received global address A(31:0), and the data D(255:0), whenever it accepts a valid read or write request. On input from the ECL/TTL registered transceivers 34c, the UBIF 34 computes parity on the given address/data and compares this with the supplied parity. The UBIF-A 34a reports bad address parity on GBAPERR on the clock cycle following the address being clocked into the input queue input register, IFIR 56a. This line is then registered externally and drives the shared GB_APERR signal, which is monitored by the console 14 for error reporting. For Global Memory 26 writes, each UBIF-D 34b computes parity on its associated 32-bit data slice and compares the computed parity with the supplied parity. Each UBIF-D 34b reports bad data parity on GBDPERR on the clock cycle following the data being clocked into the IFIR 56b, the bad parity indication being driven to the GB 24 as GB_DPERR one cycle later.

Next-near computation: Next-near, GMC_NE-NE(3:0), is generated by saving the last address sent to the Global Memory 26 bank in the input queue next-near register (IFNR) 80. The input queue/dequeue pointer is automatically incremented after issuing a LDMAR in order to meet Global Memory 26 timing relative to the NENE signal.

Read-lock/write-unlock processing: An occurrence of a read lock cycle when operating in a Memory Mode 0 causes the destination Global Memory bank to perform a normal read cycle. The UBIF 34 then locks the affected memory locations (32-bytes wide) until the corresponding write-unlock cycle is received. Upon accepting a read-lock at the IFIR 56, the input stage controller saves the read-lock address and the processor identifier (PID) in a lock address register LAR 82. Single word r/w requests and block-read requests are checked against the current LAR and NAKed upon an address match. Only r/w requests from the same processor that issued the active read-lock cycle are accepted, as determined by matching the given PID with the saved PID in the LAR 82.

In a Memory Mode 0, read-lock/write-unlock cycles operate as described above. However, when operating in a Memory Mode 1, read-lock cycles return the requested data and also write-back all 1's (256-bits) at the specified memory address. Write-unlock cycles function as normal write cycles in memory mode 1.

Global Bus Address Map

Table 1 illustrates the SVS 10 global address map. The global address space is 128 GB, organized as 4 GigaWords×32 bytes/word. All global addresses are aligned on 32-byte boundaries. The byte enables are employed to support partial writes to Global Memory 26 whenever any of the eight 32-bit words making up the 256-bit wide data word on the GB 24 contain partially valid data, as indicated by GB_RMW.

TABLE 1

| DRAM Tech | Num of Cards | Bank Interleaving | Address Ranges | Total Memory |
|---|---|---|---|---|
| 4 Mbit | 1 | 4 | 0 to 256 MB | 256 MBytes |
| 4 Mbit | 2 | 8 | 0 to 512 MB | 512 MBytes |
| 4 Mbit | 3 | 8 + 4 | 0 to 512 MB, 2 GB to 2.256 GB | 768 MBytes |
| 4 Mbit | 4 | 16 | 0 to 1 GB | 1024 MBytes |
| 16 Mbit | 1 | 4 | 0 to 1 GB | 1 GByte |
| 16 Mbit | 2 | 8 | 0 to 2 GB | 2 GBytes |
| 16 Mbit | 3 | 8 + 4 | 0 to 3 GB | 3 Bbytes |

TABLE 1-continued

| DRAM Tech | Num of Cards | Bank Interleaving | Address Ranges | Total Memory |
|---|---|---|---|---|
| 16 Mbit | 4 | 16 | 0 to 4 GB | 4 Gbytes |

The UBIF 34 implementation described thus far limits the global address range to 32 GB, although the SVS 10 GB 24 address bus supports 128 GB. The UBIF 34 supported address space is divided into four 8-GB regions. The first region (i.e., from 0 to 8 GB) contains the SVS 10 Global Memory cards 26, while the remaining three regions allow access to remote SVS 10 systems units. Each of these 8 GB mapping windows allows access to the corresponding Global Memory 26 card in the remote SVS 10 system unit.

Each SVS 10 backplane supports up to four memory cards, each containing 256 MB (with 4 Mbit DRAMs) or 1 GB (with 16 Mbit DRAMs). For the purpose of address decoding, the UBIF 34 assumes that each Global Memory card 26 contains two GBYTES of total DRAM. For a system with three memory cards 26, there are two different interleave factors. The first two cards are interleaved eight ways across the bottom 4 GB address range, while the third card resides in the 4–8 GB address range and is interleaved across its own four memory banks.

Global Bus Address Remapping

Incoming addresses to a Global Memory card 26 are remapped based on the number of Global Memory cards 26, as specified by MCARD(3:0), and the interleave factor, as specified by ISEL(2:0). MCARD(3:0) are four bussed-through, open-collector, bidirectional signals on the UBIF-A 34a which indicate the presence or absence of each Global Memory card 26. Each MCARD signal is unique to each backplane memory card slot. Each Global Memory card 26 drives a unique MCARD line, as determined by which slot the card is installed within. By monitoring the values on MCARD(3:0), the UBIF-A 34a determines the total number of Global Memory 26 cards to determine the card-to-card interleave mode. The UBIF-A 34a also monitors CARDID(3:0) to determine the address range. The mapping from CARDID(3:0) to MCARD(3:0) is illustrated in Table 2.

TABLE 2

| SLOT | CARDID (3:0) | MCARD (3:0) |
|---|---|---|
| MEM-0 | 1100 | 0001 |
| MEM-1 | 1101 | 0010 |
| MEM-2 | 1010 | 0100 |
| MEM-3 | 1011 | 1000 |

Tables 3 and 4 illustrate the address remapping functions supported by the UBIF-A 34a, given one to four memory cards and various interleave factors. N-CARDS indicates a number of memory cards that are installed.

TABLE 3

| N.CARDS | ISEL | MA (23:20) | MA (9) | MA (8:7) | MA (6:5) | MA (4:3) | MA (2:1) |
|---|---|---|---|---|---|---|---|
| 1 | 0 | A (25:22) | A (9) | A (8:7) | A (6:5) | A (4:3) | A (21:20) |
| 1 | 1 | A (25:22) | A (9) | A (8:7) | A (6:5) | A (21:20) | A (2:1) |
| 1 | 2 | A (25:22) | A (9) | A (8:7) | A (21:20) | A (4:3) | A (2:1) |
| 1 | 3 | A (25:22) | A (9) | A (21:20) | A (6:5) | A (4:3) | A (2:1) |
| 2 | 0 | A (26:23) | A (9) | A (8:7) | A (6:5) | A (4), A (22) | A (21:20) |
| 2 | 1 | A (26:23) | A (9) | A (8:7) | A (8), A (22) | A (21:20) | A (2:1) |
| 2 | 2 | A (26:23) | A (9) | A (8), A (22) | A (21:20) | A (4:3) | A (2:1) |
| 2 | 3 | A (26:23) | A (22) | A (21:20) | A (6:5) | A (4:3) | A (2:1) |

TABLE 3-continued

| N.CARDS | ISEL | MA (23:20) | MA (9) | MA (8:7) | MA (6:5) | MA (4:3) | MA (2:1) |
|---|---|---|---|---|---|---|---|
| 4 | 0 | A (27:24) | A (9) | A (8:7) | A (6:5) | A (23:22) | A (21:20) |
| 4 | 1 | A (27:24) | A (9) | A (8:7) | A (23:22) | A (21:20) | A (2:1) |
| 4 | 2 | A (27:24) | A (9) | A (23:22) | A (21:20) | A (4:3) | A (2:1)tz,1/49 |

TABLE 4

| NUM.CARDS | ISEL (1:0) | BSEL (3:0) | CARDSEL (1:0) |
|---|---|---|---|
| 1 | 00 | A (2:0) | 00 |
| 1 | 01 | A (4:3) | 00 |
| 1 | 10 | A (6:5) | 00 |
| 1 | 11 | A (8:7) | 00 |
| 2 | 00 | A (2:0) | 0, A (3) |
| 2 | 01 | A (4:3) | 0, A (5) |
| 2 | 10 | A (6:5) | 0, A (7) |
| 2 | 11 | A (8:7) | 0, A (9) |
| 4 | 00 | A (2:0) | A (4:3) |
| 4 | 01 | A (4:3) | A (6:5) |
| 4 | 10 | A (6:5) | A (8:7) |

Address Interleaving Options

The UBIF-A 34a address decoding logic supports various memory bank interleave factors, as specified by a 2-bit mode select in the UBIF-A 34a module, ISEL(1:0). ISEL(1:0)=00, 01, 10, 11 select interleave factors of 2, 8, 32 and 128 (256-bit) words, respectively, when there are 1, 2 or 3 Global Memory 26 cards installed. With four Global Memory 26 cards installed, the supported interleave factors are 2, 8, and 32 words.

Memory Bank Size Select

Each SVS 10 Global Memory 26 card includes four independent memory banks. A 2-bit size select MSIZE(1:0) selects the memory bank size and is provided directly to the Global Memory 26 banks to control RAS/CAS decoding. MSIZE(1:0) is ignored by the UBIF 34.

UBIF 34 Input Section

As was stated, the input section in the UBIF 34 provides an eight entry request queue 46 for each of the four Global Memory banks. All Global Memory 26 requests pass through the UBIF 34 input queue 46 for processing, and thus the input bypass path is not used when the UBIF 34 is operated in memory mode. Requests for each bank of the Global Memory 26 are enqueued in the order received from the GB 24, which may arrive as back-to-back GB 24 cycles for the same memory bank or different banks. The UBIF 34 continues to accept requests destined for a particular memory bank so long as the corresponding input queue 46 is not full and there is no pending read-lock operation at the requested address. The UBIF 34 generates ACK when accepting a Global Memory 26 request, and generates NAK to reject a request, indicating to the requestor that it should retry the operation.

The UBIF-A 34a employs the four way round-robin arbitration technique to dispatch requests to the four Global Memory 26 banks. The UBIF-A 34a also informs each Global Memory 26 bank, through its corresponding GMC_NENE(i) signal, whenever there occurs a subsequent request having a common ROW address with a previously supplied request address. This is an optimization feature enabling the Global Memory 26 bank to perform the subsequent memory cycle in a fewer number of cycles, in that the memory bank is not required to cycle RAS and incur the associated RAS pre-charge time.

For read-modify-write cycles, as indicated by a Global Memory 26 write request with the RMW flag asserted, the UBIF 34 first issues a read request to the indicated memory bank. The returned memory data is passed through the error detection/correction logic as explained below, which corrects single bit errors. The corrected data is merged, via signal line 68a and MUX 64a, with the supplied write data, as specified by the supplied byte enables, and written back to the Global Memory 26 bank along with the newly computed ECC. In the event of a double-bit error in the returned memory data, a ones pattern is supplied as the computed ECC which indicates an uncorrectable ECC error whenever that particular memory location is read.

UBIF 34 Output Section

The output section in the UBIF 34 provides the output queues 44 for Global Memory 26 reply data, the bypass path, and error detection/correction logic 68. The Global Memory 26 banks employ GMC_MREQ(3:0) to request a memory reply cycle on the GB 24. The UBIF-A 34a issues GMC_MGNT(i) in response to GMC_MREQ(i), according to a four state round-robin arbitration technique. If all output queues 44 are empty and an GMC_MREQ(i) is issued the UBIF-A 34a employs the output bypass path to pass the reply data, along with data parity and the supplied MID(7:0), MTAG(7:0), and ECC error status, to the TTL/ECL transceivers 34c. The UBIF-A 34a also issues GB_MREQ to the GB 24 arbiter for gaining access to the GB24 as indicated by GB_MGNT.

Assuming no GB 24 contention, the UBIF 34 continues using the output bypass path to return memory reply data over the GB 24. However, as GB 24 traffic increases the UBIF 34 may not be capable of returning data over the GB 24 at a rate sufficient to keep up with Global Memory 26 reply requests. If the UBIF 34 is unable to schedule a memory reply request through the bypass path, it uses the output queues 44 to buffer replies. After entering this mode of operation the UBIF 34 cycles through all pending replies in the output queues 44 before once more employing the bypass path. A four way round-robin arbitration technique is used to process pending replies in the output queues 44. The UBIF 34 continues to issue GMC_MGNTs to the Global Memory 26 banks as long as there is sufficient room in the corresponding output queue 44 to buffer the reply data. This mechanism provides automatic flow control, which prevents output queue 44 overruns.

Given that read reply cycles do not require an acknowledge indication, since it is assumed that the requesting UBIF 34 has sufficient room in its input queue 46 to accept the entire read request, Global Memory 26 replies may use the maximum UBIF 34 bandwidth, or 640 MB/second assuming 40 MHz operation, to return read data.

Typical Global memory Read/Write Timing Sequences

Figure 17A:
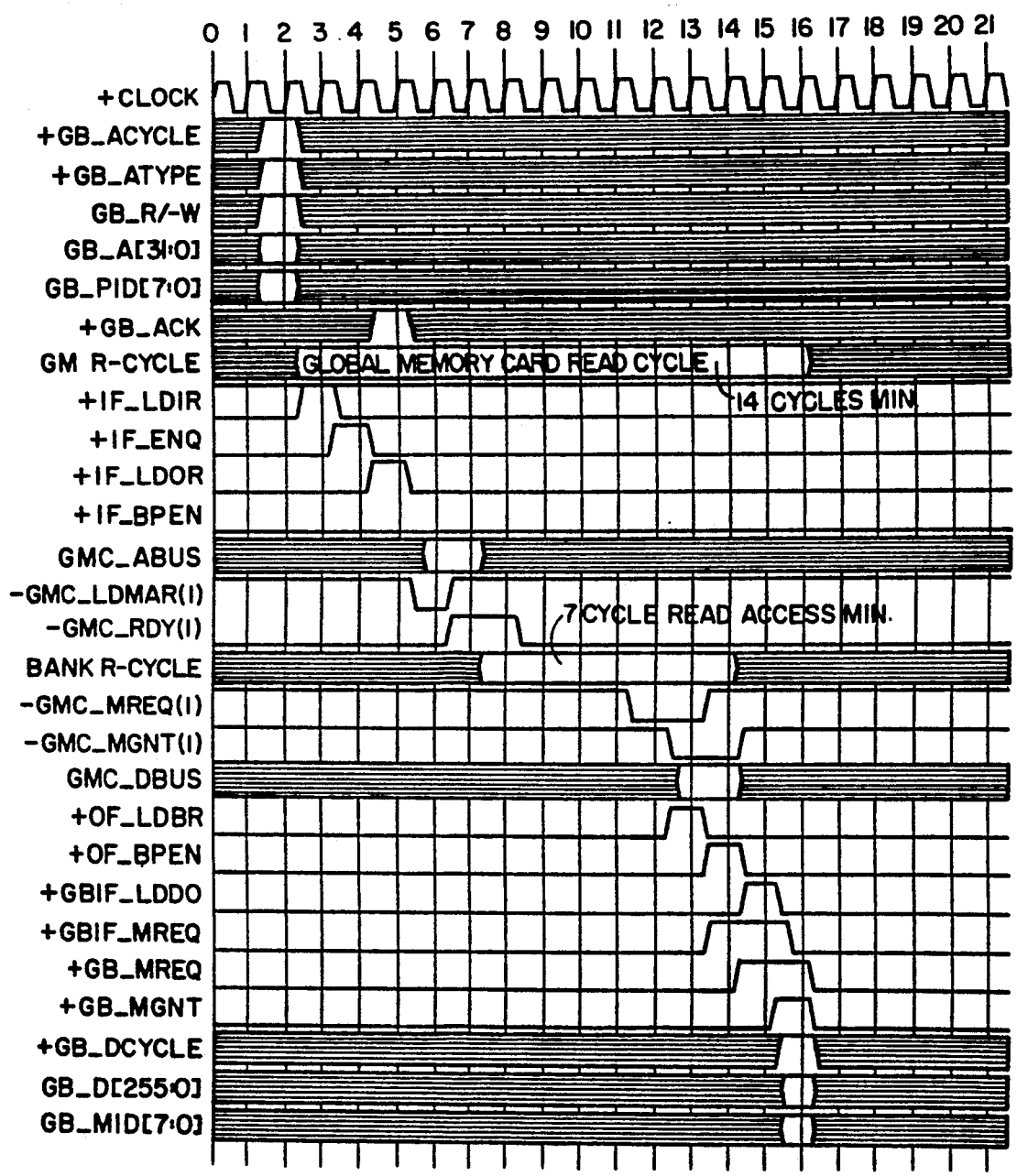
FIG. 17a is a timing diagram that depicts a timing sequence for a global memory read operation with respect to the global bus.

FIG. 17a illustrates a typical timing sequence for a GM 26 read operation with respect to the GB 24. A GM 26 read request appears on the GB 24 during cycle 1 and is accepted (ACKed) by the GM 26. The request is enqueued into the appropriate input queue during cycle 3 and appears on the GMC bus 26a during cycles 5 and 6, as indicated by GMC_ABUS and GMC_LDMAR. In this example, it is assumed that the input queue for the corresponding GM 26 bank is empty and that the UBIF 34 is not required to schedule any other memory bank operation. It is further assumed that the GM 26 bank is ready to accept a request, as indicated by a valid GMC_RDY(i) during cycle 4, and that no memory refresh cycle is pending at the memory bank. Therefore, the GM 26 bank performs the given memory read operation and requests the GMC data bus, by asserting GMC_MREQ(i), to return the read data. The returned data appears on the GMC data bus during GMC_MGNT(i) (cycles 12 and 13) and is latched into the OFBR 54 in the UBIF-D 34b modules at the end of cycle 13. OFBR 54 is used in that it is assumed that the four output queues 44 are empty and that there is no pending reply data in the external TTL/ECL register 34c. The memory reply data is corrected (if necessary) by the UBIF-D 34b modules during cycle 14 and is latched into the external TTL/ECL register 34c at the end of cycle 14, along with the results of error detection and correction (as indicated by ECCERR and ECCTYPE) and the computed data parity. The GM 26 read reply cycle appears on the GB 24 during cycle 15, along with MID(7:0) which reflects the supplied PID(7:0), assuming that the GB arbiter 36 issued an immediate GB data bus memory grant (GB_MGNT) in response to the GM_MREQ.

Figure 17B:
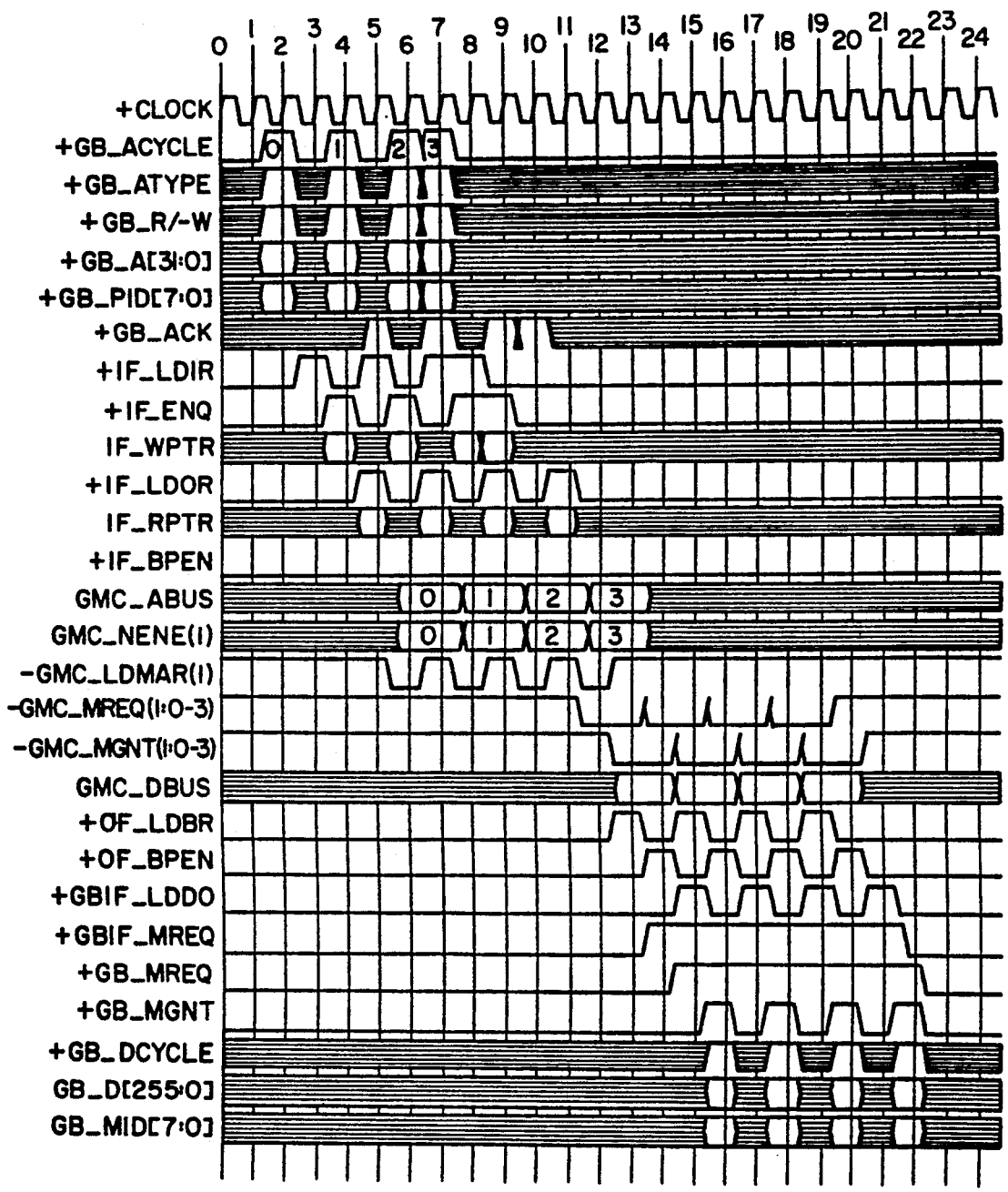
FIG. 17b is a timing diagram that depicts four global memory read requests that arrive at a single global memory card, each request being directed to a different memory bank.

FIG. 17b illustrates four global memory read requests arriving at a single GM 26 card, each destined to a different memory bank. That is, the request in cycles 1, 3, 5, 6 is destined to memory bank 0, 1, 2, 3, respectively. The first three requests are shown spaced at every other GB 24 cycle, while the fourth request appears immediately after the third request. This illustrates that a single GM 26 card accepts back-to-back global memory requests as long as the corresponding input queue is not full, at which time the requests are NAKed by the UBIF 34.

As can be seen from the timing diagram, all four requests are accepted (ACKed) and enqueued into their corresponding input queues, as determined by the supplied global address, interleave factor, and number of installed global memory cards. These requests then appear on the GMC bus 26a as consecutive cycles as determined by the input queue, output control round robin arbiter. Assuming no GM 26 refresh cycles are pending, each of the GM 26 cards performs the indicated memory read operation and requests the GMC data bus in order to return the read data. Thus, memory banks 0, 1, 2, 3 request the GMC bus 26a at cycle 11, 13, 15, and 17, respectively, and are granted the GMC data bus at cycle 12, 14, 16, and 18 by the GMC data bus arbiter of the UBIF 34. Further assuming that all four output queues are empty, and that the GB 24 bus arbiter 36 issues immediate GB data bus grants to the GM 26 card, all four read reply cycles flow through the OBFR 54, where error detection and correction is performed, along with data parity computation, and appear on the GB 24 data bus at the maximum reply data rate of 640 MB/sec. Thus, another GM 26 may also be return read reply data during the alternate GB 24 data bus cycles, thereby achieving the 1.28 GB/sec. total bandwidth on the GB 24.

Figure 18A:
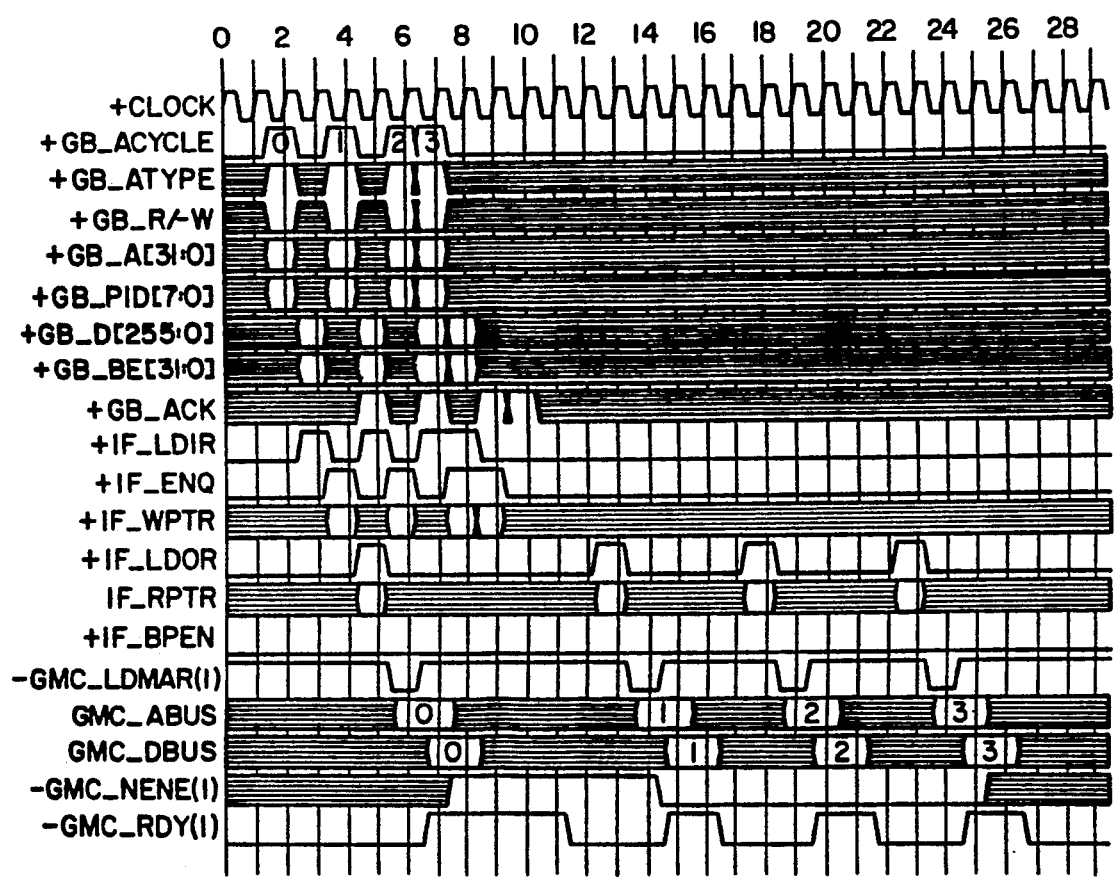
FIG. 18a is a timing diagram that illustrates four global memory write cycles that are directed to a single global memory bank.

FIG. 18a illustrates four GM 26 write cycles destined to a single GM 26 bank. As with the previous example, the GB 24 requests are shown spaced out to illustrate that requests to a single bank, or to different banks, are accepted at the maximum GB 24 data bus bandwidth of 1.28 GB/sec. (i.e., back-to-back cycles), so long as there is room in the corresponding UBIF 34 input queue to buffer the request. In this example, it is assumed that the corresponding input queue is empty at the start of the timing sequence. Thus, all four GM 26 write requests are accepted (ACKed). The first write request appears on the GMC bus 26a at cycle 5 (address during cycles 5 and 6, data during cycles 6 and 7), causing the GM 26 bank to become busy, as indicated by GMC_RDY(i) being negated at cycle 6. The GM 26 bank then asserts GMC_RDY(i) at cycle 11, indicating that it is ready to accept another request, causing the UBIF 34 to issue the subsequent write request at cycle 13. It is noted, however, that in this case write requests 1, 2, and 3 are destined to the same ROW address of the global memory bank, as indicated by GMC_NENE(1), thus causing the global memory bank to return GMC_RDY(i) within two cycles from the start of the write cycle, instead of five cycles. It should also be noted that the UBIF 34 may schedule cycles to a given global memory bank at every fourth clock cycle, assuming GMC_RDY(i) is negated for a single clock cycle after GMC_LDMAR(i).

FIG. 18b illustrates four global memory read-modify-write operations, as indicted by GM_RMW active, each destined to a different GM 26 bank. As with the previous examples, the requests are spaced out on the GB 24 for illustrative purposes. It is also assumed that the UBIF 34 input and output queues are empty at the start of the timing sequence.

Figure 26:
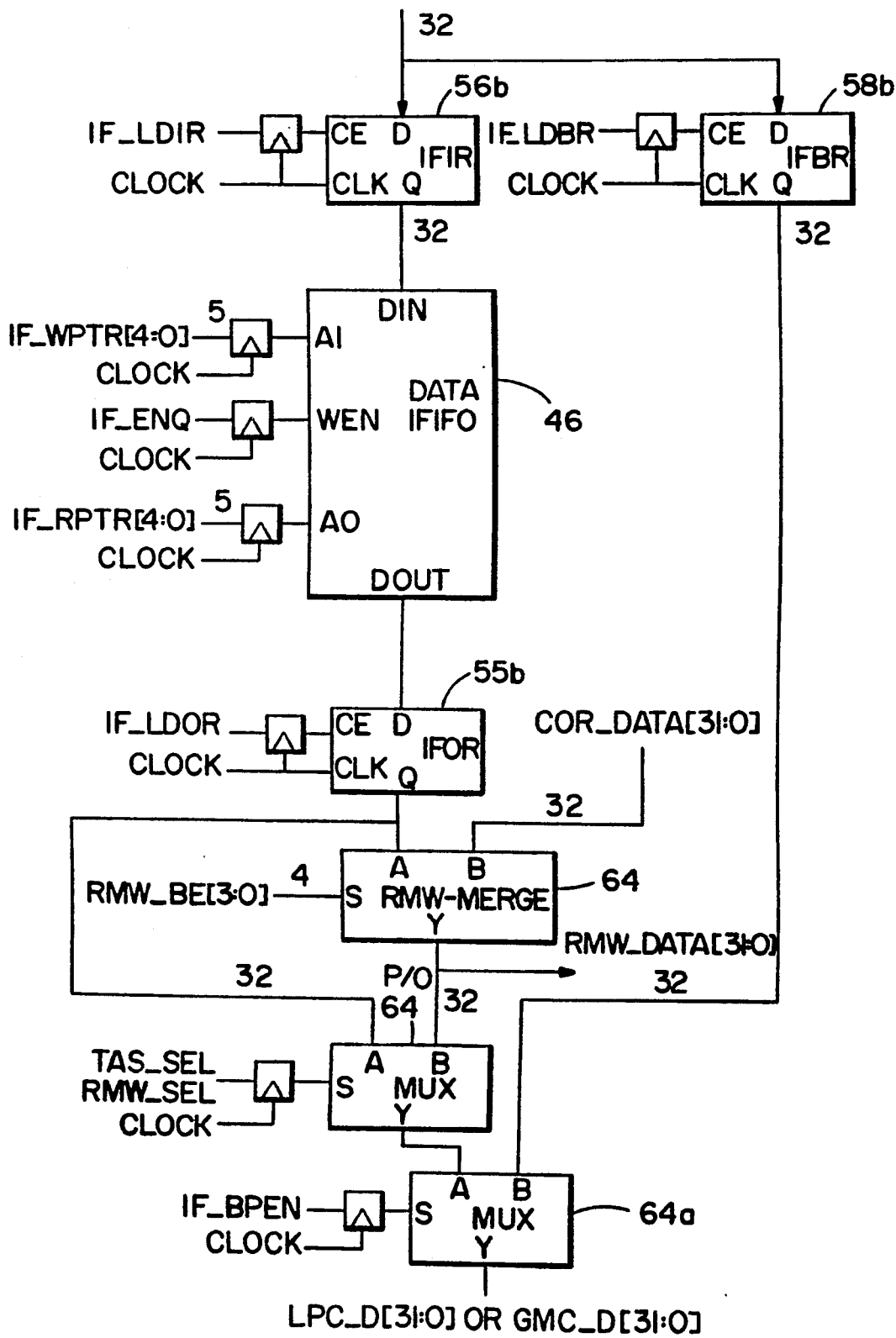
FIG. 26 is a block diagram showing in greater detail the UBIF-D input circuitry.

As was described previously, read-modify-write operations are used to perform partial write cycles to the GM 26, where any combination of data bytes within a GB data word may be updated using a single GB 24 write cycle operation. As seen in FIG. 26, the data bytes to be updated at the GM 26 are indicated by their corresponding byte enable bit GB_BE(31:0) being set. For a given UBIF 34b module, each of which has a 32-bit data path, the four associated byte enables (RMW_BE[3:0]) are applied to the RMW MERGE MUX 64. The UBIF 34 performs partial write cycles by first performing a GM 26 read operation, updating the selected bytes, recomputing ECC, and storing the combined data back to the GM 26 bank. Therefore, in this example, the first read-modify-write cycle starts in cycle 5 where the UBIF 34 issues a read request to bank 0 (R0), which causes the GM 26 bank to perform the indicated read operation and return data to the UBIF-D 34b during cycles 12 and 13. The UBIF 34 also schedules the read request to GM 26 banks 1, 2, 3 during cycles 7, 9, 11, respectively. UBIF 34 performs the modify operation internally in the UBIF-D 34b modules by first taking the supplied GM 26 data and performing any necessary error correction, as determined by the supplied read data and ECC. This occurs during the cycle that immediately follows the corresponding GMC data bus grant. The UBIF 34 also reads the supplied write data from the corresponding input queue, as indicated by IF_LDOR, along with the supplied byte enables (BEs), and performs the merge operation through the RMW_MERGE MUX 64. As a result, only those bytes that are enabled are replaced with the supplied write data. A new ECC is computed for the merged data and a global memory write operation is scheduled to perform the write back operation to the GM 26 bank. The UBIF-A 34a controls the eight UBIF-D 34b modules using the RMW_SEL signal, the assertion of which causes the merge operation and the storage of the merged data back into the GM 26 memory bank(s).

Figure 4B:
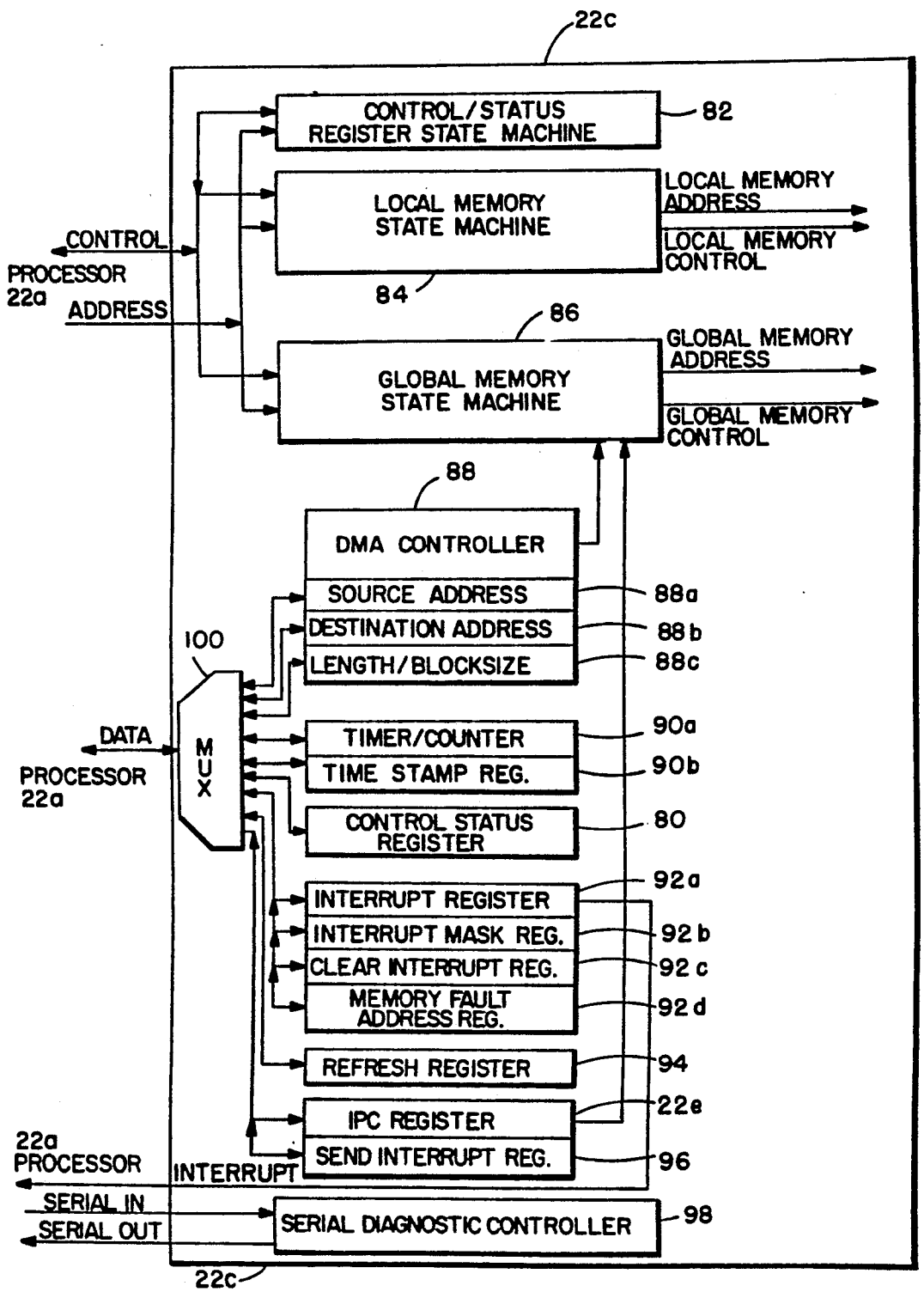
FIG. 4b is a block diagram showing in greater detail the constituent components of the PBIF.

A further description of read-modify-write cycle operation is now provided with respect to the PBIF 22c (FIGS. 4a and 4b).

Each PBIF 22c incorporates a Control and Status Register (CSR) 80, programmable timer/counters, logic to reset the associated processor 22a or 28a, and other functions, as will be described.

The PBIF 22c includes a plurality of state machines, including a Control/Status Register (CSR) state machine 82, a local memory state machine 84, and a global memory state machine 86. These three state machines have inputs connected to the control and address signal lines of the attached processor 22a or 28a. In addition, the global memory state machine 86 receives an input from a DMA controller 88 and the interprocessor communication (IPC) register 22e. The local memory state machine 84 generates local memory address and control signal lines that are coupled to the local memory 22b for controlling accesses thereto. The global memory state machine 86 generates global memory address and control signal lines that are coupled, via the local processor bus 32 and the UBIF 34, to the global bus 24. The global memory state machine 86 generates global memory address and control signals in response to the local processor 22a or 28a or in response to the operation of the DMA controller 88, or the IPC register 22e.

The DMA controller 88 further includes a source address register 88a, a destination address register 88b, and a length/blocksize register 88c. These registers are loaded by the attached processor 22a or 28a for controlling DMA operations. The source address register 88a is initially loaded with the memory address from which data is to be read, the destination address register 88b is initially loaded with the address to which the data is to be stored, and the length/blocksize register 88c is initially loaded with a value representing a number of data units that are to be transferred during a DMA operation.

PBIF 22c also includes a timer/counter register 90a and a time stamp register 90b.

The PBIF 22c further includes a block of interrupt-related registers. These include an interrupt register 92a which latches incoming interrupts and then, in turn, interrupts the processor 22a, as appropriate. The PBIF 22c further includes an interrupt mask register 92b, the clear interrupt register 92c and a memory fault address register 92d.

A refresh register 94 is provided for controlling the refresh timing parameters for the local memory 22b DRAMs. The refresh register 94 is written with a divisor that is applied to the system clock. The resulting divided clock is used to periodically generate refresh cycles. Any refresh request is queued until all currently executing memory cycles are complete. The pending refresh request then has priority over any new cycles requested by the processor 22a. Local memory 22b refresh occurs unhindered if the processor 22a is accessing another range in memory (such as Global Memory 26). The IPC register 22e has associated therewith the aforementioned send interrupt register 96. The serial diagnostic controller 98 is described in the aforementioned commonly assigned U.S. patent application Ser. No. 07/733,763, filed Jul. 22, 1991, entitled "A Serial Diagnostic Interface Bus for Multiprocessor Systems".

Registers 88 through 96 are all bidirectionally coupled to the local processor through a data multiplexer 100 such that the local processor is enabled to store information within and read information from these registers.

As can be seen in FIG. 4a the local memory 22b is partitioned into 8 Mbyte banks and also includes a parity memory section for storing parity memory information associated with each of the memory banks. A set of eight registered transceivers 22f is employed for bidirectionally interfacing the memory banks and parity memory to the local node 64-bit data bus 23a. A set of eight transceivers 22g bidirectionally couple the local node data bus 23a to the read and write buffers of the global memory interface 22d.

As was previously stated, the PBIF 22c provides all of the required logic, with the exception of tranceivers and memory, to interface a high performance microprocessor to a high performance multi-processor system. These functions are now described in greater detail below.

Global Memory Interface

The processor 22a, for this embodiment of the invention, includes an internal 8 KB data cache and a 4 KB instruction cache having cache lines that are 256-bits in width, and an external data bus that is 64 bits in width. The width of the internal cache line coincides with the width of the Global Data Bus (DBUS 24b), although the width of the processor 22a data bus is a factor of four less than that of DBUS 24b. The two external 256-bit registers 22d provide data bus width matching, and also provide an external, one line, level two cache for the processor 22a.

In accordance with an aspect of the invention, when the processor 22a issues a read to a Global Memory 26 location, the address is decoded within the PBIF 22c and the relevant request lines to the UBIF 34 (which controls the Global Bus 24) are generated. When granted a bus cycle by the UBIF 34, the PBIF 22c drives the address onto the LPC bus 32, along with any necessary control lines. The PBIF 22c then "snoops" the local bus 32, waiting for the Global Memory 26 data to be returned. A unique processor ID field, associated with the processor that made the read request, in conjunction with a data valid line on the local bus 32, define the data return condition. When data is returned to an identified processor from the Global Memory 26, the PBIF 22c generates control signals to latch the returned data into the external read buffer 102, and then enables the appropriate word (64-bits) back to the identified processor 22a via the local node data bus 23a. If the processor 22a follows the first request with another request to a 64-bit word, which is also encached within a 256-bit read buffer 102, the second 64-bit word is returned to the processor 22a from the read buffer 102 with minimal latency, and without utilizing any bus bandwidth on either of the shared busses (LPC 32 and GB 24).

The global memory state machine 86 is optimized to support cache reloads, where consecutive words are loaded into the processor 22a. After the initial latency for the first Global Memory 26 read, all subsequent words are returned in two bus cycles. Various address comparison functions are performed within the PBIF 22c with read and write address registers and associated comparators. The read and write address registers maintain a record of the addresses of words that are currently stored in the external buffers 22d.

The contents of the read buffer 102 are invalidated if the processor 22a requests a word which is not currently cached, or if the currently cached word is detected as being written on the Global Bus 24. The PBIF 22c snoops all bus cycles on the Global Bus 24 to determine if a write takes place to a location in Global Memory 26 which is currently encached within the associated read buffer 102. In addition, some conditions result in an invalidation of the read buffer 102. For example, a read from the processor 22a, with N10_LOCK active, invalidates the current contents of the read buffer 102, and the data is instead fetched from GM 26. However, this condition may be disabled via a CSR 80 bit. Another signal line (LPC_NOCACHE) on the local bus 32 enables external devices to signal that they are returning non-cacheable data. Also, if a processor 22a writes the same address as is currently cached for reads, the read buffer 102 is invalidated. Furthermore, as a fail safe mechanism, the read buffer 102 may be automatically invalidated by the PBIF 22c after 256 reads of the same encached data, without a read buffer 102 reload from Global Memory 26. This feature is also controlled by a bit in the CSR 80. The combination of these features ensures that any data stored within the read buffer 102 remains consistent with the copy stored within Global Memory 26.

If data is returned from Global Memory 26 with an ECC (Error Check and Correction) error condition set, indicating that when the data was read the Global memory 26 detected an ECC error, the data is returned to the processor 22a, but is not be cached in the read buffer 102, and an interrupt is generated by the PBIF 22c to the processor 22a.

A 256-bit write buffer 104 operates in a similar fashion. When the processor 22a or 28a writes a word to a Global Memory 26 location, it is cached in the write buffer 104. Any further processor 22a or 28a writes within the same 256-bits are stored within the write buffer 104. The write buffer 104 circuitry includes a register 104a for storing processor 22a generated byte enables, and updates these buffered write enables as appropriate. If the processor 22a writes to a location that is not currently cached in the write buffer 104, the contents of the write buffer 104, and the byte enable register 104a, are flushed out to Global Memory 26, with the PBIF 220 generating the appropriate control signals, and the newly written word replaces the old within the write buffer 104. In addition, a software-controllable mode enables the write buffer 104 to be written out to Global Memory 26 after all 32 bytes have been written by the associated processor 22a.

The write buffer 104 is also flushed if the processor 22a issues a locked write to Global Memory 26. A locked write is a special type of write cycle which the processor 22a may execute. During locked memory cycles, only the processor which initiated the lock is allowed to alter the data which it locked. This ensures consistency in multiprocessor systems, where many processors may attempt to share the same data. The processor 22a indicates a locked cycle by enabling a special output pin (N10_LOCK) during the cycle. If a locked write is requested to Global Memory 26, this condition first flushes the present contents of the write buffer 104, so as to maintain order, and then writes the locked word without buffering it. This operation is similar to that previously described for locked reads. Also, as was previously stated, a read of a Global Memory 26 address which is currently buffered in the write buffer 104 causes the write buffer 104 to be flushed before the read request is issued. This ensures that if the copy of the data in the write buffer 104 is more current than that contained within the Global Memory 26, that the most current version is returned to the requesting processor.

The Control and Status Register (CSR) 80 controls numerous functions within the PBIF 22c, including setting a mode for read buffer 102 and write buffer 104 operation. The CSR 80 is a 32-bit register containing some bits which are read/write (r/w), some bits that are read-only (r/o), and other bits that are write-only (w/o). A description of those bits of CSR 80 that are relevant to an understanding of the present invention are described below.

A (r/w) bit enables the write buffer 104 autoflush mode. When set to one, this bit allows the PBIF 22c write buffer 104 and byte enable buffer 104a to be automatically flushed out to Global Memory 26 when all 32 bytes have been written by the local processor 22a. When cleared to zero (default), the PBIF 22c write buffer 104 is flushed only (a) when the associated processor's global write address is outside of the active 32-byte write block, (b) when the processor 22a issues a read to an address contained in the active 32-byte write block, or (c) when the processor 22a issues a LOCK write cycle to Global Memory 26.

A (r/w) bit enables read buffer 102 auto-invalidate mode. When set to one, this bit enables the PBIF 22c read buffer 102 to be invalidated after 256 consecutive processor 22a reads to the same 32-byte Global Memory 26 address.

A (r/w) bit enables the read buffer 102. When set to one, this bit enables buffered reads from the PBIF 22c read data buffer, which holds up to 32 consecutive bytes aligned on 32-byte global address boundaries. When cleared to zero (default), the PBIF 22c reflects every processor 22a read to the global address space on the LPC bus and Global Bus 24. That is, all reads come from GM 26, and not from date previously stored in the read buffer 102.

A (r/w) bit enables the write buffer 104. When set to one, this bit enables processor writes to be buffered within the write data buffer 104, which holds up to 32 consecutive bytes aligned on a 32-byte global address boundary. When cleared to zero, the PBIF 22c reflects every processor 22a write to the global address space on the LPC bus 32 and Global Bus 24, via the write buffer 104.

PBIF Global Memory Interface

The operation of the PBIF 22c GM 26 interface is described with reference to the GM 26 state machine 86, illustrated in FIG. 4c, and in reference to the GB 24 timing diagrams, for example FIGS. 18a and 18b.

Data path performance to the GM 26 is improved, as stated above, by the provision of the 256-bit read buffer 102 and the 256-bit write buffer 104, both of which may be turned selectively enabled or disabled through bits in CSR 80. Buffers 102 and 104 provide bus-width matching between the processor 22a and the LPC bus 32, and also provide posting capability for writes, and increased throughput on pipelined reads. In the case of reads, the contents of the read buffer 102 are invalidated under the following circumstances: (a) a write on the GB 24 to the current read address (snoop match); (b) a GM 26 write request to the current read address; (c) a read to an address different than the current read address; (d) a volatile read (as indicated by +NOCACHE on the LPC bus 32); (e) a read from the processor 22a with the PTB bit set (and enabled in the CSR 80); and (f) auto-flush after 256 reads from the same 32-byte address.

The read buffer 102 is not set as a result of a read request which fails to complete (e.g. timeout), or as a result of a read request which returns bad data (e.g. GM 26 parity or ECC error).

The contents of the write buffer 104 are flushed to the GM 26 under one of four conditions: (a) a condition indicated by the CSR 80 mode bit is met; (b) the performance of a locked write request, which flushes any data currently in the write buffer 104, and then performs the locked write to GM 26; and (c) a read to the address which is currently active in the write buffer 104. In this case the write buffer 104 is flushed before the read request is issued.

There are two write flush modes which may be set under software control. If the above described CSR 80 bit is enabled, then the default mode for operation is to flush the write buffer 104 contents whenever the write buffer 104 contains valid data, and the processor 22a writes to a different address in the GM 26. In the second mode, the contents of the write buffer 104 are flushed whenever all 32 bytes of the 256 bit word have been written, as indicated by the byte enables. A register within the GM 26 state machine 86 latches the byte enables whenever a GM 26 write occurs, and when all 32 bits are set, generates a signal -BYTES_FULL, which causes a state machine 86 transition. This register is reset whenever the contents of the write buffer 104 are flushed.

The GM 26 state machine 86 also allows requests to go out onto the LPC bus 32 for other local devices. In this case, the GM 26 operation is initiated by an IO address decode rather than a GM 26 address decode by the internal PBIF 22c address decoder.

It should be noted that, whenever the write buffer 104 is flushed, the contents of the register 104a storing the 32 byte enable signals for the LPC bus 32 is also cleared. Register 104a exists external to the PBIF 22c to drive the LPC bus 32, and exists also as a "shadow" register within the PBIF 22c. Eight-bit portions of register 104a are individually loaded as a result of processor 22a write cycles, to reflect the state of the processor generated byte enable signals during the write. The stored byte enables, each of which corresponds to one byte in the write buffer 104, are combined to generate the signal LPC_RMW. This line is driven with the LPC bus 32 address on writes and is low if all of the byte enables are set. It is driven high if, for any word-aligned 32-bit slice, not all of the byte enables are set. As an example, if the processor 22a writes a 64-bit word, and all eight byte enables are active, then LPC_RMW is low, if this word is flushed. If two 64-bit words are written to the write buffer 104, and all 16 byte enables are active, then these two words would also be written with LPC_RMW low. If a third word is written to the write buffer 104 and it is then flushed, and if either one of the 32-bit words within this third 64-bit word has an inactive byte enable, then LPC_RMW remains high when the write buffer 104 is flushed. The LPC_RMW is driven to the Global Bus 24 as GB_RMW (FIG. 18b), in conjunction with the byte enables (GB_BE[31:0]). This prevents the inadvertent overwriting of data in GM 26.

Furthermore, and as is seen in FIG. 18b, a processor 22a requires only one Global Bus 24 access in order to perform a read-modify-write operation. As was previously described, the UBIF 34 on the memory card 26 performs the operations of reading the addressed location, merging the data in accordance with the byte enable information, and storing the merged data back into the memory bank.

Figure 4C:
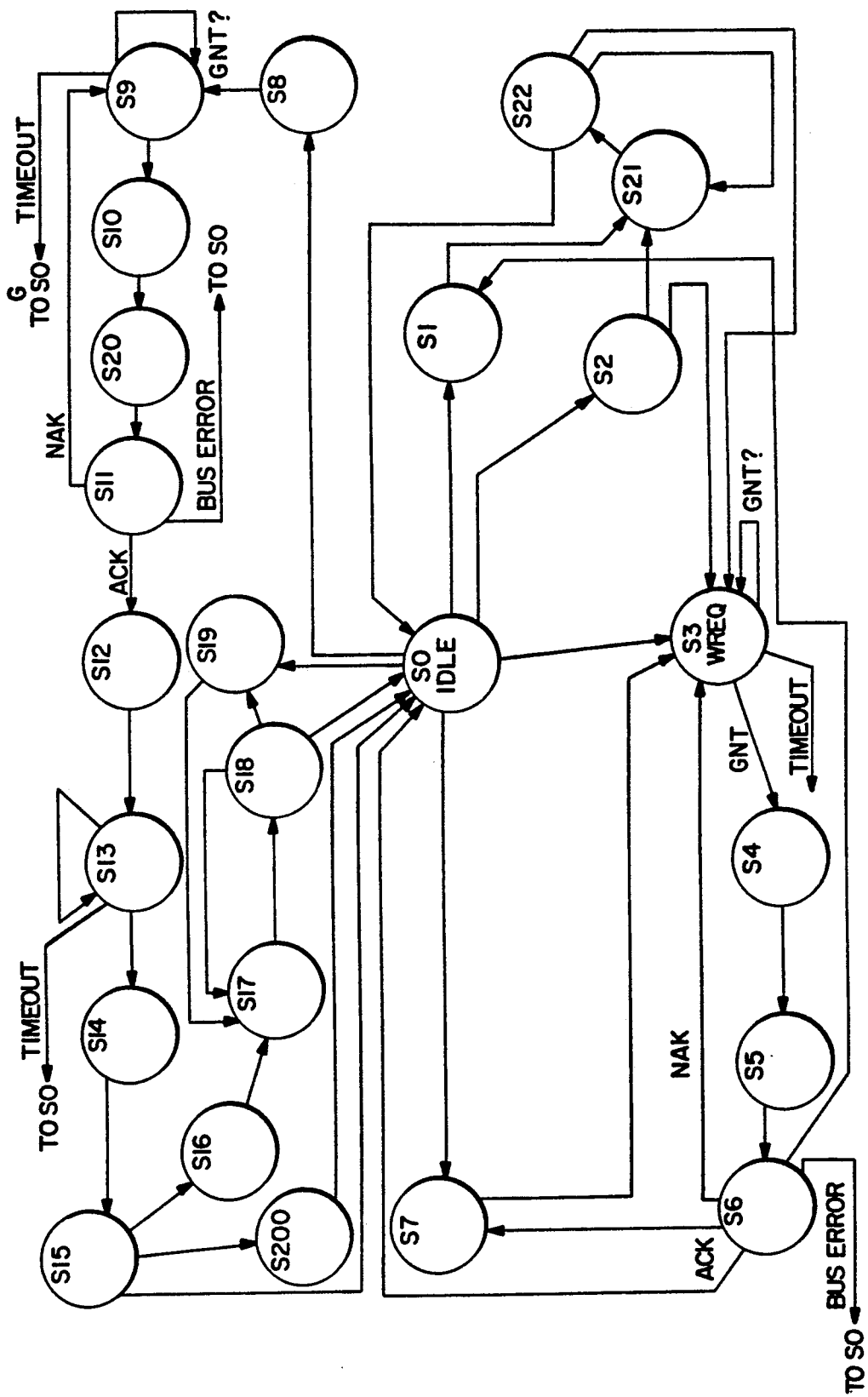
FIG. 4c is a state diagram showing the operation of a global memory state machine of the PBIF.

Referring to FIG. 4c, the state machine 86 begins in the idle state (S0). A GM 26 write is requested by the processor 22a in the same manner as a local memory write, with the appropriate address decode signalling that this write is to be posted to the GB 24. In the cycle following Address Status from the processor 22a, S1 is entered and READY goes low to the processor 22a, indicating that the data has been written. At the end of this cycle, the data is latched into the write buffer 104 the byte enables are latched into the buffer 104, and the state machine 86 proceeds to state S21. Also latched in state S1 is the read buffer 102 address. The write buffer 104 flag is set active. From state S21, state S22 is entered. If the processor 22a, as a result of the READY asserted in S1, had placed an Address Status and a new address on the address bus 23b during S21, then at the end of S22, this condition is detected and, if there is a read address match (R_MATCH), the state machine 86 loops back to S21. In this case READY is sent to the processor 22a, and another word of data is latched. This is conditional upon S21 following S22. If there is no processor 22a LADS at the end of state S22, and if the write flush conditions have not been met, a return is made to the idle state (S0). A further discussion of write flush conditions follows.

From S0, if the processor 22a issues another write request, and the W_MATCH signal indicates that this write is in the same 256-bit block as the address stored in write buffer 104, then the state machine 86 enters state S2, the data and byte enables are latched, READY is returned to the processor 22a, and the write address is latched. A write request to any GM 26 location, when the write buffer 104 enable bit is not set, also causes the write to occur in state S2 (rather than S1). At the end of S2, the state machine 86 branches to state S21, unless either the write buffer 104 is disabled, or all 32-bytes of data have been written, in which case a branch is made to S3 to initiate the LPC bus 32 write. In the case of branching to S21, the same procedure is followed as has just been described.

When either a write to an address which does not generate a W_MATCH is detected, or all 32-bytes of the write buffer 104 have been written as indicated by the stored byte enables, the contents of the write buffer 104 are flushed to GM 26. In this case, the state machine 86 branches to state S3, and an LPC write request is issued. This state transition also occurs as a result of a read to the address currently stored in the write buffer 104.

It is noted that the transitions from S0 to S3 or to S7 have precedence over those to S8.

In state S3, an output enable to LPC bus 32 transceivers goes active, and is conditioned by the appearance of a Grant from a LPC bus 32 arbiter. When a GRANT signal from the LPC arbiter is asserted, the address is driven onto the LPC bus 32, and at the end of this cycle, the state machine 86 enters state S4.

It is noted that the LPC_LOCK line is driven active whenever the LPC_ADDR is driven active, and the request is a result of processor 22a request with N10—LOCK active. The intention is to set the lock bit for all write buffer 104 flushes initiated either by an S0 to S7 transition, or by an S6 to S7 transition (but only if these were caused by locked writes, not PTB writes), or by an S0 to S2 transition which is caused by a locked write with the write buffer 104 disabled. In addition, the lock bit is set by a locked read request. This causes an S0 to S8 transition, so that the data is read from GM 26 and not from the read buffer 102, as would occur on an S0 to S19 transition. In addition, for a locked read, the data is not cached by read buffer 102.

The four LPC bus 32 length lines (LPC_LEN(3:0) are driven, with the address, to zero for all "normal" GM 26 requests. In S4 the output enables for the data transceivers are active, and the data is driven out onto the LPC bus 32 in this cycle. The address is also driven onto the bus for one additional cycle (a two cycle active period).

Following this cycle, the state machine 86 transitions to state S5, where the data is enabled onto the LPC bus 32 for a second cycle, and the write buffer 104 valid flag is disabled. Following S5, the state machine 86 waits in state S6 until either an ACK or a NAK is received from the associated UBIF 34.

If NAK is received, the state machine 86 branches back to state S3, and a further write request is issued. If an ACK is received, the state machine 86 may branch to one of three states, depending on the condition that caused the write buffer 104 flush.

It should be realized that the teaching of the invention is not to be construed to be limited to only the presently preferred embodiment. Thus, while the invention has been particularly shown and described with respect to a preferred embodiment thereof, it will be understood by those skilled in the art that changes in form and details may be made therein without departing from the scope and spirit of the invention.

APPENDIX A

Global Address Bus Signal Definition

The address bus consists of GB_ACYCLE, GB_A-TYPE, GB_A(31:0), GB_LEN(3:0), GB_PID(7:0), GB_PTAGE(7:0), GB_R/-W, GB_LOCK AND GB_RMW. This bus is used by master devices (e.g. processor cards) to initiate global memory r/w cycles. Access to the SVS global bus is gained by issuing a GB_RREQ or GB_WRFQ to the global bus master arbiter and receiving a GB_PGNT. A description of each address bus field is provided below:

GB_ACYCLE identifies a valid global bus address cycle. This signal is driven by the current global address bus master to validate the global address bus. Slave devices should validate r/w requests with GB_ACY-CLE.

GB_ATYPE specifies a valid address cycle or IPC interrupt cycle. If GB_ATYPE is 1, the address bus specifies a valid global memory r/w request. If GB_A-TYPE is 0, the address bus specifies and IPC interrupt cycle, and global bus slave devices should interpret GB_LEN(3:0) as the group select identifier GSI(3:0), and GB_A(31:0) as the processor select mask PSM(31:0). During IPC interrupt cycles, GB_R/-W, GB_LOCK and GB_RMW are not defined, and GB_AP(3:0) specifies parity for GB_A(31:0). GSM(2:1) selects the destination system unit. GSM(0) selects computation processors or I/O processors. HWID(4:2) is used to select one of the eight, four bit fields specified by the processor select mask.

GB_A(31:0) specifies the 32-byte block address during global bus r/w request cycles, thus providing a physical address range of 128 GB. During IPC interrupt cycles (GB_ATYPE=0), GB_A(31:0) specifies the processor select mask.

GB_AP(3:0) is the address parity bus. GB_AP(0) provides parity for GB_A(7:0), GB_AP(1) provides parity for GB_A(15:8), etc. Odd parity is used.

GB_LEN(3:0) indicates the block length during global bus read request cycles. Typically, processors issue single-word read request cycles (i.e. GB_GEN(3:0)=0); however, block-read cycles are supported by indicating a non-zero block length during global bus read request cycles. The corresponding block address indicates a valid starting block address for correct operation, and reply data is returned in proper order. The block length is specified in powers of two, where GB_LEN(3:0)=0,1,2, . . . , 16 indicates block lengths of 1,2,4 . . . , $2^{16}$, respectively. During IPC interrupt cycles (GB_ATYPE=0), GB_LEN(3:0) specifies the group select identifier.

GB_PID(7:0) indicates the requesting processor identifier (PID) during global bus r/w request cycles. On a read request cycle, the PID is saved by address consumers (i.e., global memory cards) and later returned along with the corresponding reply data as GB_MID(7:0) to uniquely identify the destination processor. On a write request cycle, the PID is used by global memory cards to complete a decoupled, read-lock/write-unlock cycle by a given processor, thus preventing any other processor from performing any memory r/w operation to the locked global memory location.

GB_PTAG(7:0) is used by processors to uniquely tag multiple outstanding read requests. Like GB_PID(7:0), GB_PTAG(7:0) is saved by address consumers and later returned along with the corresponding reply data as GB_MTAG(7:0). Since read requests to different memory banks can return in arbitrary order, GB_PTAG(7:0) may optionally be used by processors to re-organize data when issuing multiple outstanding read requests.

GB_R/-W specifies a read (1) or write (0) cycle during valid global bus address cycles.

GB_LOCK conditions the current global bus r/w cycle. When inactive, it indicates a normal r/w cycle. When active, it indicates a decoupled, atomic r/w cycle. In global memory mode 0, a global bus read-lock cycle requests data from global memory and causes the affected global memory location to be locked until a subsequent write-unlock cycle is performed by the same processor that issued the lock-read cycle. This prevents any other processor from performing any memory r/w operation to the locked global memory location, thus supporting atomic global memory operations (e.g., test-and-set, compare-and-swap, fetch-and-add, etc.). In global memory mode 1, a read-lock cycle causes an atomic test-and-set operation at the global memory. The global memory returns the data at the specified address and then writes all ones to the entire 256-bit word.

GB_RMW identifies a partial global memory write cycle, which performs a read-modify-write operation at the global memory bank. RMW should be active whenever any of the eight 32-bit data slices contains partially written data.

Global Data Bus Signal Definition

The data bus consists of GB_DCYCLE, GB_D(255:0), GB_DP(31:0), GB_BE(31:0), GB MID(7:0), GB_MTAG(7:0), GB_ECCERR, and GB_ERRTYPE. This bus is used by master devices to transfer write data or by slave devices (e.g., memory cards) to return read data. Access to the data bus is gained by issuing a GB_WREQ to the global bus master arbiter and receiving a GB_PGNT (processor write operation), or by issuing an GB_MREQ to the global bus slave arbiter and receiving an GB_MGNT (memory reply operation). Master devices drive the data bus one clock cycle after receiving a valid GB_PGNT, while slave devices drive the data bus upon receiving an GB_MGNT.

GB_DCYCLE identifies a valid global bus data cycle. This signal is driven by the global bus arbiter to validate global memory reply cycles. GB_D(255:0) is the data bus. Each of the thirty-two data bytes may contain valid data, as indicated by the byte enables GB_BE (31:0).

GB_DP(31:0) is the data parity bus. GB_DP (0) provides parity for GB_D(7:0). GB_DP(1) provides parity for GB_D(15:8), etc. The UBIF driving the global bus data bus computes parity, while the receiving UBIF checks for valid parity. Odd parity is used.

GB_BE(31:0) are the individual byte enables. GB_BE (0) active indicates valid data on GB_D(7:0). GB_BF(1) active indicates valid data on GB_D(15:8), etc. During global memory write operations, GB_BF(31:0) validate each of the thirty-two data bytes on GB_D(255:0) and are used by the global memory cards to condition writing to the memory array. GC_BE(31:0) are always valid during global memory reply cycles since global memory read operations always return 256-bits worth of data.

GB_MID(7:0) carries the returned processor ID during global memory reply operations indicating the destination processor for the given data. GB_MID(7:0) reflects the value presented on GB_PID(7:0) during the corresponding read cycle. GB_MID(7:0) is inactive during processor write cycles.

GB_MTAG(7:0) carries the returned processor GB_PTAG(7:0) during global memory reply operations. This field is optionally used by processors to re-organize global memory reply data when issuing multiple outstanding read requests. GB_MTAG(7:0) reflects the value presented on GB_PTAG(7:0) during the corresponding read cycle. GM_MTAG(7:0) is inactive during processor write cycles.

GB_NOCACHE inhibits buffering of the returned data. This is returned by slave devices along with reply data to indicate that the data is volatile and should not be buffered or cached.

GB_ECCERR and GB_ERRTYPE report the result of a global memory read operation. If ERRTYPE is active, then ERRTYPE indicates a corrected, single-bit error or an uncorrectable, double-bit error. The global memory card UBIF generates GB_ECCERR and GB_ERRTYPE during global memory read reply cycles.

Global Control Bus Signal Definition (GB_ACK, GB_NAK) are returned by a slave UBIF after receiving a valid global bus r/w request. (GB_ACK, GB_NAK) indicates to the master UBIF that the global bus r/w request has been successfully received by a slave UBIF, (GB_NAK, GB_ACK) indicates that the slave is currently busy and cannot accept the given r/w request. (GB_ACK, GB_NAK) active simultaneously signals bad parity detected on the address bus A(31:0). The master UBIF should retry the request after receiving a NAK condition or address parity error indication. GB_APERR reports bad parity on the address bus GB_A(31:0), as compared to the supplied address bus parity, GB_AP(3:0). The UBIF driving the data bus generates parity, while the receiving UBIF checks and reports bad parity. GB_APERR is monitored by the console processor and is used to report global bus error conditions.

GB_DPERR reports bad parity on the data bus GB_D(255:0) for any enabled byte, as compared to the supplied data bus parity, GB_DP(31:0). The UBIF driving the data bus generates parity, while the receiving UBIF checks and reports bad parity. GB_DPERR is monitored by the console processor and is used to report global bus error conditions.

GB_BUSERR is used to signal an unrecognized global bus address cycle (i.e., no GB_ACK or GB_NAK returned). GB_BUSERR is monitored by the console processor and is used to report global bus error conditions.

GB_RESET is the master reset signal on the global bus. It is synchronized to the rising edge of the bus clock and is generated at power-on or under software control from the console processor.

Global Bus Slot-Specific Signal Definitions

The following signals are unique for each backplane slot.

GB_ is the processor card global bus read request line. It provides access to the address bus, given GB_PGNT. For a single global bus cycle, GB_RREQ should be asserted and held until the corresponding GB_PGNT is returned. For multiple cycles, GB_RREQ should be held until the last GB_PGNT is received. Assuming no bus contention on the bus, the central global bus arbiter will grant back-to-back cycles to a processor card given an active GB_RREQ. GB_RREQ must be asserted very early in the clock cycle in order to meet Arbiter timing requirements, and should be deasserted very early after the GB_PGNT in order to prevent receiving a spurious GB_PGNT: an unused grant is not permitted.

GB_WREQ is the processor card global bus write request line. It provides access to the address and, one cycle later, the data bus, given GB_PGNT.

GB_PGNT is the processor card global bus grant line. This is returned by the central global bus arbiter to a single processor card during any given global bus cycle. It is used to enable the global bus address bus drivers during a current bus cycle, and conditionally enable the global bus data bus drivers, one cycle later, if GB_PGNT is issued in response to a GB_WREQ.

GB_MREQ is the memory card global bus request line. It provides access to the data bus for returning read data to processor cards.

GB_MGNT is the memory card global bus request line. This is returned by the global bus arbiter to a single memory card during any given global bus cycle. It should be used to enable the global bus data bus drivers during the current bus cycle.

GB_CARDID(3:0) is a slot specific four bit identifier that uniquely identifies each backplane slot. This four bit field is used to generate GB_PID(5:2) during global bus r/w request cycles.

GB_UNITID(1:0) is a backplane-specific 2-bit identifier that uniquely identifies each SVS system unit in a multi-system configuration. This 2-bit field is used to generate GB_PID(7:6) during global bus r/w request cycles.

Miscellaneous Global Bus Signals

GB_MCARD(3:0) are backplane signals that are used by global memory cards to determine the number of global memory cards in the system. Each memory card determines which of the four memory slots it is in from its GB_CARDID(3:0), and drives the GB_MCARD line corresponding to that slot. Each memory card also reads GB_MCARD(3:0) to determine a complete configuration of memory cards in the backplane, and thus the interleave factor to use.

| Signal Name | Width | Description |
| --- | --- | --- |
| | | Global Bus Signal Summary |
| GB ACYCLE | 1 | Address cycle indicator |
| GB ATYPE | 1 | +Address/−Imessage indicator |
| GB A | 32 | Address bus (32-byte block address) |
| GB AP | 4 | Address bus parity |
| GB LEN | 4 | Block length |
| GB PID | 8 | Processor request ID |
| GB PTAG | 7 | Processor request TAG |
| GB RW | 1 | +Read/−Write select |
| GB LOCK | 1 | Atomic cycle select |
| GB RMW | 1 | Read-modity-write signal |
| GB DCYCLE | 1 | Data cycle indicator |
| GB D | 256 | Data bus |
| GB BE | 32 | Byte Enables |
| GB DP | 32 | Data bus parity by byte |
| GB MID | 8 | Memory reply ID |
| GB MTAG | 7 | Memory reply TAG |
| GB NOCACHE | 1 | Don't cache |
| GB ECCERR | 1 | ECC error signal |
| GB ERRTYPE | 1 | ECC error type |
| GB ACK | 1 | Bus acknoledge |
| GB NAK | 1 | Bus no-acknoledge |
| GB BUSERR | 1 | Bus error |
| GB BACKOFF | 1 | Memory back-off indicator |
| GB APERR | 1 | Address bus parity error |
| GB DPERR | 1 | Data bus parity error |
| GB RESET | 1 | Bus reset |
| | | The following signals are unique per slot |
| GB ECLR | 2 | Bus clock for ECL devices (differential) |
| GB TCLK | 2 | Bus clock for TTL devices (differential) |
| GB RREQ | 1 | Master GBIF read request |
| GB WREQ | 1 | Master BGIF write request |
| GB PGNT | 1 | Master GBIF bus grant |
| GB MREQ | 1 | Slave GBIF reply request |
| GB MGNT | 1 | Slave GBIF bus grant |
| GB CARDID | 4 | Backplane slot ID |
| GB UNITID | 2 | Back plane ID |
| | | The following 14/26 signals are daisy chained |
| GB SIN | 1 | Diagnostic bus serial in |
| GB SOUT | 1 | Diagnostic bus serial out |
| GB SCANI | 1 | Serial scan-in |
| GB SCANO | 1 | Serial scan-out |
| | | The following signals are special |
| GB MCARD | 4 | Memory card signals |

APPENDIX B

LPC Address Bus Signal Definitions

The LPC address bus consists of LPC_ACYCLE, LPC_ATYPE, LPC_A(31:0), LPC_LEN(3:0), LPC_PID(1:0), LPC_PTAG(7:0)LPC_RW, LPC_LOCK, and LPC_RMW. This bus is shared by the four local processors and is used to initiate global memory r/w cycles. Access to the LPC address bus is gained by issuing a read request (LPC_RREQ) or write request (LPC_WREQ) to the LPC bus arbiter and by receiving a processor grant (LPC_PGNT). A description of each address bus field is provided below:

LPC_ACYCLE conditions a valid LPC bus local address cycle. This line is driven by the UBIF LPC bus arbiter to validate local LPC bus addresses. It is used by local LPC bus devices, such as the IIIPPI I/O interfaces on the I/O processor card to validate LPC addresses. LPC_ACYCLE is valid for one cycle during the first half of an LPC ABUS cycle, indicating that a valid LPC bus address cycle can be sampled on the following rising clock edge.

LPC_ATYPE specifies a valid LPC address bus cycle or IPC interrupt cycle. If LPC_ATYPE=1, the LPC address bus specifies a valid r/w request. If LPC_ATYPE=0, the LPC bus identifies am IPC interrupt cycle. In this case, the UBIF interprets LPC_LEN(3:0) as the group select identifier, GSI(3:0), and LPC_A(31:0) as the processor select mask. PSM(31:0). During IPC interrupt cycles, LPC_RW, LPC_LOCK, and LPC_RMW are not defined.

LPC_A(31:0) specifies the 32-byte block address during LPC r/w request cycles, thus providing a physical address range of 128 GB. During IPC interrupt cycles (LPC_ATYPE=0), LPC_A(31:0) specifies the processor select mask.

LPC_LEN(3:0) indicates the block length during LPC read request cycles. Typically, processors issue single-word read request cycles (i.e., LPC_LEN(3:0)=0). However, block-read cycles are supported by indicating a non-zero block length during LPC read request cycles. The corresponding block address must indicate a valid starting block address for correct operation, and reply data is returned in proper order. The block length is specified in powers of two, where LPC_LEN(3:0)=0,1,2, . . . , 16 indicate block lengths of 1,2,4, . . . , 2**16 respectively. The current limitation imposed by the UBIF is a block length of eight 256-bit words (or LPC_LEN(3:0)=3) per local device. During IPC interrupt cycles (LPC_ATYPE=0), LPC_LEN(3:0) specifies the processor group select.

LPC_PID(1:0) indicates the requesting processor identifier (PID) during LPC r/w request cycles. On a read request cycle, the PID is saved by address consumers (i.e., global memory cards) and later returned along with the corresponding reply data as LPC_MID(1:0) to uniquely identify the destination processor. On a write request cycle, the PID is used by global memory cards to complete a decoupled, lock-read/lock-write cycle by a given processor, thus preventing any other processor from performing any memory r/w operation to the locked global memory bank. On the processor and IOP cards, the global bus processor identifier, LPC_PID(7:0), is composed by concatenating GB_UNITID(1:0), GB_CARDID(3:0), with the given LPC bus LPN(1:0).

LPC_PTAG(7:0) is used by processors to uniquely tag multiple outstanding read requests. I ike PID, PTAG is saved by address consumers and later returned along with the corresponding reply data is LPC_MTAG(7:0). Since read requests to different memory banks can return in arbitrary order, PTAG can optionally be used by processors to re-organize data when issuing multiple outstanding read requests.

LPC_RW specifies a read (1) or write (0) cycle during valid LPC request cycles.

LPC_LOCK conditions the current LPC r/w cycle. When inactive, it indicates a normal r/w cycle. When active, it indicates a decoupled, atomic r/w cycle. In global memory mode 0, read-lock cycle requests data from global memory and causes the affected global memory address to be locked until a subsequent write-unlock cycle is performed by the same processor that issued the read-lock cycle. This prevents any other processor from performing any r/w operation to the locked global memory address, thus supporting atomic global memory operations (e.g., test-and-set, compare-and-swap, fetch-and-add, etc.). In global memory mode 1, a read-lock cycle causes an atomic test-and-set operation at the global memory. The global memory returns the data at the specified address and then writes all 1's to the entire 256-bit word.

LPC_RMW identifies a partial global memory write cycle, which requires a read-modify-write operation at the global memory bank. LPC_RMW should be active whenever any of the eight 32-bit data slices contains partially written data.

LPC Data Bus Signal Definitions

The data bus consists of LPC_DCYCLE, LPC_D(255:1), LPC_BE(31:0), LPC_MID(7:0), LPC_MTAG(7:0) LPC_GBPERR, LPC_ECCERR and LPC_ERRTYPE. This bus is used by processors to transfer write data to the UBIF or by the UBIF to return global memory data to processors. Processors gain access to the LPC data bus by issuing a LPC_WREQ to the LPC bus master arbiter and receiving a LPC_PGNT. A description of each data bus field is provided below:

LPC_DCYCLE conditions a valid LPC bus data cycle. This line is driven by the UBIF LPC bus data arbiter to validate LPC bus reply cycles. Data consumers should validate read reply cycles with LPC_DCYCLE. LPC_DCYCLE is valid for one cycle during the first half of an LPC DBUS cycle.

LPC_D(255:0) is the data bus. Each of the thirty-two data bytes may contain valid data, as indicates by the byte enables LPC_BE(31:0).

LPC_BE(31:0) are the individual byte enables. LPC_BE(0) active indicates valid data on LPC_D(7:0), LPC_BE(1) active indicates valid data on LPC_D(15:8), etc. During write operations, LPC_BE(31:0) validate each of the thirty-two data bytes on LPC_D(255:0). LPC_BE(31:0) are not defined during read reply cycles, since global memory read operations always return 256-bits of data.

LPC_MID(7:0) carries the returned processor ID during global memory reply operations indicating the destination processor for the given data. LPC_MID(1:0) reflects the value presented on LPC_PID(1:0) during the corresponding read cycle. LPC_MID(1:0) is inactive during processor write cycles.

LPC_MTAG(7:0) carries the returned processor TAG during global memory reply operations. This field is optionally used by processors to re-organize global memory reply data when issuing multiple outstanding read requests.

LPC_MTAG(7:0) reflects the value presented on LPC_PTAG(7:0) during the corresponding read cycle.

LPC_MTAG(7:0) is inactive during processor write cycles.

LPC_NOCACHE inhibits buffering of the returned data. This is returned by memory devices along with reply data to indicate that the data is volatile and should not be buffered or cached. The UBIF returns LPC_NOCACHE to the destination processor along with the reply data.

LPC_ECCERR, LPC_ERRTYPE reports the result of a global memory read operation. If LPC_ERRTYPE is active, then LPC_ERRTYPE indicates a corrected, single-bit error (if 0) or an uncorrectable, double-bit error (if 1). These signals are inactive during processor write cycles.

LPC_GBPERR reports if bad parity was detected on the global bus data lines LPC_D(255:0) during the memory read reply cycle. It is only valid during UBIF to PBIF data reply cycles and should be ignored at all other times.

LPC Control Bus Signal Definitions

The LPC control bus consists of LPC_ACK and LPC_NAK. These shared signals are used to acknowledge a valid LPC address and to indicate whether LPC bus requests are accepted or rejected. LPC_ACK and LPC_NAK are returned two cycles after a valid LPC address bus cycle has been issued to a recognized LPC address. The UBIF always returns LPC_ACK when processors issue global memory r/w requests, as indicated by conditioning an LPC_RREQ or LPC_WREQ with an active (i.e., 0) LPC_LG indication. An invalid LPC address is indicated by the absence of both LPC_ACK and LPC_NAK, which implies that processors should abort the request. A description of each control bus signal is provided below:

LPC_ACK is returned by an address consumer to indicate that it has acknowledged a valid LPC address and that is has accepted the given r/w request. The UBIF always returns LPC_ACK when given a global address since the UBIF local bus arbiter only grants the LPC bus if there is room in the associated output queue to buffer the global bus request. However, local devices on the I/O processor card may not return LPC_ACK, either because of an unrecognized address or because they cannot accept the given request.

LPC_NAK is returned by an address consumer to indicate that is has acknowledged a valid LPC address but that is has not accepted the r/w request. The requestor should retry a NAKed cycle.

LPC Bus Arbitration Signal Definitions

The LPC bus arbitration control signals consist of LPC_RREQ(3:0), LPC_WREQ(3:0), LPC_LG(3:0), and LPC_RDY(3:0). Each of the four local processors has a unique set of these control signals, thus processor (i) is given LPC_RREQ(i), LPC_WREQ(i), LPC_LG(i), and LPC_RDY(i). LPC_RREQ(i), LPC_WREQ(i), and LPC_LG(i) are used to gain access of the LPC bus to issue local or global r/w requests, while LPC_RDY(i) is used by the UBIF-D chip to pace the return of global memory block read data to each local processor. These signals are described in more detail below. A description of each arbitration signal is provided below:

LPC_RREQ(3:0) are the unique processor read request signals. These are used to gain access to the LPC address bus to issue a local or global read request. LPC_LG(3:0) indicates whether the request is destined for a local device (1) or a global device (0). LPC_RREQ(i) should be generated on the rising edge of LPC_CLOCK and remain asserted until LPC_PGNT(i) is received.

LPC_WREQ(3:0) are the unique processor write request signals. These are used to gain access to both the LPC address bus and LPC data bus to issue a local or global write request. LPC_LG(3:0) indicates whether the request is destined for a local device (1) or a global device (0). LPC_WREQ(i) should be generated on the rising edge of LPC_CLOCK and remain asserted until LPC_PGNT(i) is received.

LPC_LG(3:0) are the unique processor+Local/—Global select signals. These are used to condition whether the current LPC_RREQ(i) or LPC_WREQ(i) is destined for a local device (1) or a global device (0). The timing of LPC_LG(i) is identical to LPC_RREQ(i) and LPC_WREQ(i).

LPC_PGNT(3:0) are the unique processor bus grant signals. During any given LPC bus cycle, only one LPC_PGNT(i) is issued by the LPC bus arbiter. LPC_PGNT(i) is returned no sooner than one cycle after detecting a LPC_RREQ(i) or LPC_WREQ(i) and remains active for two clock cycles. LPC_PGNT(i) should be used directly to enable the LPC address but drivers on a given processor. If a LPC_WREQ(i) was issued, then the processor should begin driving the LPC data bus one cycle after detecting LPC_PGNT(i). The LPC bus arbiter always deasserts LPC_PGNT(i) after two cycles, but may assert the same LPC_PGNT(i) one cycle later if the corresponding processor keeps LPC_RREQ(i) or LPC_WREQ(i) asserted. Thus, any given processor is granted the LPC bus at most every other LPC bus cycle.

LPC_RDY(3:0) are the unique processor ready signals. LPC_RDY(i) indicates to the UBIF that the processor is ready to accept read data. These are used primarily during block-read cycles to pace the rate at which a local processor or I/O device (e.g., the IIIPPI transmitter on the I/O processor card) accepts global memory read data. The UBIF returns data to a device at a peak rate of 320 MB/second, assuming 40 MHz and no bus contention. The local processor or I/O device interface can slow this rate by taking away LPC_RDY(i) upon receiving a data word.

Interrupt Message Support Signal Definitions

LPC_IPCINTR(3:0) are the unique IPC interrupt signals. These are generated by the UBIF whenever it detects an IMSG cycle on the global bus which selects any of the four local processors. The UBIF generates a one-clock-cycle long LPC_IPCINTR(i) signal, which should be used by the PBIF chip to set the IPC interrupt bit in the processor interrupt register. The UBIF can issue back-to-back LPC_IPCINTR(i) signals, should there by back-to-back IMSG cycles that select the processor (i).

| Local Processor Card (LPC) Bus Signal Summary | | | |
|---|---|---|---|
| Signal Name | Width | Description | Type |
| LPC ACYCLE | 1 | Address cycle indicator | TP |
| LPC ATYPE | 1 | +Address/—Imessage select | TS |
| LPC A | 32 | Address bus (32-byte block address) | TS |
| LPC LEN | 4 | Block Length | TS |
| LPC PID | 2 | Processor request ID | TS |
| LPC PTAG | 7 | Processor request TAG | TS |
| LPC RW | 1 | +Read/—Write select | TS |
| LPC LOCK | 1 | Atomic cycle select | TS |
| LPC RMW | 1 | Read-modity-write signal | TS |
| LPC DCYCLE | 1 | Data cycle indicator | TP |
| LPC D | 256 | Data bus | TS |
| LPC BE | 32 | Byte Enables | TS |
| LPC MID | 2 | Memory reply ID | TS |
| LPC MTAG | 7 | Memory reply TAG | TS |
| LPC ECCERR | 1 | ECC error signal | TS |
| LPC ERRTYPE | 1 | ECC error type (o = CECC, 1 = UECC | TS |
| LPC NOCACHE | 1 | don't cache | TS |
| LPC GBPERR | 1 | GigaBus parity error | TS |
| −LPC ACK | 1 | Bus acknoledge | TS |
| −LPC NAK | 1 | Bus-no-acknoledge | TS |
| Total | 354 | The following signals are unique per processor | |
| −LPC LG | 1 | +Local/—Global indicator | TP |
| −LPC RREQ | 1 | LPC read request | TP |
| −LPC WREQ | 1 | LPC write request | TP |
| −LPC PGNT | 1 | LPC bus processor grant | TP |
| −LPC RDY | 1 | Processor ready indicator | TP |
| −LPC IPCINTR | 1 | Interrupt message interrupt | TP |
| +LPC ETCLK | 2 | ECL System clock | ECL |
| −LPC ETCLK | 2 | ECL System clock | ECL |
| Total | 344 | The following signals are daisy chained | |
| LPC SIN | 1 | Diagnostic bus serial in | TP |
| LPC SOUT | 1 | Diagnostic bus serial out | TP |
| Total | 2 | The following signals form the GigaBus snoop bus | |
| LPC GB BACKOFF | 1 | GigaBus backoff signal | TP |
| LPC GB ACYCLE | 1 | GigaBus address cycle | TP |
| LPC GB ATYPE | 1 | GigaBus +address/Imessage select | TP |
| LPC GB RW | 1 | GigaBus Read/—Write select | TP |
| LPC GB LEN | 4 | GigaBus block length | TP |
| LPC GB A | 32 | GigaBus addres | TP |

| Local Processor Card (LPC) Bus Signal Summary | | | |
|---|---|---|---|
| Signal Name | Width | Description | Type |
| −LPC RESET | 1 | Synchronous system reset | TP |

GMC Address Bus Signal Definitions

The GMC address bus consists of GMC_A(23:0), GMC_LEN(3:0), GMC_PID(7:0), GMC_PTAG(7:0) GMC_RW, and GMC_RMW. This bus is shared by the four memory banks and is used by the UBIF to initiate memory r/w cycles.

A description of each address bus field is provided below:

GMC_A(23:0) specifies the 32-byte block address. The least significant ten bits, GMC_A(9:0) specify the columm address (CAS). Assuming 4-Mbit DRAMs, GMC_A(19:10) specify the row address (RAS), while GMC_A(20) selects the side (1M or 2M SIMMs). Assuming 16-Mbit DRAMs, GMC_A(21:10) specify the row address (RAS), while GMC_A(22) selects the side (1M or 2M SIMMs). GMC_A(23) is reserved for future rank expansion with 16-Mbit DRAMS.

GMC_LEN(3:0) indicates the block length during GMC read request cycles. Typically, processors issue single-word read request cycles (i.e., LEN=0). However, block-read cycles are supported by indicating a non-zero block length during GMC read request cycles. The corresponding block address indicates a valid starting block address. The block length is specified in powers of two, where LEN=0,1,2, ..., 16 indicate block lengths of 1,2,4, ..., 2**16 respectively.

GMC_PID(7:0) indicates the requesting processor identifier (ID) during read cycles. GMC_PID(7:0) is saved by the memory bank at the start of a read cycle and returned with the reply data.

GMC_PTAG(7:0) is used by processors to uniquely tag multiple outstanding read requests. Like GMC_PID(7:0).

GMC_PTAG(7:0) is saved by the memory bank at the start of a read cycle and returned with the reply data.

GMC_RW specifies a read (1) or write (0) cycle.

GMC_RMW identifies a partial global memory write cycle, which will require a read-modify-write operation at the global memory bank. The UBIF will first issue a read cycle with RMW active, perform the modify on-chip, and then write the modified data back to memory.

GMC Data Bus Signal Definitions

The data bus consists of GMC_D(255:0), GMC_ECC(63:0), GMC_WENB(7:0), GMC_MID(7:0) and GMC_MTAG(1:0). This bus is shared by the four memory banks and is used by the UBIF to transfer write data and to accept read data from the memory banks. A description of each data bus field is provided below:

GMC_D(255:0) is the data bus. Each of the thirty-two data bytes may contain valid data, as indicated by the byte enables GMC_BE(0:31).

GMC_ECC(63:0) is the ECC Bus. ECC is computed by the UBIF-D modules and supplied during write cycles and used to detect/correct data errors during read cycles.

GMC_WENB(7:0) enables writing into each of the eight 32-bit sections of a 256-bit word. GMC_WENB(0) enables writing to D(31:0), GMC_WENB(1) enables writing to D(63:32), etc.

GMC_MID(7:0) carries the returned processor ID during global memory reply operations indicating the destination processor for the given data. GMC_MID(7:0) reflects the value presented on GMC_PID(7:0) during the corresponding read cycle. MID is inactive during processor write cycles.

GMC_MTAG(7:0) carries the returned processor TAG during global memory reply operations. This field is optionally used by processors to re-organize global memory reply data when issuing multiple outstanding read requests. GMC_MTAG(7:0) reflects the value presented on GMC_PTAG(7:0) during the corresponding read cycle. GMC_MTAG(7:0) is inactive during write cycles.

GMC Control Bus Signal Definitions

GMC_REQ(3:0) are the local memory card bus request lines. Memory bank (i) issues GMC_REQ(i) no sooner than two cycles before it will have data latched in its read data register. GMC_REQ(i) should remain asserted until GMC_GNT(i) is received.

GMC_GNT(3:0) are the local memory card bus grant lines. GMC_GNT(i) is returned no sooner than two cycles after GMC_REQ(i) is issued and lasts for two clock cycles. The UBIF will always deassert GMC_GNT(i) for at least one cycle after granting the local memory card bus to a particular memory bank.

GMC_RDY(3:0) are the individual memory bank ready lines. Each memory bank generates its own RDY signal when it can accept a new memory request cycle from the UBIF. When GMC_RDY(i) is active, the UBIF is allowed to issue GMC_LDMAR(i), which loads the memory address register (and optionally the data register) on the respective bank. GMC_RDY(i) should then become deasserted while the bank is busy performing a r/w cycle.

GMC_LDMAR(3:0) are the individual memory bank address register load enables. When GMC_RDY(i) is active, the UBIF is allowed to issue GMC_LDMAR(i), which loads the memory address register (and optionally the data register) on the respective bank. GMC_LDMAR(i) is active for one clock cycle.

GMC_NENE(3:0) are the individual memory bank next-near signals. When active, GMC_NENE(i) indicates that the next ROW-address to be issued to the bank is the same as the previous ROW-address issued.

| Global Memory Card (GMC) Bus Signal Summary | | | |
|---|---|---|---|
| Signal Name | Width | Description | Dir |
| GMC A | 24 | Address bus (32-byte, RAS/CAS address) | O |
| GMC LEN | 4 | Block length | O |
| GMC PID | 8 | Processor request ID | O |
| GMC PTAG | 7 | Processor request TAG | O |
| GMC RW | 1 | +Read/−Write select | O |
| GMC RMW | 1 | Read-modify-write select | O |
| GMC D | 256 | Data bus | I/O |
| GMC ECC | 64 | ECC bits (8-bits/32-bit word) | I/O |
| GMC MID | 8 | Memory reply ID | I |

-continued

| Global Memory Card (GMC) Bus Signal Summary | | | |
|---|---|---|---|
| Signal Name | Width | Description | Dir |
| GMC MTAG | 7 | Memory reply TAG | I |
| −GMC WENB | 8 | SIMM write enables (unique per 32-bit word) The following signals are unique per memory bank | O |
| −GMC REQ | 1 | Memory reply request | I |
| −GMC GNT | 1 | Memory reply grant | O |
| −GMC RDY | 1 | Memory ready indicator | I |
| −GMC LDMAR | 1 | Load memory address | O |
| −GMC NENE | 1 | Next RAS = Previous RAS | O |
| +GMC ETCLK | 2 | ECL System clock | ECL |
| −GMC ETCLK | 2 | ECL System clock | ECL |
| −GMC RESET | 1 | Synchronous system reset | O |

Having thus described our invention, what we claim as new, and desire to secure by Letters Patent is:

1. A multiprocessor data processing system having a plurality of data processors that are coupled through a system bus to a shared memory, said system comprising:
a plurality of processor nodes each including an associated data processor, each of said associated data processors being capable of generating a shared memory write command in conjunction with from one to N bytes of data to be written to said shared memory and from one to N corresponding byte enable signals;
each of said processor nodes further including an internal bus that is coupled to the associated data processor, and data buffer means coupled between said internal bus and a local bus, said local bus being coupled to each of said plurality of processor nodes, said data buffer means having a width of M times N bytes of data and being capable of buffering, prior to the buffered data being transferred to said shared memory over said local bus and said system bus, up to N data bytes from a plurality of data processor write commands that are all directed to a same M times N byte address region within said shared memory, each of said processor nodes further including byte enable buffer means having an input coupled to said associated data processor for buffering up to M times N of said corresponding byte enable signals;
means for controlling a transmission of buffered bytes of data from said data buffer means to said local bus and a transmission of said corresponding buffered byte enable signals from said byte enable buffer means to said local bus, said controlling means including means, responsive to stored byte enable signals, for selectively generating a control signal on said local bus for specifying a shared memory write operation to be accomplished as one of a read-modify-write type of memory operation and a write type of memory operation;
means, responsive to said controlling means, for coupling buffered data bytes, the control signal, and the buffered byte enable signals from said local bus to said system bus for reception by said shared memory as write data bytes, as a memory control signal, and as memory byte enable signals, respectively; and
means, coupled to said system bus and said shared memory and responsive to the memory control signal specifying said read-modify-write memory operation, for reading data from a specified location within said shared memory, for selectively merging the write data bytes with the data read from the specified location in accordance with the byte enable signals to form resultant data bytes, and for storing the resultant data bytes back into the specified location.

2. A multiprocessor data processing system as set forth in claim 1, wherein said controlling means is responsive to said M times N byte enable signals being buffered for transmitting said buffered data bytes and corresponding buffered byte enable signals to said local bus.

3. A multiprocessor data processing system as set forth in claim 2, wherein said controlling means is further responsive to said M times N byte enable signals being buffered for generating said control signal to specify that the shared memory write operation is to be accomplished as the write type of memory operation.

4. A multiprocessor data processing system as set forth in claim 1, wherein said coupling means includes:
first interface means for coupling to address signal lines and control signal lines of said local bus and including means for receiving and for buffering the address signal lines and the control signal lines for a plurality of consecutive local bus transactions; and
second interface means for coupling to data signal lines of said local bus, the data signal lines being organized as a plurality of data units each comprised of a plurality of bytes, said second interface means being partitioned into functional units each of which includes means for receiving and for buffering the plurality of bytes of one of the data units for said plurality of consecutive local bus transactions; wherein
said first interface means includes a second control means, responsive to the address signal lines and control signal lines, for generating a plurality of data path control signals, said data path control signal being coupled in common to said functional units of said second interface means for controlling the operation thereof with respect to received bytes of each of the data units.

5. A multiprocessor data processing system as set forth in claim 4, wherein
said receiving and buffering means of said first interface means includes a plurality of first queue means for buffering address and control signals received from said local bus, each of said first queue means having an output coupled to said system bus; and
each of said functional units of said second interface means includes a plurality of second queue means each of which buffers the plurality of bytes of data received from said local bus, each of the second queue means having an output coupled to said system bus; and wherein
individual ones of the processor nodes that are coupled to said local bus each have an individual one of the first queue means and an individual one of the second queue means dedicated thereto.

6. A multiprocessor data processing system as set forth in claim 4, wherein said control signal lines include said signal line for specifying said read-modify-write type of memory operation and further include the M times N byte enable signal lines.

7. A multiprocessor data processing system, comprising:
at least one group comprised of (n) computational nodes each of which includes a first data processor, each of the (n) computational nodes within said group being coupled together by a first local bus means;

at least one communication node including a second data processor, the at least one communication node being coupled to data communication means by a second local bus means;

at least one shared global memory comprised of (x) memory banks coupled together by a third local bus means; and a global bus means;

a plurality of first bus interface means individual ones of which are coupled between one of said first, second, and third local bus means and said global bus means;

a plurality of second bus interface means individual ones of which are coupled between one of said first and second local bus means and said data processors of said (n) computational nodes and said at least one communication node for receiving address and control signal lines therefrom, the control signal lines including a plurality byte enable signals that are generated by a data processor during a write cycle;

wherein each of said computational and communication nodes is comprised of means for storing byte enable signals associated with one or more data processor write cycles; means for storing corresponding bytes of data written by the data processor during the one or more data processor write cycles; and means, responsive to stored byte enable signal indications, for asserting on the associated one of said first and second local bus means a global memory read-modify-write signal in response to a condition wherein, for a data unit comprised of a plurality of bytes, at least one associated byte enable signal is not asserted; and wherein said multiprocessor data processing system is further comprised of, means, coupled to said global bus means and to said at least one shared global memory, and responsive to an assertion of said read-modify-write signal, for reading data from a specified location within said at least one global memory, for selectively merging the data bytes to be written with the data read from the specified location in accordance with corresponding byte enable indications to form resultant data bytes, and for storing the resultant data bytes back into the specified location.

8. A multiprocessor data processing system as set forth in claim 7, wherein each of said first bus interface means includes a plurality (y) of input queue means each having an input coupled to the global bus means for receiving and storing address information, control information, and data information therefrom, each of the input queue means having an output coupled to an associated one of said first and second local bus means; and a plurality (z) of output queue means each having an input coupled to the associated one of said first and second local bus means for receiving and storing address information, control information, and data information therefrom, each to the global bus means; and wherein (n=x=y=z).

9. A multiprocessor data processing system as set forth in claim 8, wherein
each of said plurality (y) of input queue means and said plurality (z) of output queue means includes address queue means, data queue means, and control queue means.

10. A multiprocessor data processing system as set forth in claim 8, wherein:
for one of said first plurality of first bus interface means coupled to the first local bus means, each of the computational nodes is coupled to one of the input queue means and to one of the output queue means;
for one of said second plurality of second bus interface coupled to the second local bus means, the at least one communication node is coupled to one of the input queue means and to one of the output queue means, and the communication means is coupled to another one of the input queue means and to another one of the output queue means; and
for a third bus interface means coupled to the third local bus means, each of the memory banks is coupled to one of the input queue means and to one of the output queue means.

11. A multiprocessor data processing system as set forth in claim 7, wherein each of the computational and communication nodes further comprises:
means for setting a data processor mask so as to identify one or more other data processors to be communicated with;
means for setting a local bus transaction identifier for specifying a data processor communication bus transaction; and
means for transmitting the data processor mask to address signal lines of said associated one of said first and second local bus means and the bus transaction identifier to control signal lines of said associated one of said first and second local bus means.

12. A multiprocessor data processing system as set forth in claim 11 wherein said computational and communication nodes each further comprises:
means for receiving, from the address signal lines of each said associated one of said first and second local bus means, said data processor mask, and from the control signal lines of each said associated one of said first and second local bus means, a local bus transaction identifier, the data processor mask and local bus transaction identifier being received from a data processor associated with another computational or communication node;
means for decoding the received data processor mask and the received bus transaction identifier; and
means for interrupting the one or more identified data processors.

13. A multiprocessor data processing system as set forth in claim 7 and further including frame buffer means coupled to said system for receiving image data from said system, said frame buffer means having a display monitor means coupled thereto for displaying the received image data.

14. A multiprocessor data processing system as set forth in claim 7 and further comprising image display means having an input coupled to an output of said communications means for receiving image data from said system.

15. A multiprocessor data processing system as set forth in claim 7 and further comprising image display means having an input coupled to said global bus for receiving processed image data from one at least one of said computational nodes via said global memory.

16. A method of operating a multiprocessor data processing system of a type having a plurality of processor nodes each of which includes a data processor, comprising the steps of:

for each processor node, and for each data processor write to memory operation within a node that is directed to an addressable region of memory comprised of a predetermined number of contiguous bytes, buffering data written by the data processor to a first bus that is internal to the processor node;

buffering byte enable signals generated by the data processor in conjunction with the data written by the data processor; and performing a main memory write operation by, transmitting the buffered data and the buffered byte enable signals to a second bus that couples together a plurality of the processor nodes;

responsive to stored byte enable signals, also generating and transmitting a control signal to the second bus for specifying if the main memory write operation is to be accomplished as a read-modify-write type of memory operation or as a write type of memory operation;

coupling the data, the control signal, and the byte enable signals from the second bus to a third bus for reception by the main memory; and responsive to the control signal specifying a read-modify-write type of memory operation, reading data from a specified location within the main memory, selectively merging the data from the third bus with the data read from the specified location, the data being selectively merged in accordance with the byte enable signals from the third bus, and storing a result of selectively merging the data back into the specified location.

17. A method as set forth in claim 16, wherein the step of performing a main memory write operation is initiated as a result of a step of determining that a predetermined number of byte enable signals are buffered.

18. A method as set forth in claim 16, wherein the step of performing a main memory write operation is initiated as a result of a step of determining that a data processor write to memory operation within a node is directed to an address that is outside of an addressable region of memory that is associated with currently buffered data and currently buffered byte enable signals.

19. A method of performing a memory write operation in a multiprocessor data processing system of a type having at least one processor node coupled to a local bus, the at least one node including a data processor, comprising the steps of:

buffering, within the processor node, data and associated byte enable signals that are written by the associated data processor, said data processor being capable of generating a memory write command in conjunction with from one to N bytes of data to be written to the memory and from one to N corresponding byte enable signals;

wherein the step of buffering buffers up to a total of M times N bytes of data from individual ones of a plurality of consecutively executed data processor memory write commands that are all directed to a same M times N byte address region within the memory, the step of buffering also buffering up to M times N of the associated byte enable signals; and performing the memory write operation by, determining, as a function of buffered byte enable signals, if the memory write operation should be accomplished as a read-modify-write (RMW) operation, if it is determined to accomplish the memory write operation as a RMW operation, transmitting the buffered data to the local bus in conjunction with the buffered byte enable signals and a RMW memory control signal;

arbitrating for access to a global bus and, in response to receiving access to the global bus;

coupling the data, the RMW control signal, and the byte enable signals from the local bus to the global bus for reception by a memory means; and the memory means being responsive to the RMW control signal for reading data from a specified location within the memory means, selectively merging the data from the global bus with the data read from the specified location in accordance with the byte enable signals, and storing a result of selectively merging the data back into the specified location.

* * * * *